United States Patent
Schrader et al.

(10) Patent No.: US 9,736,655 B2
(45) Date of Patent: *Aug. 15, 2017

(54) MOBILE DEVICE SAFE DRIVING

(71) Applicant: Microsoft Technology Licensing, LLC, Redmond, WA (US)

(72) Inventors: Joseph A. Schrader, Kirkland, WA (US); Raman K. Sarin, Redmond, WA (US); Ted Tai-Yu Chen, Seattle, WA (US); Sharad Agarwal, Seattle, WA (US); Joseph H. Matthews, III, Woodinville, WA (US); Shai Guday, Redmond, WA (US); Joseph Spencer King, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/143,731

(22) Filed: May 2, 2016

(65) Prior Publication Data

US 2016/0248906 A1    Aug. 25, 2016

Related U.S. Application Data

(63) Continuation of application No. 14/495,418, filed on Sep. 24, 2014, which is a continuation of application
(Continued)

(51) Int. Cl.
*H04M 3/00* (2006.01)
*H04W 4/04* (2009.01)
(Continued)

(52) U.S. Cl.
CPC ...... *H04W 4/046* (2013.01); *G08G 1/096725* (2013.01); *H04M 1/7253* (2013.01);
(Continued)

(58) Field of Classification Search
CPC ........... H04M 1/72519; H04M 1/6091; H04W 8/245; G01P 1/11
(Continued)

(56) References Cited

U.S. PATENT DOCUMENTS 5,379,451 A    1/1995 Nakagoshi et al.
5,883,598 A    3/1999 Parl et al.
(Continued)

FOREIGN PATENT DOCUMENTS

CN    1984402 A    6/2007
CN    101112072 A    1/2008
(Continued)

OTHER PUBLICATIONS

"Aventail and Trust Digital Launch Integrated Secure Mobile Access Solution", Published on: Feb. 14, 2006, Available at: <<http://www.marketwired.com/press-release/aventail-and-trust-digital-launch-integrated-secure-mobile-access-solution-675575.htm>>, 2 Pages.
(Continued)

*Primary Examiner* — Danh Le

(57) ABSTRACT

In embodiments of mobile device safe driving, a mobile device can display a device lock screen on an integrated display device, and transition from the device lock screen to display a driving mode lock screen. The transition to display the driving mode lock screen occurs without receiving a PIN code entered on the device lock screen. The mobile device implements a safe driving service that is implemented to activate a safe driving mode of the mobile device, and disable features of the mobile device while the safe driving mode is activated.

11 Claims, 17 Drawing Sheets

Related U.S. Application Data

No. 13/726,097, filed on Dec. 22, 2012, now Pat. No. 8,874,162.

(60) Provisional application No. 61/580,131, filed on Dec. 23, 2011, provisional application No. 61/695,294, filed on Aug. 30, 2012.

(51) Int. Cl.

| | |
|---|---|
| *H04W 12/08* | (2009.01) |
| *H04W 8/18* | (2009.01) |
| *H04M 1/725* | (2006.01) |
| *H04W 8/22* | (2009.01) |
| *G08G 1/0967* | (2006.01) |
| *H04W 4/02* | (2009.01) |
| *H04M 1/60* | (2006.01) |

(52) U.S. Cl.
CPC ... *H04M 1/72572* (2013.01); *H04M 1/72577* (2013.01); *H04W 8/18* (2013.01); *H04W 8/183* (2013.01); *H04W 8/22* (2013.01); *H04W 12/08* (2013.01); *B60W 2540/22* (2013.01); *H04M 1/6091* (2013.01); *H04M 2250/10* (2013.01); *H04M 2250/12* (2013.01); *H04W 4/02* (2013.01)

(58) Field of Classification Search
USPC ............ 455/550.1, 418, 569.2, 420; 340/670
See application file for complete search history.

(56) References Cited

U.S. PATENT DOCUMENTS

| | | | |
|---|---|---|---|
| 6,078,826 A | 6/2000 | Croft et al. | |
| 6,243,595 B1 | 6/2001 | Lee et al. | |
| 6,286,001 B1 | 9/2001 | Walker et al. | |
| 6,339,826 B2 | 1/2002 | Hayes et al. | |
| 6,405,033 B1 | 6/2002 | Kennedy et al. | |
| 6,446,069 B1 | 9/2002 | Yaung et al. | |
| 6,504,480 B1 | 1/2003 | Magnuson et al. | |
| 6,519,530 B2 | 2/2003 | Crockett et al. | |
| 6,546,002 B1 | 4/2003 | Kim | |
| 6,549,768 B1 | 4/2003 | Fraccaroli | |
| 6,564,149 B2 | 5/2003 | Lai | |
| 6,650,189 B1 | 11/2003 | Romao | |
| 6,662,023 B1 | 12/2003 | Helle | |
| 6,678,508 B1 | 1/2004 | Koilpillai et al. | |
| 6,799,047 B1 | 9/2004 | Bahl et al. | |
| 6,847,892 B2 | 1/2005 | Zhou et al. | |
| 6,920,455 B1 | 7/2005 | Weschler | |
| 6,941,134 B2 | 9/2005 | White | |
| 6,990,353 B2 | 1/2006 | Florkey et al. | |
| 7,058,659 B2 | 6/2006 | Ryu | |
| 7,076,797 B2 | 7/2006 | Loveland | |
| 7,096,030 B2 | 8/2006 | Huomo | |
| 7,142,848 B2 | 11/2006 | Owen et al. | |
| 7,161,914 B2 | 1/2007 | Shoaib et al. | |
| 7,171,557 B2 | 1/2007 | Kallahalla et al. | |
| 7,200,394 B2 | 4/2007 | Aoki et al. | |
| 7,212,613 B2 | 5/2007 | Kim et al. | |
| 7,222,360 B1 | 5/2007 | Miller | |
| 7,272,388 B2 | 9/2007 | Andrew et al. | |
| 7,274,925 B2 | 9/2007 | Chaar et al. | |
| 7,302,272 B2 | 11/2007 | Ackley | |
| 7,305,284 B2 | 12/2007 | Teshima et al. | |
| 7,308,255 B2 | 12/2007 | Loveland | |
| 7,321,774 B1 | 1/2008 | Lau et al. | |
| 7,346,921 B2 | 3/2008 | Murren et al. | |
| 7,353,234 B2 | 4/2008 | Kimball et al. | |
| 7,359,713 B1 | 4/2008 | Tiwari | |
| 7,366,795 B2 | 4/2008 | O'Neil et al. | |
| 7,366,798 B2 | 4/2008 | Nordstrom et al. | |
| 7,397,908 B2 | 7/2008 | Janssen | |
| 7,408,506 B2 | 8/2008 | Miller | |
| 7,471,929 B2 | 12/2008 | Fujioka et al. | |
| 7,530,099 B2 | 5/2009 | Flurry et al. | |
| 7,548,757 B2 | 6/2009 | Major | |
| 7,565,157 B1 | 7/2009 | Ortega et al. | |
| 7,629,891 B1 | 12/2009 | Bell | |
| 7,634,455 B1 | 12/2009 | Keene et al. | |
| 7,657,849 B2 | 2/2010 | Chaudhri et al. | |
| 7,668,830 B2 | 2/2010 | Hakala | |
| 7,680,882 B2 | 3/2010 | Tiu et al. | |
| 7,714,778 B2 | 5/2010 | Dupray | |
| 7,796,944 B2 | 9/2010 | Eaton et al. | |
| 7,809,350 B2 | 10/2010 | Buckley et al. | |
| 7,869,792 B1 | 1/2011 | Zhou et al. | |
| 7,898,428 B2 | 3/2011 | Dietz et al. | |
| 7,958,562 B2 | 6/2011 | Gaucas | |
| 7,961,651 B2 | 6/2011 | Kim et al. | |
| 7,962,156 B2 | 6/2011 | Robertson et al. | |
| 7,987,378 B2 | 7/2011 | Lee et al. | |
| 8,024,112 B2 | 9/2011 | Krumm et al. | |
| 8,046,839 B2 | 10/2011 | Lo | |
| 8,228,234 B2 | 7/2012 | Paulson et al. | |
| 8,244,272 B2 | 8/2012 | Morgan et al. | |
| 8,275,352 B2 | 9/2012 | Forstall et al. | |
| 8,311,730 B2 | 11/2012 | Neff | |
| 8,331,899 B2 | 12/2012 | Broms et al. | |
| 8,355,751 B2 | 1/2013 | Dietz et al. | |
| 8,385,039 B2 | 2/2013 | Rothkopf | |
| 8,433,334 B2 | 4/2013 | Huang et al. | |
| 8,437,779 B2 | 5/2013 | Phukan | |
| 8,477,139 B2 | 7/2013 | Robinet et al. | |
| 8,549,657 B2 | 10/2013 | Karlson et al. | |
| 8,565,820 B2 | 10/2013 | Riemer et al. | |
| 8,639,803 B2 | 1/2014 | Moritz et al. | |
| 8,657,743 B2 | 2/2014 | Rietzel et al. | |
| 8,660,531 B2 | 2/2014 | Hymel | |
| 8,706,172 B2 | 4/2014 | Priyantha et al. | |
| 8,732,822 B2 | 5/2014 | Schechter et al. | |
| 8,826,013 B1 | 9/2014 | Kodukula et al. | |
| 8,874,162 B2 | 10/2014 | Schrader et al. | |
| 8,907,772 B1 * | 12/2014 | Green | G07C 5/008 340/438 |
| 8,918,119 B2 | 12/2014 | Kim et al. | |
| 9,019,077 B2 | 4/2015 | Hazzani | |
| 9,027,117 B2 | 5/2015 | Wilairat | |
| 9,066,234 B2 | 6/2015 | Karlson et al. | |
| 9,230,076 B2 | 1/2016 | King et al. | |
| 9,363,250 B2 | 6/2016 | Matthews et al. | |
| 9,420,432 B2 | 8/2016 | Matthews et al. | |
| 9,467,834 B2 | 10/2016 | Guday et al. | |
| 9,491,589 B2 | 11/2016 | Schrader et al. | |
| 2001/0005681 A1 | 6/2001 | Kim | |
| 2001/0039587 A1 | 11/2001 | Uhler et al. | |
| 2002/0026478 A1 | 2/2002 | Rodgers et al. | |
| 2002/0044149 A1 | 4/2002 | McCarthy et al. | |
| 2002/0160764 A1 | 10/2002 | Gorsuch | |
| 2003/0003907 A1 | 1/2003 | Lai et al. | |
| 2003/0139192 A1 | 7/2003 | Chmaytelli et al. | |
| 2003/0187803 A1 | 10/2003 | Pitt | |
| 2004/0007916 A1 | 1/2004 | Awada et al. | |
| 2004/0015940 A1 | 1/2004 | Heisey et al. | |
| 2004/0039909 A1 | 2/2004 | Cheng | |
| 2004/0166878 A1 | 8/2004 | Erskine et al. | |
| 2004/0192352 A1 | 9/2004 | Vallstrom et al. | |
| 2004/0203576 A1 | 10/2004 | Droste et al. | |
| 2004/0243812 A1 | 12/2004 | Yui et al. | |
| 2005/0012640 A1 | 1/2005 | Kong et al. | |
| 2005/0037775 A1 | 2/2005 | Moeglein et al. | |
| 2005/0055567 A1 | 3/2005 | Libin et al. | |
| 2005/0059418 A1 | 3/2005 | Northcutt et al. | |
| 2005/0070276 A1 | 3/2005 | McGarry | |
| 2005/0107114 A1 | 5/2005 | Ocock | |
| 2005/0138110 A1 | 6/2005 | Redlich et al. | |
| 2005/0143171 A1 | 6/2005 | Loose | |
| 2005/0210104 A1 | 9/2005 | Torvinen | |
| 2005/0222768 A1 | 10/2005 | Tauchi et al. | |
| 2006/0046706 A1 | 3/2006 | Lin et al. | |
| 2006/0053389 A1 | 3/2006 | Michelman | |
| 2006/0099969 A1 | 5/2006 | Staton et al. | |
| 2006/0136998 A1 | 6/2006 | Oowaki et al. | |

(56) References Cited

U.S. PATENT DOCUMENTS

| | | |
|---|---|---|
| 2006/0246872 A1 | 11/2006 | Tarkkala |
| 2006/0253570 A1 | 11/2006 | Biswas et al. |
| 2006/0256005 A1 | 11/2006 | Thandu et al. |
| 2006/0271797 A1 | 11/2006 | Ginggen et al. |
| 2006/0293057 A1 | 12/2006 | Mazerski et al. |
| 2007/0006327 A1 | 1/2007 | Lal et al. |
| 2007/0028176 A1 | 2/2007 | Perdomo et al. |
| 2007/0032225 A1 | 2/2007 | Konicek et al. |
| 2007/0042790 A1 | 2/2007 | Mohi et al. |
| 2007/0046423 A1 | 3/2007 | Baucom |
| 2007/0046456 A1 | 3/2007 | Edwards et al. |
| 2007/0064882 A1 | 3/2007 | Ger et al. |
| 2007/0067655 A1 | 3/2007 | Shuster |
| 2007/0072616 A1 | 3/2007 | Irani |
| 2007/0073832 A1 | 3/2007 | Curtis et al. |
| 2007/0082707 A1 | 4/2007 | Flynt et al. |
| 2007/0091037 A1 | 4/2007 | Lee |
| 2007/0111726 A1 | 5/2007 | Lambert et al. |
| 2007/0120948 A1* | 5/2007 | Fujioka .............. H04M 1/66 348/14.01 |
| 2007/0150826 A1 | 6/2007 | Anzures et al. |
| 2007/0150842 A1 | 6/2007 | Chaudhri et al. |
| 2007/0168971 A1 | 7/2007 | Royzen et al. |
| 2007/0180509 A1 | 8/2007 | Swartz et al. |
| 2007/0218938 A1 | 9/2007 | Carter |
| 2007/0245398 A1 | 10/2007 | Roden |
| 2007/0264981 A1 | 11/2007 | Miller |
| 2007/0275767 A1 | 11/2007 | Steele |
| 2007/0300140 A1 | 12/2007 | Makela et al. |
| 2008/0014964 A1 | 1/2008 | Sudit et al. |
| 2008/0020803 A1 | 1/2008 | Rios et al. |
| 2008/0032703 A1 | 2/2008 | Krumm et al. |
| 2008/0051079 A1 | 2/2008 | Forsgren |
| 2008/0070593 A1 | 3/2008 | Altman et al. |
| 2008/0080688 A1 | 4/2008 | Burgan et al. |
| 2008/0082693 A1 | 4/2008 | Meijer et al. |
| 2008/0096518 A1 | 4/2008 | Mock et al. |
| 2008/0096519 A1 | 4/2008 | Miegel |
| 2008/0101658 A1 | 5/2008 | Ahern et al. |
| 2008/0104225 A1 | 5/2008 | Zhang et al. |
| 2008/0111698 A1 | 5/2008 | Atherton |
| 2008/0140650 A1 | 6/2008 | Stackpole |
| 2008/0154780 A1 | 6/2008 | Soukup et al. |
| 2008/0184127 A1 | 7/2008 | Rafey et al. |
| 2008/0254767 A1 | 10/2008 | Jin |
| 2008/0256170 A1 | 10/2008 | Hayashi et al. |
| 2008/0268870 A1 | 10/2008 | Houri |
| 2008/0305808 A1 | 12/2008 | Chan et al. |
| 2008/0311947 A1 | 12/2008 | Soerensen et al. |
| 2008/0318595 A1 | 12/2008 | Rofougaran |
| 2009/0005061 A1 | 1/2009 | Ward et al. |
| 2009/0005080 A1 | 1/2009 | Forstall et al. |
| 2009/0006566 A1 | 1/2009 | Veeramachaneni et al. |
| 2009/0006991 A1 | 1/2009 | Lindberg et al. |
| 2009/0045927 A1* | 2/2009 | Atella ................ G08G 1/207 340/425.5 |
| 2009/0089886 A1 | 4/2009 | Cheng et al. |
| 2009/0093688 A1 | 4/2009 | Mathur |
| 2009/0116703 A1 | 5/2009 | Schultz |
| 2009/0119590 A1 | 5/2009 | Kondziela et al. |
| 2009/0143082 A1 | 6/2009 | Begeja et al. |
| 2009/0157560 A1 | 6/2009 | Carter et al. |
| 2009/0158389 A1 | 6/2009 | Waltenberg et al. |
| 2009/0170532 A1 | 7/2009 | Lee et al. |
| 2009/0197617 A1 | 8/2009 | Jayanthi |
| 2009/0201896 A1 | 8/2009 | Davis et al. |
| 2009/0205041 A1 | 8/2009 | Michalske |
| 2009/0224931 A1 | 9/2009 | Dietz et al. |
| 2009/0265794 A1 | 10/2009 | Apelqvist |
| 2009/0270034 A1 | 10/2009 | Suzuki |
| 2009/0278738 A1 | 11/2009 | Gopinath |
| 2009/0282473 A1 | 11/2009 | Karlson et al. |
| 2009/0298475 A1 | 12/2009 | Czaja et al. |
| 2010/0001967 A1 | 1/2010 | Yoo |
| 2010/0004005 A1 | 1/2010 | Pereira et al. |
| 2010/0010733 A1 | 1/2010 | Krumm |
| 2010/0020035 A1 | 1/2010 | Ryu et al. |
| 2010/0045519 A1 | 2/2010 | Lee |
| 2010/0056124 A1 | 3/2010 | Keating et al. |
| 2010/0066821 A1 | 3/2010 | Rosener et al. |
| 2010/0069007 A1 | 3/2010 | Nagasawa |
| 2010/0070334 A1 | 3/2010 | Monteverde |
| 2010/0074450 A1 | 3/2010 | Liao |
| 2010/0082247 A1 | 4/2010 | Klein et al. |
| 2010/0115610 A1 | 5/2010 | Tredoux et al. |
| 2010/0127836 A1 | 5/2010 | Huang et al. |
| 2010/0134310 A1 | 6/2010 | Zheng et al. |
| 2010/0162180 A1 | 6/2010 | Dunnam et al. |
| 2010/0167714 A1 | 7/2010 | Howarter et al. |
| 2010/0190479 A1 | 7/2010 | Scott et al. |
| 2010/0210301 A1 | 8/2010 | Dietz et al. |
| 2010/0216509 A1 | 8/2010 | Riemer et al. |
| 2010/0217646 A1 | 8/2010 | Siegel |
| 2010/0227588 A1 | 9/2010 | Bradley |
| 2010/0231383 A1 | 9/2010 | Levine et al. |
| 2010/0235881 A1 | 9/2010 | Liu et al. |
| 2010/0253503 A1 | 10/2010 | Juang |
| 2010/0255856 A1 | 10/2010 | Kansal et al. |
| 2010/0268779 A1 | 10/2010 | Rao |
| 2010/0271651 A1 | 10/2010 | Kimura |
| 2010/0285815 A1 | 11/2010 | Treu et al. |
| 2010/0302028 A1 | 12/2010 | Desai et al. |
| 2010/0306705 A1 | 12/2010 | Nilsson |
| 2010/0306832 A1 | 12/2010 | Mu et al. |
| 2010/0311336 A1 | 12/2010 | Huotari et al. |
| 2010/0313050 A1 | 12/2010 | Harrat et al. |
| 2010/0321155 A1 | 12/2010 | Ballard |
| 2010/0323715 A1 | 12/2010 | Winters |
| 2010/0324819 A1 | 12/2010 | Nurminen et al. |
| 2011/0010340 A1 | 1/2011 | Hung et al. |
| 2011/0021213 A1 | 1/2011 | Carr |
| 2011/0021234 A1 | 1/2011 | Tibbitts et al. |
| 2011/0047484 A1 | 2/2011 | Mount et al. |
| 2011/0063098 A1* | 3/2011 | Fischer ............ G07C 9/00119 340/439 |
| 2011/0065419 A1 | 3/2011 | Book et al. |
| 2011/0070829 A1 | 3/2011 | Griffin et al. |
| 2011/0088086 A1 | 4/2011 | Swink et al. |
| 2011/0093161 A1 | 4/2011 | Zhou et al. |
| 2011/0099486 A1 | 4/2011 | Nesladek et al. |
| 2011/0111728 A1 | 5/2011 | Ferguson et al. |
| 2011/0151839 A1 | 6/2011 | Bolon et al. |
| 2011/0167342 A1 | 7/2011 | de la Pena et al. |
| 2011/0167344 A1 | 7/2011 | Pan |
| 2011/0169654 A1 | 7/2011 | Ketari |
| 2011/0171958 A1 | 7/2011 | Hua et al. |
| 2011/0197160 A1 | 8/2011 | Kim et al. |
| 2011/0208430 A1 | 8/2011 | Tun et al. |
| 2011/0215903 A1 | 9/2011 | Yang et al. |
| 2011/0215952 A1 | 9/2011 | Aria et al. |
| 2011/0237221 A1 | 9/2011 | Prakash et al. |
| 2011/0241827 A1 | 10/2011 | Varoglu |
| 2011/0244837 A1 | 10/2011 | Murata et al. |
| 2011/0247045 A1 | 10/2011 | Rajagopal et al. |
| 2011/0250840 A1 | 10/2011 | Lee et al. |
| 2011/0254792 A1 | 10/2011 | Waters et al. |
| 2011/0264246 A1 | 10/2011 | Pantoja et al. |
| 2011/0267171 A1 | 11/2011 | Li et al. |
| 2011/0275321 A1 | 11/2011 | Zhou et al. |
| 2011/0276901 A1 | 11/2011 | Zambetti et al. |
| 2011/0283185 A1 | 11/2011 | Obasanjo et al. |
| 2011/0283241 A1 | 11/2011 | Miller et al. |
| 2011/0283311 A1 | 11/2011 | Luong |
| 2011/0285271 A1 | 11/2011 | Liu et al. |
| 2011/0299422 A1 | 12/2011 | Kim et al. |
| 2011/0307166 A1 | 12/2011 | Hiestermann et al. |
| 2011/0317162 A1 | 12/2011 | DeFreez et al. |
| 2011/0319051 A1 | 12/2011 | Reitnour |
| 2011/0319094 A1 | 12/2011 | Usui et al. |
| 2012/0009896 A1 | 1/2012 | Bandyopadhyay et al. |
| 2012/0023573 A1 | 1/2012 | Shi |
| 2012/0046020 A1 | 2/2012 | Tomasini |
| 2012/0084691 A1 | 4/2012 | Yun |
| 2012/0084734 A1 | 4/2012 | Wilairat |

(56) References Cited

U.S. PATENT DOCUMENTS

| | | | |
|---|---|---|---|
| 2012/0084737 A1 | 4/2012 | Gimpl et al. | |
| 2012/0089217 A1 | 4/2012 | Mews et al. | |
| 2012/0098768 A1 | 4/2012 | Bendewald et al. | |
| 2012/0100895 A1 | 4/2012 | Priyantha et al. | |
| 2012/0115512 A1 | 5/2012 | Grainger et al. | |
| 2012/0144468 A1 | 6/2012 | Pratt et al. | |
| 2012/0146850 A1 | 6/2012 | Liu et al. | |
| 2012/0158289 A1 | 6/2012 | Bernheim Brush et al. | |
| 2012/0166452 A1 | 6/2012 | Tseng | |
| 2012/0166548 A1 | 6/2012 | Gropper | |
| 2012/0234058 A1 | 9/2012 | Neil et al. | |
| 2012/0242906 A1 | 9/2012 | Shintani et al. | |
| 2012/0244883 A1 | 9/2012 | Tibbitts et al. | |
| 2012/0245838 A1* | 9/2012 | Van Doorselaer | G01C 15/002 701/408 |
| 2012/0252418 A1 | 10/2012 | Kandekar et al. | |
| 2012/0268249 A1 | 10/2012 | Kansal et al. | |
| 2012/0282887 A1 | 11/2012 | Khoo et al. | |
| 2012/0284297 A1 | 11/2012 | Aguera-Arcas et al. | |
| 2012/0289217 A1 | 11/2012 | Riemer et al. | |
| 2012/0289244 A1 | 11/2012 | Goyal | |
| 2012/0302256 A1 | 11/2012 | Pai et al. | |
| 2012/0302258 A1 | 11/2012 | Pai et al. | |
| 2012/0302556 A1 | 11/2012 | Hurt et al. | |
| 2012/0306637 A1 | 12/2012 | McGough et al. | |
| 2012/0306699 A1 | 12/2012 | Schlesinger et al. | |
| 2012/0311499 A1 | 12/2012 | Dellinger et al. | |
| 2012/0317162 A1 | 12/2012 | Endsley et al. | |
| 2013/0006469 A1* | 1/2013 | Green | G07C 5/008 701/36 |
| 2013/0018581 A1 | 1/2013 | Sidhu et al. | |
| 2013/0023246 A9 | 1/2013 | Ellingham et al. | |
| 2013/0031601 A1 | 1/2013 | Bott | |
| 2013/0036211 A1 | 2/2013 | Messer et al. | |
| 2013/0040629 A1 | 2/2013 | Sprigg et al. | |
| 2013/0040654 A1 | 2/2013 | Parish | |
| 2013/0040711 A1 | 2/2013 | Kim et al. | |
| 2013/0055348 A1 | 2/2013 | Strauss et al. | |
| 2013/0072172 A1 | 3/2013 | Chang et al. | |
| 2013/0084847 A1* | 4/2013 | Tibbitts | H04W 8/245 455/419 |
| 2013/0093707 A1 | 4/2013 | Park et al. | |
| 2013/0130742 A1 | 5/2013 | Dietz et al. | |
| 2013/0158867 A1 | 6/2013 | Sidhu et al. | |
| 2013/0188503 A1 | 7/2013 | Anepu et al. | |
| 2013/0217416 A1 | 8/2013 | Matthews et al. | |
| 2013/0225151 A1 | 8/2013 | King et al. | |
| 2013/0225152 A1 | 8/2013 | Matthews et al. | |
| 2013/0227431 A1 | 8/2013 | Vasudevan et al. | |
| 2013/0295872 A1 | 11/2013 | Guday et al. | |
| 2013/0295913 A1 | 11/2013 | Matthews et al. | |
| 2013/0298037 A1 | 11/2013 | Matthews et al. | |
| 2013/0303143 A1 | 11/2013 | Schrader et al. | |
| 2013/0305319 A1 | 11/2013 | Matthews et al. | |
| 2013/0305354 A1 | 11/2013 | King et al. | |
| 2014/0024354 A1 | 1/2014 | Haik et al. | |
| 2014/0068755 A1 | 3/2014 | King et al. | |
| 2014/0189608 A1 | 7/2014 | Shuttleworth et al. | |
| 2014/0199966 A1 | 7/2014 | Schushan | |
| 2015/0011203 A1 | 1/2015 | Schrader et al. | |
| 2015/0074615 A1 | 3/2015 | Han et al. | |
| 2015/0213252 A1 | 7/2015 | Wilairat | |
| 2015/0220712 A1 | 8/2015 | King et al. | |
| 2015/0286840 A1 | 10/2015 | Karlson et al. | |
| 2016/0197968 A1 | 7/2016 | Vasudevan et al. | |
| 2016/0248906 A1 | 8/2016 | Schrader et al. | |
| 2016/0328902 A1 | 11/2016 | Matthews et al. | |

FOREIGN PATENT DOCUMENTS

| | | |
|---|---|---|
| CN | 101251589 A | 8/2008 |
| CN | 101378568 A | 3/2009 |
| CN | 101569212 A | 10/2009 |
| CN | 101617304 A | 12/2009 |
| CN | 101778165 A | 7/2010 |
| CN | 101785038 A | 7/2010 |
| CN | 101815116 A | 8/2010 |
| CN | 101828162 A | 9/2010 |
| CN | 102006550 A | 4/2011 |
| CN | 102204374 A | 9/2011 |
| CN | 102239469 A | 11/2011 |
| CN | 102239740 A | 11/2011 |
| EP | 2169946 A2 | 3/2010 |
| EP | 2293016 A2 | 3/2011 |
| EP | 2369864 A2 | 9/2011 |
| EP | 2451139 A1 | 5/2012 |
| EP | 2469442 A1 | 6/2012 |
| JP | 07203015 A | 8/1995 |
| JP | 2000270048 A | 9/2000 |
| JP | 2002142010 A | 5/2002 |
| JP | 2002530783 A | 9/2002 |
| JP | 2003032353 A | 1/2003 |
| JP | 2005303509 A | 10/2005 |
| JP | 2005340976 A | 12/2005 |
| JP | 2006146598 A | 6/2006 |
| JP | 2006279506 A | 10/2006 |
| JP | 2006303732 A | 11/2006 |
| JP | 2007257140 A | 10/2007 |
| JP | 2009017239 A | 1/2009 |
| JP | 2009521753 A | 6/2009 |
| JP | 2009172239 A | 8/2009 |
| JP | 2010503082 A | 1/2010 |
| JP | 2011199637 A | 10/2011 |
| JP | 2011216043 A | 10/2011 |
| JP | 2012049688 A | 3/2012 |
| JP | 2013041512 A | 2/2013 |
| JP | 2013540321 A | 10/2013 |
| KR | 1020050037613 A | 4/2005 |
| KR | 1020100083396 A | 7/2010 |
| KR | 1020110093528 A | 8/2011 |
| KR | 1020110119283 A | 11/2011 |
| WO | 2005031544 A2 | 4/2005 |
| WO | 2006054858 A1 | 5/2006 |
| WO | 2006088273 A1 | 8/2006 |
| WO | 2006099535 A1 | 9/2006 |
| WO | 2007130123 A1 | 11/2007 |
| WO | 2009016505 A2 | 2/2009 |
| WO | 2009105666 A1 | 8/2009 |
| WO | 2010065752 A2 | 6/2010 |
| WO | 2010147610 A1 | 12/2010 |
| WO | 2011035390 A1 | 3/2011 |
| WO | 2011135359 A1 | 11/2011 |
| WO | 2012047412 A1 | 4/2012 |
| WO | 2013061156 A2 | 5/2013 |

OTHER PUBLICATIONS

"BroadCloud FamilyCenter", Retrieved on: Dec. 13, 2011, <<http://www.broadsoft.com/pdf/datasheet-broadcloud-familycenter.pdf>>, 1 Page.

"CameraLock Cydia Tweak—Add a Camera Button to Your Lockscreen Without iOS 5—iPhone & iPod Touch", Published on: Jun. 21, 2011, Available at: <<https://www.youtube.com/watch?v=ECGm54OB6e0>>, 1 Page.

"Distracted Driving Information Clearinghouse", Retrieved on: Jul. 27, 2011, Available at: <<https://www.fcc.gov/encyclopedia/distracted-driving-information-clearinghouse>>, 4 Pages.

"How Can I See a List of All Users on the Logon Screen?", Published on: Dec. 4, 2014, Available at: <<http://superuser.com/questions/354856/how-can-i-see-a-list-of-all-users-on-the-logon-screen>>, 2 Pages.

"How Can One Add an Image to the Windows 7 Login Screen?", Published on: Sep. 5, 2012, Available at: <<http://superuser.com/questions/470568/how-can-one-add-an-image-to-the-windows-7-login-screen>>, 4 Pages.

"How to Use the Lock Screen Camera in iOS 5.1", Published on: Mar. 8, 2012, Available at: <<http://osxdaily.com/2012/03/08/lock-screen-camera-ios-5-1/>>, 9 Pages.

"iCloud: What you need to know", Published on: Jun. 8, 2011, Available at: <<http://www.macworld.com/article/1160380/icloud_what_you_need_to_know.html>>, 16 Pages.

(56) References Cited

OTHER PUBLICATIONS

"Ignite Where & Launch Pad", Retrieved from <<http://web.archive.org/web/20081225025519/http://en.oreilly.com/where2008/public/schedule/detail/2572>>, May 12, 2008, 4 Pages.
"In Case of Emergency (ICE) and Smart Phones with Lock Screens", Retrieved on: Mar. 29, 2011, Available at: <<http://arstechnica.com/civis/viewtopic.php?f=20&t=1140661>>, 9 Pages.
"iOS 5", Retrieved From <<https://en.wikipedia.org/wiki/IOS_5>>, Oct. 12, 2011, 6 Pages.
"iPad Parental Control (restricting app access)", Retrieved From <<http://web.archive.org/web/20120210062535/http://ipaded.net/ipad/parental-control/>>, Feb. 29, 2012, 5 Pages.
"Location-Based Social Networking Marketing White Paper", The Marketer's Guide to Location-based Social Networks, Published by Anvil Media, Aug. 2, 2010, 14 Pages.
"Manage User Accounts", Retrieved From <<http://web.archive.org/web/20120116160807/http://www.vista4beginners.com/Manage-User-Accounts>>, May 8, 2007, 13 Pages.
"Mobile Phone Match-Up", Retrieved From <<http://web.archive.org/web/20100930011941/http://www.microsoft.com/windowsmobile/en-us/meet/version-compare.mspx>>, Jul. 27, 2010, 4 Pages.
"Mobile Task Tracker Screen Shots", Retrieved From <<http://www.mobiletasktracker.com/Screen%20Shots.html>>, Jul. 13, 2011, 4 Pages.
"Parental Control Software for Cell Phones", Retrieved From <<http://web.archive.org/web/20110812052848/http://www.parentalcontrolcellphones.com/>>, Aug. 12, 2011, 5 Pages.
"Restrict access to applications using AppLocker", Retrieved From <<http://web.archive.org/web/20120129190518/http://www.dq.winsila.com/tips-tricks/restrict-access-to-applications-using-applocker.html>>, Jan. 5, 2012, 2 Pages.
"Restrict Access to Programs with AppLocker in Windows 7", Retrieved From <<http://www.howtogeek.com/howto/6317/block-users-from-using-certain-applications-with-applocker/>>, Dec. 13, 2014, 8 Pages.
"Safe Driving System", Retrieved From <<http://web.archive.org/web/20100512220953/http://key2safedriving.com/>>, May 12, 2010, 2 Pages.
"Setting up and using Smart Unlock on the Samsung Jet", Retrieved From <<http://www.knowyourmobile.com/samsung/6063/setting-and-using-smart-unlock-samsung-jet>>, Sep. 10, 2009, 5 Pages.
"Setting Up Simple Restricted Access", Retrieved From <<http://support.webvanta.com/support_article/615777-setting-up-simple-restricted-access>>, Oct. 13, 2011, 3 Pages.
"Timeline of Microsoft Windows", Retrieved From <<https://en.wikipedia.org/wiki/Timeline_of_Microsoft_Windows>>, Dec. 14, 2014, 5 Pages.
"T-Mobile G1 Google Android Phone-Gesture Unlocking", Retrieved From <<http://www.gadgetuniversegift.com/?p=2121%3E>>, Jun. 20, 2010, 2 Pages.
"T-Mobile G1 User Manual", Retrieved From <<http://www.manualslib.com/manual/574808/T-Mobile-G1.html#manual>>, May 27, 2009, 5 Pages.
"Welcome to Sprint Drive First", Retrieved From <<http://web.archive.org/web/20130430154121/https://drivetfirst.sprint.com/welcome.htm>>, Nov. 20, 2013, 2 Pages.
"What's an Android? and Other Smart(phone) Questions", Retrieved From <<http://web.archive.org/web/20101002203706/http://www.bestbuybusinessdistrict.com/knowlege-center/58-what's-an-android-and-other-smart-phone-questions>>, Sep. 6, 2010, 4 Pages.
"Your Very Own Support Geek", Retrieved From <<http://yoursupportgeek.info/miscellaneous-geek-stuff/t-mobile-uk-to-offer-icd-vega-15-inch-tegra-android-tablet-in-2010>>, Retrieved on: Dec. 13, 2011, 2 Pages.
"Supplementary Search Report Issued in European Patent Application No. 09747072.8", Mailed Date: Jan. 17, 2013, 5 Pages.
"Office Action Issued in European Patent Application No. 11831134.9", Mailed Date May 9, 2014, 5 Pages.
"Supplementary Search Report Issued in European Patent Application No. 11831134.9", Mailed Date: Apr. 3, 2014, 3 Pages.
"Final Office Action Issued in U.S. Appl. No. 12/194,213", Mailed Date: Sep. 20, 2011, 12 Pages.
"Non-Final Office Action Issued in U.S. Appl. No. 12/194,213", Mailed Date: Mar. 17, 2011, 12 Pages.
"Notice of Allowance Issued in U.S. Appl. No. 12/194,213", Mailed Date: Jun. 27, 2012, 16 Pages.
"Notice of Allowance Issued in U.S. Appl. No. 12/194,213", Mailed Date: Dec. 21, 2012, 13 Pages.
"Notice of Allowance Issued in U.S. Appl. No. 12/194,213", Mailed Date: May 31, 2013, 11 Pages.
"Final Office Action Issued in U.S. Appl. No. 12/417,752", Mailed Date: Sep. 13, 2012, 18 Pages.
"Final Office Action Issued in U.S. Appl. No. 12/417,752", Mailed Date: Jul. 17, 2013, 18 Pages.
"Final Office Action Issued in U.S. Appl. No. 12/417,752", Mailed Date: Feb. 25, 2014, 22 Pages.
"Non-Final Office Action Issued in U.S. Appl. No. 12/417,752", Mailed Date: Oct. 29, 2013, 16 Pages.
"Non-Final Office Action Issued in U.S. Appl. No. 12/417,752", Mailed Date: May 24, 2013, 17 Pages.
"Non-Final Office Action Issued in U.S. Appl. No. 12/417,752", Mailed Date: Jun. 28, 2011, 14 Pages.
"Final Office Action Issued in U.S. Appl. No. 12/897,586", Mailed Date: May 22, 2013, 13 Pages.
"Non-Final Office Action Issued in U.S. Appl. No. 12/897,586", Mailed Date: May 8, 2014, 13 Pages.
"Non-Final Office Action Issued in U.S. Appl. No. 12/897,586", Mailed Date: Oct. 18, 2012, 12 Pages.
"Notice of Allowance Issued in U.S. Appl. No. 12/897,586", Mailed Date: Jan. 5, 2015, 12 Pages.
"Notice of Allowance Issued in U.S Appl. No. 12/897,586", Mailed Date: Oct. 15, 2014, 13 Pages.
"Supplemental Notice of Allowance Issued in U.S. Appl. No. 12/897,586", Mailed Date: Mar. 3, 2015, 2 Pages.
"Final Office Action Issued in U.S. Appl. No. 12/912,456", Mailed Date: Sep. 6, 2013, 22 Pages.
"Final Office Action Issued in U.S. Appl. No. 12/912,456", Mailed Date: Jan. 9, 2013, 21 Pages.
"Non-Final Office Action Issued in U.S. Appl. No. 12/912,456", Mailed Date: May 4, 2012, 14 Pages.
"Non-Final Office Action Issued in U.S. Appl. No. 12/912,456", Mailed Date: Sep. 11, 2012, 15 Pages.
"Non-Final Office Action Issued in U.S. Appl. No. 12/912,456", Mailed Date: May 29, 2013, 22 Pages.
"Notice of Allowance Issued in U.S. Appl. No. 12/912,456", Mailed Date: Jan. 7, 2014, 9 Pages.
"Office Action Issued in European Patent Application No. 12859485.0", Mailed Date: Feb. 12, 2015, 5 Pages.
"Supplementary Search Report Issued in European Patent Application No. 12859485.0", Mailed Date: Jan. 23, 2015, 4 Pages.
"Office Action Issued in European Patent Application No. 12859600A", Mailed Date: Jun. 1, 2015, 8 Pages.
"Supplementary Search Report Issued in European Patent Application No. 12859600.4", Mailed Date: May 13, 2015, 7 Pages.
"Office Action Issued in European Patent Application No. 128599721", Mailed Date: May 26, 2015, 6 Pages.
"Supplementary European Search Report Issued in European Patent Application No. 128599721", Mailed Date: Apr. 30, 2015, 3 Pages.
"Office Action Issued in European Patent Application No. 12860373.5", Mailed Date: Jul. 7, 2015, 6 Pages.
"Supplementary Search Report Issued in European Patent Application No. 12860373.5", Mailed Date: Jun. 25, 2015, 3 Pages.
"Office Action Issued in European Patent Application No. 12860403.0", Mailed Date: May 20, 2015, 4 Pages.
"Supplementary Search Report Issued in European Patent Application No. 12860403.0", Mailed Date: May 4, 2015, 3 Pages.
"Office Action Issued in European Patent Application No. 12860631.6", Mailed Date: Feb. 16, 2015, 5 Pages.
"Office Action Issued in European Patent Application No. 12860631.6", Mailed Date: Apr. 21, 2016, 5 Pages.

(56) References Cited

OTHER PUBLICATIONS

"Search Report Issued in European Patent Application No. 12860631.6", Mailed Date: Jan. 5, 2015, 3 Pages.
"Supplementary European Search Report Issued in Patent Application No. 12883789.5", Mailed Date: Apr. 22, 2016, 7 Pages.
"Final Office Action Issued in U.S. Appl. No. 13/090,474", Mailed Date: Nov. 25, 2014, 14 Pages.
"Final Office Action Issued in U.S. Appl. No. 13/090,474", Mailed Date: Nov. 21, 2013, 12 Pages.
"Non-Final Office Action Issued in U.S. Appl. No. 13/090,474", Mailed Date: Apr. 26, 2013, 11 Pages.
"Non-Final Office Action Issued in U.S. Appl. No. 13/090,474", Mailed Date: May 6, 2014, 13 Pages.
"Non-Final Office Action Issued in U.S. Appl. No. 13/090,474", Mailed Date: Apr. 8, 2015, 12 Pages.
"Final Office Action Issued in U.S. Appl. No. 13/222,538", Mailed Date: May 28, 2013, 44 Pages.
"Non-Final Office Action Issued in U.S. Appl. No. 13/222,538", Mailed Date: Oct. 11, 2013, 39 Pages.
"Non-Final Office Action Issued in U.S. Appl. No. 13/222,538", Mailed Date: Feb. 14, 2013, 33 Pages.
"Non-Final Office Action Issued in U.S. Appl. No. 13/328,312", Mailed Date: Aug. 6, 2013, 19 Pages.
"Amendment filed on U.S. Appl. No. 13/726,027", Mailed Date: Dec. 14, 2015, 11 Pages.
"Final Office Action Issued in U.S. Appl. No. 13/726,027", Mailed Date: Apr. 14, 2016, 22 Pages.
"Final Office Action Issued in U.S. Appl. No. 13/726,027", Mailed Date: Jan. 5, 2015, 20 Pages.
"Non-Final Office Action Issued in U.S. Appl. No. 13/726,027", Mailed Date: Jun. 24, 2014, 18 Pages.
"Non-Final Office Action Issued in U.S. Appl. No. 13/726,027", Mailed Date: Aug. 13, 2015, 20 Pages.
"Amendment filed on U.S. Appl. No. 13/726,031", Mailed Date: Nov. 25, 2015, 12 Pages.
"Final Office Action Issued in U.S. Appl. No. 13/726,031", Mailed Date: Apr. 13, 2015, 15 Pages.
"Non-Final Office Action Issued in U.S. Appl. No. 13/726,031", Mailed Date: Aug. 27, 2015, 18 Pages.
"Non-Final Office Action Issued in U.S. Appl. No. 13/726,031", Mailed Date: Jul. 8, 2014, 14 Pages.
"Amendment filed on U.S. Appl. No. 13/726,040", Mailed Date: Feb. 1, 2016, 9 Pages.
"Final Office Action Issued in U.S. Appl. No. 13/726,040", Mailed Date: Dec. 1, 2015, 18 Pages.
"Non-Final Office Action Issued in U.S. Appl. No. 13/726,040", Mailed Date: Aug. 25, 2015, 16 Pages.
"Non-Final Office Action Issued in U.S. Appl. No. 13/726,040", Mailed Date: Jan. 28, 2015, 15 Pages.
"Notice of Allowance Issued in U.S. Appl. No. 13/726,040", Mailed Date: Feb. 18, 2016, 5 Pages.
"Amendment filed on U.S. Appl. No. 13/726,043", Mailed Date: Jan. 6, 2016, 13 Pages.
"Final Office Action Issued in U.S. Appl. No. 13/726,043", Mailed Date: Mar. 3, 2015, 19 Pages.
"Non-Final Office Action Issued in U.S. Appl. No. 13/726,043", Mailed Date: Sep. 11, 2014, 15 Pages.
"Non-Final Office Action Issued in U.S. Appl. No. 13/726,043", Mailed Date: Oct. 8, 2015, 21 Pages.
"Notice of Allowance Issued in U.S. Appl. No. 13/726,043", Mailed Date: May 4, 2016, 16 Pages.
"Final Office Action Issued in U.S. Appl. No. 13/726,048", Mailed Date: Aug. 5, 2015, 13 Pages.
"Non-Final Office Action Issued in U.S. Appl. No. 13/726,048", Mailed Date: Nov. 20, 2015, 15 Pages.
"Non-Final Office Action Issued in U.S. Appl. No. 13/726,048", Mailed Date: Dec. 9, 2014, 13 Pages.
"Notice of Allowance Issued in U.S. Appl. No. 13/726,048", Mailed Date: Mar. 28, 2016, 8 Pages.
"Restriction Requirement Issued in U.S. Appl. No. 13/726,048", Mailed Date: Jun. 20, 2014, 5 Pages.
"Final Office Action Issued in U.S. Appl. No. 13/726,049", Mailed Date: Feb. 1, 2016, 16 Pages.
"Non-Final Office Action Issued in U.S. Appl. No. 13/726,049", Mailed Date: Jul. 7, 2015, 15 Pages.
"Non-Final Office Action Issued in U.S. Appl. No. 13/726,049", Mailed Date: Dec. 4, 2014, 10 Pages.
"Restriction Requirement Issued in U.S. Appl. No. 13/726,049", Mailed Date: Jul. 1, 2014, 6 Pages.
"Final Office Action Issued in U.S. Appl. No. 13/726,090", Mailed Date: Oct. 2, 2014, 30 Pages.
"Final Office Action Issued in U.S. Appl. No. 13/726,090", Mailed Date: Dec. 15, 2015, 35 Pages.
"Non-Final Office Action Issued in U.S. Appl. No. 13/726,090", Mailed Date: Jun. 23, 2015, 32 Pages.
"Non-Final Office Action Issued in U.S. Appl. No. 13/726,090", Mailed Date: Jun. 24, 2014, 29 Pages.
"Non-Final Office Action Issued in U.S. Appl. No. 13/726,092", Mailed Date: Feb. 12, 2015, 22 Pages.
"Notice of Allowance Issued in U.S. Appl. No. 13/726,092", Mailed Date: Oct. 8, 2015, 7 Pages.
"Notice of Allowance Issued in U.S. Appl. No. 13/726,092", Mailed Date: Dec. 18, 2015, 5 Pages.
"Final Office Action Issued in U.S. Appl. No. 13/726,095", Mailed Date: May 8, 2015, 13 Pages.
"Non-Final Office Action Issued in U.S. Appl. No. 13/726,095", Mailed Date: Jan. 5, 2015, 15 Pages.
"Non-Final Office Action Issued in U.S. Appl. No. 13/726,095", Mailed Date: Aug. 15, 2014, 13 Pages.
"Notice of Allowance Issued in U.S. Appl. No. 13/726,095", Mailed Date: Aug. 28, 2015, 7 Pages.
"Notice of Allowance Issued in U.S. Appl. No. 13/726,097", Mailed Date: Jun. 10, 2014, 9 Pages.
"Notice of Allowance Issued in U.S. Appl. No. 13/726,097", Mailed Date: Oct. 1, 2014, 2 Pages.
"Notice of Allowance Issued in U.S. Appl. No. 13/726,097", Mailed Date: Aug. 21, 2014, 2 Pages.
"Restriction Requirement Issued in U.S. Appl. No. 13/726,097", Mailed Date: Mar. 21, 2014, 7 Pages.
"Final Office Action Issued in U.S. Appl. No. 13/726,099", Mailed Date: Aug. 29, 2014, 10 Pages.
"Final Office Action Issued in U.S. Appl. No. 13/726,099", Mailed Date: May 8, 2015, 11 Pages.
"Non-Final Office Action Issued in U.S. Appl. No. 13/726,099", Mailed Date: Jan. 7, 2015, 11 Pages.
"Non-Final Office Action Issued in U.S. Appl. No. 13/726,099", Mailed Date: Mar. 18, 2014, 9 Pages.
"Notice of Allowance Issued in U.S. Appl. No. 13/726,099", Mailed Date: Sep. 17, 2015, 9 Pages.
"Summary of Examiner Interview Issued in U.S. Appl. No. 13/726,099", Mailed Date: Dec. 17, 2015, 5 Pages.
"Final Office Action Issued in U.S. Appl. No. 13/875,139", Mailed Date: May 9, 2014, 16 Pages.
"Non Final Office Action Issued in U.S. Appl. No. 13/875,139", Mailed Date: Oct. 24, 2014, 16 Pages.
"Non-Final Office Action Issued in U.S. Appl. No. 13/875,139", Mailed Date: Oct. 3, 2013, 13 Pages.
"Notice of Allowance Issued in U.S. Appl. No. 13/875,139", Mailed Date: Mar. 5, 2015, 7 Pages.
"Corrected Notice of Allowance Issued in U.S. Appl. No. 14/495,418", Mailed Date: Feb. 25, 2016, 2 Pages.
"Corrected Notice of Allowance Issued in U.S. Appl. No. 14/495,418", Mailed Date: Feb. 29, 2016, 2 Pages.
"Non-Final Office Action Issued in U.S. Appl. No. 14/495,418", Mailed Date: Jul. 2, 2015, 19 Pages.
"Notice of Allowance Issued in U.S. Appl. No. 14/495,418", Mailed Date: Feb. 5, 2016, 7 Pages.
"Notice of Allowance Issued in U.S. Appl. No. 14/495,418", Mailed Date: Oct. 7, 2015, 7 Pages.
"Final Office Action Issued in U.S. Appl. No. 14/686,300", Mailed Date : Apr. 8, 2016, 17 Pages.

(56) References Cited

OTHER PUBLICATIONS

"Final Office Action Issued in U.S. Appl. No. 14/686,300", Mailed Date: Jul. 29, 2015, 13 Pages.
"Non-Final Rejection Issued in U.S. Appl. No. 14/686,300", Mailed Date: Jun. 8, 2015, 12 Pages.
"Non-Final Rejection Issued in U.S. Appl. No. 14/686,300", Mailed Date: Nov. 30, 2015, 12 Pages.
"Non-Final Office Action Issued in U.S. Appl. No. 14/746,763", Mailed Date: Nov. 6, 2015, 11 Pages.
"First Office Action and Search Report Issued in Chinese Patent Application No. 200980128048.8", Mailed Date: Dec. 19, 2012, 9 Pages.
"Notice of Allowance Issued in Chinese Patent Application No. 200980128048.8", Mailed Date: Jun. 19, 2014, 4 Pages.
"Second Office Action Issued in Chinese Patent Application No. 200980128048.8", Mailed Date: May 6, 2013, 7 Pages.
"Third Office Action Issued in Chinese Patent Application No. 200980128048.8", Mailed Date: Dec. 2, 2013, 6 Pages.
"Foreign Office Action Issued in Chinese Patent Application No. 201110317851.5", Mailed Date: Nov. 14, 2014, 9 Pages.
"Fourth Office Action Issued in Chinese Patent Application No. 201110317851.5", Mailed Date: May 20, 2015, 6 Pages.
"Office Action and Search Report Issued in Chinese Patent Application No. 201110317851.5", Mailed Date: Dec. 34, 2013, 14 Pages.
"Office Action Issued in Chinese Patent Application No. 201110317851.5", Mailed Date: May 8, 2014, 10 Pages.
"Notice of Allowance Issued in Australian Patent Application No. 2011312743", Mailed Date: Nov. 25, 2014, 2 Pages.
"Office Action Issued in Australian Patent Application No. 2011312743", Mailed Date: Jun. 20, 2014, 4 Pages.
"Office Action Issued in Australian Patent Application No. 2011312743", Mailed Date: Aug. 15, 2014, 4 Pages.
"First Office Action and Search Report Issued in Chinese Patent Application No. 201280064066.6", Mailed Date: Jan. 21, 2016, 12 Pages.
"Office Action Issued in Chile Patent Application No. 201300886", Mailed Date: May 13, 2015, 7 Pages.
"Office Action Issued in Chile Patent Application No. 201300886", Mailed Date: Feb. 3, 2015, 6 Pages.
"Notice of Allowance Issued in Japanese Application No. 2013-532806", Mailed Date: Oct. 2, 2015, 3 Pages.
"Office Action Issued in Japan Patent Application No. 2013-532806", Mailed Date: Jun. 10, 2015, 11 Pages.
"Office Action Issued in Israel Patent Application No. 225450", Mailed Date: Aug. 13, 2015, 6 Pages.
Aalto, et al., "Bluetooth and WAP Push Based Location-Aware Mobile Advertising System", In Proceedings of the 2nd International Conference on Mobile Systems, Applications, and Services, Jun. 6, 2004, pp. 49-58.
Abdelzaher, et al., "Mobiscopes for Human Spaces", In Journal of IEEE Pervasive Computing, vol. 6, Issue 2, Apr. 1, 2007, 11 Pages.
Abdesslem, et al., "Less is More: Energy-Efficient Mobile Sensing with SenseLess", In Proceedings of the 1st ACM Workshop on Networking, Systems, and Applications for Mobile Handhelds, Aug. 17, 2009, pp. 61-62.
Agarwal, et al., "Somniloquy: Augmenting Network Interfaces to Reduce PC Energy Usage", In Proceedings of the 6th USENIX Symposium on Networked Systems Design and Implementation, Apr. 22, 2009, pp. 365-380.
Azizyan, et al., "SurroundSense: Mobile Phone Localization Using Ambient Sound and Light", In ACM SIGMOBILE Mobile Computing and Communications Review, vol. 13, Issue 1, Jun. 25, 2009, 1 Page.
Bahl, et al., "RADAR: An In-Building RF-based User Location and Tracking System", In Proceedings of Nineteenth Annual Joint Conference of the IEEE Computer and Communications Societies, vol. 2, Mar. 26, 2000, pp. 775-784.
Balakrishnan, et al., "ITR: Scalable Location-Aware Monitoring (SLAM) Systems", Retrieved From <<http://nms.csail.mit.edu/projects/slam/prop.pdf>>, Nov. 9, 2001, 31 Pages.
Barroso, et al., "The Case for Energy-Proportional Computing", In Proceedings of IEEE Computer Society, vol. 40, Issue 12, Dec. 2007, pp. 33-37.
Bhandari, Kanak, "Full Touchscreen Samsung Star (S5233), Star 3G (S5603) and BEAT DJ Launched in India", Retrieved From <<http://web.archive.org/web/20090517010439/http://www.tecfre.com/full-touchscreen-samsung-star-s5233-star-3g-s5603-and-beat-dj-launched-in-india>>, May 11, 2009, 12 Pages.
Bilderbeek, Pim, "From Unified to Social Communications and Collaboration", Retrieved From <<http://www.themetisfiles.com/2011/10/from-unified-to-social-communications-and-collaboration/>>, Oct. 25, 2011, 4 Pages.
Branscombe, Mary, "Kids Corner and Wallet", Retrieved From <<http://web.archive.org/web/20121119052511/http://www.techradar.com/reviews/pc-mac/software/operating-systems/windows-phone-8-1086692/review/6>>, Nov. 6, 2012, 7 Pages.
Burke, et al., "Participatory Sensing", In Proceedings of Workshop on World-Sensor-Web: Mobile Device Centric Sensor Networks and Applications, Oct. 31, 2006, 5 Pages.
Campbell, et al., "Biometrically Enhanced Software-Defined Radios", In Proceedings of Software Defined Radio Technical Conference, Nov. 2003, 6 Pages.
Chen, Brian X., "Here's the Google Phone Apple Wants You to Have", Published on: Mar. 5, 2010, Available at: <<http://www.wired.com/2010/03/apple-htc-google/>>, 9 Pages.
Chiu, et al., "Playful Bottle: a Mobile Social Persuasion System to Motivate Healthy Water Intake", In Proceedings of the 11th International Conference on Ubiquitous Computing, Sep. 30, 2009, pp. 185-194.
Consolvo, et al., "Flowers or a Robot Army? Encouraging Awareness & Activity with Personal, Mobile Displays", In Proceedings of the 10th International Conference on Ubiquitous Computing, vol. 12, Issue 4, Sep. 21, 2008, pp. 54-63.
Constandache, et al., "Energy-Aware Localization Using Mobile Phones", In Poster, ACM MobiSys, Jun. 2008, 1 Page.
Constandache, et al., "Energy-efficient Localization Via Personal Mobility Profiling", In Proceedings of First International ICST Conference on MobiCASE, Oct. 26, 2009, pp. 203-222.
Covington, et al., "Parameterized Authentication", In Proceedings of 9th European Symposium on Research Computer Security, Lecture Notes in Computer Science, Sep. 13, 2004, 18 Pages.
Cramer, et al., "Performing a Check-in: Emerging Practices, Norms and 'Conflicts' in Location-Sharing Using Foursquare", In Proceedings of the 13th International Conference on Human Computer Interaction with Mobile Devices and Services, Aug. 30, 2011, pp. 57-66.
Davies, Chris, "T-Mobile UK to Offer ICD Vega 15-inch Tegra Android Tablet in 2010", Retrieved From <<http://www.slashgear.com/t-mobile-uk-to-offer-icd-vega-15-inch-tegra-android-tablet-in-2010-0768671/>>, Jan. 7, 2010, 7 Pages.
Dipane, Jared, "Sprint to Bring Parental Locks to Android Phones to Prevent Use While Driving", Retrieved From <<http://www.androidcentral.com/sprint-bring-parental-locks-android-phones-prevent-use-while-driving>>, Mar. 22, 2011, 7 Pages.
Flinn, Jason Nelson, "Extending Mobile Computer Battery Life through Energy-Aware Adaptation", A Thesis Submitted in Partial Fulfillment of the Requirements for the Degree of Doctor of Philosophy, Carnegie Mellon University, Dec. 2001, 165 Pages.
Foster, et al., "Precision and Accuracy of an Ankle-Worn Accelerometer-Based Pedometer in Step Counting and Energy Expenditure", In Preventive Medicine, vol. 41, Issues 3-4, Sep. 2005, pp. 778-783.
Gaonkar, et al., "Micro-Blog: Sharing and Querying Content Through Mobile Phones and Social Participation", In Proceedings of the 6th International Conference on Mobile Systems, Applications, and Services, Jun. 2008, 13 Pages.
Hayama, et al., "Windows Vista Home Premium/Home Basic/Business", In Impress Japan Corporation, First Edition, Mar. 21, 2007, pp. 748-776.

(56) References Cited

OTHER PUBLICATIONS

Hoffmann, et al., "Multilateral Security in Mobile Applications and Location Based Services", In Proceedings of Information Security Solutions Europe 2002 Independent IT Security Conference, Oct. 2, 2002, 18 Pages.

Hoh, et al., "Virtual Trip Lines for Distributed Privacy-Preserving Traffic Monitoring", In Proceedings of the 6th International Conference on Mobile Systems, Applications, and Services, Jun. 17, 2008, pp. 15-28.

Hull, et al., "CarTel: A Distributed Mobile Sensor Computing System", In Proceedings of the 4th International Conference on Embedded Networked Sensor Systems, Oct. 31, 2006, pp. 125-138.

Jagadeesan, et al., "A Novel Approach to Design of User Re-Authentication Systems", In Proceedings 3rd IEEE International Conference on Biometrics: Theory, Applications and Systems, Sep. 28, 2009, 6 Pages.

Kang, et al., "A Scalable and Energy-Efficient Context Monitoring Framework for Mobile Personal Sensor Networks",In Proceedings of IEEE Transactions on Mobile Computing, vol. 9, Issue 5, Aug. 21, 2009, pp. 686-702.

Kansal, et al., "Location and Mobility in a Sensor Network of Mobile Phones", In Proceedings of the 17th International Workshop on Network and Operating Systems Support for Digital Audio & Video, Jun. 4, 2007, 1 Page.

Kharif, Olga, "Parental Controls for Mobile Phones? You Bet", Retrieved From <<http://web.archive.org/web/20110808060517/http://www.businessweek.com/the_thread/techbeat/archives/2005/08/parental_contro.html>>, Aug. 16, 2005, 12 Pages.

Lester, et al., "A Practical Approach to Recognizing Physical Activities", In Proceedings of the 4th International conference on Pervasive Computing, May 7, 2006, pp. 1-16.

Klosowski, Thorin, "Get the Most Out of Your iPhone's Notification Center, from Beginner to Jailbreaker", Retrieved From <<http://web.archive.org/web/20120208225329/http://lifehacker.com/5882947/get-the-most-out-of-ios-5s-notification-center-from-beginner-to-jailbreaker>>, Feb. 7, 2012, 8 Pages.

Klosterman, et al., "Secure Continuous Biometric-Enhanced Authentication", Technical Report Submitted to School of Computer Science, Carnegie Mellon University, May 2000, 25 Pages.

Kottahachchi, et al., "Access Controls for Intelligent Environments", In Proceedings of ISDA, 6 Pages.

Krumm, et al., "Predestination: Inferring Destinations from Partial Trajectories", In Proceedings of the 8th International Conference on Ubiquitous Computing, Sep. 17, 2006, 18 Pages.

Krumm, et al., "RightSPOT: A Novel Sense of Location for a Smart Personal Object", In Proceedings of Ubicomp 2003, Oct. 2003, 1 Page.

Lamarca, et al., "Place Lab: Device Positioning Using Radio Beacons in the Wild", In Proceedings of the Third International Conference on Pervasive Computing, May 8, 2005, 18 Pages.

Leblanc, Brandon, "The Device Experience in Windows 7—Updated", Published on: Sep. 1, 2009, Available at: <<https://blogs.windows.com/windowsexperience/2009/09/01/the-device-experience-in-windows-7-updated/>>, 14 Pages.

Zhuang, et al., "Improving Energy Efficiency of Location Sensing on Smartphones", In Proceedings of the 8th International Conference on Mobile Systems, Applications, and Services, Jun. 15, 2010, 15 Pages.

Lester, et al., "Validated Caloric Expenditure Estimation using a Single Body-Worn Sensor", In Proceedings of the 11th International Conference on Ubiquitous Computing, Sep. 30, 2009, pp. 225-234.

Liao, et al.,"Extracting Places and Activities from GPS Traces Using Hierarchical Conditional Random Fields", In International Journal of Robotics Research, vol. 26, Issue 1, Jan. 1, 2007, 20 Pages.

Lin, et al., "Enabling Energy-Efficient and Quality Localization Services", In Proceedings of Fourth Annual IEEE International Conference on Pervasive Computing and Communications Workshops, Mar. 13, 2006, 4 Pages.

Lin, et al., "Energy-Accuracy Trade-off for Continuous Mobile Device Location", In Proceedings of the 8th International Conference on Mobile Systems, Applications, and Services, June 115, 2010, 13 Pages.

Liu, et al., "xShare: Supporting Impromptu Sharing of Mobile Phones", In Proceedings of the 7th International Conference on Mobile Systems, Applications,and Services, Jun. 22, 2009, pp. 15-28.

Lu, et al., "SoundSense: Scalable Sound Sensing for People-Centric Applications on Mobile Phones", In Proceedings of the 7th International Conference on Mobile Systems, Applications, and Services, Jun. 22, 2009, 14 Pages.

McGlaun, Shane, "Fixes for Distracted Driving Remain Unclear", Retrieved From <<http://www.dailytech.com/Fixes+For+Distracted+Driving+Remain+Unclear/article24903.htm>>, Jun. 12, 2012, 2 Pages.

Mohan, et al., "Nericell: Rich Monitoring of Road and Traffic Conditions using Mobile Smartphones", In Proceedings of the 6th ACM Conference on Embedded Network Sensor Systems, Nov. 5, 2008, pp. 323-336.

Moran, et al., "Getting Started with Windows 7", In Book Published by Springer-Verlag, 2009, 411 Pages.

Morton, Lynn, "6 Geolocation Apps You May Not Have Heard About", Retrieved From <<http://web.archive.org/web/20110410031000/http://www.r2integrated.com/blog/index.php/6-geolocation-apps-you-may-not-have-heard-of/>>, Mar. 27, 2011, 4 Pages.

Mui, Chunka, "The Lifesaving Smartphone Feature That We Need: Driving Mode", Retrieved From <<http://www.forbes.com/sites/chunkamui/2011/12/19/the-smart-phone-feature-that-we-need-driving-model/>>, Dec. 19, 2011, 4 Pages Nasar, et al., "Mobile Telephones, Distracted Attention, and Pedestrian Safety", In Proceedings of Accident Analysis & Prevention, vol. 40, Issue 1, Jan. 2008, pp. 69-75.

Niino, Junichi, "There was Free Enterprise Microblogging, Japanese were Developed "youroom!" Free Plan Upgrade Just Mutter", Retrieved From <<http://www.publickey1.jp/blog/10/youroom.html>>, Dec. 21, 2010, 4 Pages.

Oliver, et al., "HealthGear: A Real-time Wearable System for Monitoring and Analyzing Physiological Signals", In Proceedings of the International Workshop on Wearable and Implantable Body Sensor Networks, Apr. 2006, 4 Pages.

Paek, et al., "Energy-Efficient Rate-Adaptive GPS-based Positioning for Smartphones", In Proceedings of the 8th International Conference on Mobile Systems, Applications, and Services, Jun. 15, 2010, 16 Pages.

Patten, et al., "Using Mobile Telephones: Cognitive Workload and Attention Resource Allocation", In Proceedings of Accident Analysis & Prevention, vol. 36, Issue 3, May 2004, pp. 341-350.

"International Search Report and Written Opinion Issued in PCT Patent Application No. PCT/US2009/039509", Mailed Date: Nov. 18, 2009, 11 Pages.

"International Search Report & Written Opinion Issued in PCT Patent Application No. PCT/US2011/049614", Mailed Date: Mar. 26, 2012, 7 Pages.

"International Search Report & Written Opinion Issued in PCT Patent Application No. PCT/US2012/034598", Mailed Date: Oct. 12, 2012, 9 Pages.

"International Search Report & Written Opinion Issued in PCT Patent Application No. PCT/US2012/071544", Mailed Date: Feb. 27, 2013, 9 Pages.

"International Preliminary Report on Patentability Issued in PCT Patent Application No. PCT/US2012/071545", Mailed Date: Jul. 3, 2014, 6 Pages.

"International Search Report & Written Opinion Issued in PCT Patent Application No. PCT/US2012/071545", Mailed Date: Mar. 28, 2013, 9 Pages.

"International Preliminary Report on Patentability Issued in PCT Patent Application No. PCT/US2012/071546", Mailed Date: Jul. 3, 2014, 7 Pages.

"International Search Report & Written Opinion Issued in PCT Patent Application No. PCT/US2012/071546", Mailed Date: Apr. 29, 2013, 10 Pages.

(56) References Cited

OTHER PUBLICATIONS

"International Preliminary Report on Patentability Issued in PCT Patent Application No. PCT/US2012/071555", Mailed Date: Jul. 3, 2014, 5 Pages.

"International Search Report & Written Opinion Issued in PCT Patent Application No. PCT/US2012/071555", Mailed Date: Apr. 25, 2013, 9 Pages.

"International Preliminary Report on Patentability Issued in PCT Patent Application No. PCT/US2012/071557", Mailed Date: Jul. 3, 2014, 6 Pages.

"International Search Report & Written Opinion Issued in PCT Patent Application No. PCT/US2012/071557", Mailed Date: Mar. 28, 2013, 9 Pages.

"International Preliminary Report on Patentability Issued in PCT Patent Application No. PCT/US2012/071559", Mailed Date: Jul. 3, 2014, 7 Pages.

"International Search Report & Written Opinion Issued in PCT Patent Application No. PCT/US2012/071559", Mailed Date: Mar. 28, 2013, 10 Pages.

"International Preliminary Report on Patentability Issued in PCT Patent Application No. PCT/US2012/071562", Mailed Date: Mar. 12, 2015, 6 Pages.

"International Search Report & Written Opinion Issued in PCT Patent Application No. PCT/US2012/071562", Mailed Date: Apr. 24, 2013, 9 Pages.

"International Search Report & Written Opinion Issued in PCT Patent Application No. PCT/US2013/050963", Mailed Date: Nov. 8, 2013, 14 Pages.

Peng, et al., "BeepBeep: A High Accuracy Acoustic Ranging System using COTS Mobile Devices", In Proceedings of the 5th International Conference on Embedded Networked Sensor Systems, Nov. 6, 2007, 14 Pages.

Pering, et al., "The PSI Board: Realizing a Phone-Centric Body Sensor Network", In Proceedings of 4th International Workshop on Wearable and Implantable Body Sensor Networks, Mar. 26, 2007, 6 Pages.

Person, Jon, "Writing Your Own GPS Applications: Part 2", Retrieved From <<http://www.codeproject.com/Articles/9115/Writing-Your-Own-GPS-Applications-Part>>, Aug. 7, 2008, 13 Pages.

Quick, Darren, "BizzTrust for Android Splits a Single Smartphone into Two Virtual Phones", Retrieved From <<http://www.gizmag.com/bizztrust-for-android/20114/>>, Oct. 10, 2011, 4 Pages.

Raja, Haroon Q., "How to Replace and Customize Android Lock Screen [Guide]", Retrieved From <<http://www.addictivetips.com/mobile/how-to-replace-and-customize-android-lock-screen-guide/>>, Jun. 10, 2011, 8 Pages.

Riva, et al., "The Urbanet Revolution: Sensor Power to the People!", In Proceedings of IEEE Pervasive Computing, vol. 6, Issue 2, Apr. 2007, pp. 41-49.

Ruairi, et al., "An Energy-Efficient, Multi-Agent Sensor Network for Detecting Diffuse Events", In Proceedings of the 20th International Joint Conference on Artificial Intelligence, Jan. 6, 2007, pp. 1390-1395.

Sadeh, et al., "Understanding and Capturing People's Privacy Policies in a People Finder Application", In Personal and Ubipuitous Computing, vol. 13, Issue 6, 13 Pages.

Saenz, Aaron, "Unlock Your Door With Your Phone, Text a Key to a Friend—Lockitron is Awesome (video)", Retrieved From <<http://singularityhub.com/2011/05/24/unlock-your-door-with-your-phone-text-a-key-to-a-friend-lockitron-is-awesome-video/>>, May 24, 2011, 4 Pages.

Samberg, David, "Stay Focused While Driving", Retrieved From <<http://www.verizonwireless.com/news/2012109/safely-go-driving-app.html>>, Sep. 12, 2012, 5 Pages.

Schindler, et al., "City-Scale Location Recognition", In Proceedings of IEEE Conference on Computer Vision and Pattern Recognition, Jun. 17, 2007, pp. 1-7.

Shin, et al., "DEAMON: Energy-efficient Sensor Monitoring", In Proceedings of 6th Annual IEEE Communications Society Conference on Sensor, Mesh and Ad Hoc Communications and Networks, Jun. 22, 2009, pp. 1-9.

Simonite, Tom, "One Smart Phone, Two Personalities", Retrieved From <<http://www.technologyreview.com/news/425741/one-smart-phone-two-personalities/>>, Oct. 13, 2011, 3 Pages.

Smailagic, et al., "Location Sensing and Privacy in a Context Aware Computing Environment", In Proceedings of IEEE Wireless Communications, vol. 9, Issue 5, Oct. 2002, pp. 10-17.

Stajano, Frank, "One User, Many Hats; and, Sometimes, No Hat: Towards a Secure Yet Usable PDA", In Proceedings of the 12th International Conference on Security Protocol, Apr. 26, 2004, pp. 51-64.

Sun, et al., "Signal Processing Techniques in Network-Aided Positioning", In IEEE Signal Processing Magazine, vol. 22, Issue 4, Jul. 2005, pp. 12-23.

Talbot, David, "App Battles Driver Distraction but Spares Passengers", Retrieved From <<http://www.Technologyreview.com/news/426889/app-battles-driver-distraction-but-spares-passengers/>>, Feb. 14, 2012, 2 Pages.

Temporale, Mike, "Removing Application Lock on Windows Mobile Standard Devices", Retrieved From <<http://www.mobilejaw.com/articles/2009/09/removing-application-lock-on-windows-mobile-standard-devices/>>, Sep. 1, 2009, 10 Pages.

Tiemann, Amy, "AT&T Adds Parental Control Options to Cell Phones", Retrieved From <<http://www.cnet.com/news/at-t-adds-parental-control-options-to-cell-phones/>>, Sep. 4, 2007, 1 Page.

Timothy, "No Tech Panacea for Tech-Distracted Driving", Retrieved From <<http://mobile.slashdot.org/story/12/06/11/0556231/no-tech-panacea-for-tech-distracted-driving>>, Jun. 11, 2012, 30 Pages.

Wang, et al., "A Framework of Energy Efficient Mobile Sensing for Automatic User State Recognition", In Proceedings of the 7th International Conference on Mobile Systems, Applications, and Services, Jun. 22, 2009, pp. 179-192.

Warren, Tom, "Microsoft Flaunts Metro Style PowerPoint Live Tiles", Retrieved From <<http://www.winrumors.com/microsoft-flaunts-metro-style-powerpoint-live-tiles-video/>>, Jul. 11, 2011, 12 Pages.

Weilenmann, et al., "Local Use and Sharing of Mobile Phones", In Book Wireless World: Social and Interactional Aspects of the Mobile Age, Dec. 12, 2001, 17 Pages.

Williams, Harold, "AT&T Drive Mode, The Anti-Texting While Driving Mobile Solution (video)", Retrieved From <<http://www.talkandroid.com/66579-att-drive-mode-the-anti-texting-while-driving-mobile-solution-video/>>, Oct. 13, 2011, 6 Pages.

Wood, Molly, "Hey, Phone Makers: Where's 'Driving Mode'?", Retrieved From <<http://www.cnet.com/news/hey-phone-makers-wheres-driving-mode/>>, Apr. 29, 2010, 3 Pages.

Woodman, et al., "Pedestrian Localisation for Indoor Environments", In Proceedings of the 10th International conference on Ubiquitous Computing, Sep. 21, 2008, pp. 114-123.

Yanqing, Cui "Facilitating Consumption of Online Social Networking Services on Mobile Devices", In Proceedings of the 13th International Conference on Ubiquitous Computing, Sep. 17, 2011, pp. 511-514.

Youssef, et al., "The Horns WLAN Location Determination System", In Proceedings of the 3rd International conference on Mobile Systems, Applications, and Services, Jun. 6, 2005, pp. 205-218.

Yu, et al., "Personalized Awareness and Safety with Mobile Phones as Sources and Sinks", In Proceedings of Urbansense, workshop held in Conjunction with SenSys, Nov. 4, 2008, pp. 26-30.

Zaplata, et al., "Context-based Cooperation in Mobile Business Environments—Managing the Distributed Execution of Mobile Processes", In Business & Information Systems Engineering, vol. 1, Issue 4, Aug. 2009, pp. 301-314.

Zhang, et al., "The Two Facets of the Exploration-Exploitation Dilemma", In Proceedings of the IEEE/WIC/ACM—International Conference on Intelligent Agent Technology, Dec. 18, 2006, 7 Pages.

(56) References Cited

OTHER PUBLICATIONS

Greenwald, et al., How to Set Up an ICE Contact on Your iPhone, Posted in ICE Contacts, The Backup Plan by Stufproductions, Jun. 21, 2010, 20 Pages.
U.S. Appl. No. 14/746,763, Amendment dated Mar. 4, 2016, 9 Pages.
European Patent Application No. 12860631.6 (foreign counterpart application to U.S. Appl. No. 15/143,731, Response and Amendment dated May 30, 2016, 9 Pages.
"Non-Final Office Action Issued in U.S. Appl. No. 13/726,099", Mailed Date: Jun. 23, 2016, 15 Pages.
"Notice of Allowance Issued in U.S. Appl. No. 14/495,418", Mailed Date: Jul. 11, 2016, 7 Pages.
"Applicant Initiated Interview Summary Issued in U.S. Appl. No. 12/912,456", Mailed Date: Jul. 24, 2013, 3 Pages.
"Applicant Initiated Interview Summary Issued in U.S. Appl. No. 12/912,456", Mailed Date: Nov. 19, 2013, 3 Pages.
"Applicant Initiated Interview Summary Issued in U.S. Appl. No. 13/726,099", Mailed Date: Dec. 19, 2014, 3 Pages.
"Applicant Response to Pre-Exam Formalities Notice Filed in U.S. Appl. No. 13/726,031", Filed Date: May 8, 2013, 2 Pages.
"Applicant Summary of Interview Issued in U.S. Appl. No. 13/222,538", Mailed Date: May 1, 2014, 2 Pages.
"Applicant-Initiated Interview Summary Issued in U.S. Appl. No. 13/726,031", Mailed Date: Nov. 20, 2014, 3 Pages.
"Applicant-Initiated Interview Summary Issued in U.S. Appl. No. 13/726,099", Mailed Date: Jun. 4, 2015, 3 Pages.
"Applicant-Initiated Interview Summary Issued in U.S. Appl. No. 13/726,099", Mailed Date: Apr. 29, 2014, 3 Pages.
"Applicant-Initiated Interview Summary Issued in U.S. Appl. No. 14/686,300", Mailed Date: Feb. 4, 2016, 3 Pages.
Steenson, et al., "Beyond the Personal and Private: Modes of Mobile Phone Sharing in Urban India", In the Book-Reconstruction of Space and Time: Mobile Communication Practices, Jun. 27, 2009, pp. 231-250.
"Bluecasting", Retrieved from <<https://web.archive.org/web/20081002102145/http://en.wikipedia.org/wiki/Bluecasting>>, Retrieved Date: Oct. 2, 2008, 1 Page.
"Bluetooth Specification", Retrieved from <<https://web.archive.org/web/20081019001923/http://www.bluetooth.com/bluetooth/>>, Retrieved Date: Oct. 19, 2008, 1 Page.
Sharkey, Jeff, "Coding for Life-Battery Life, That Is", In Google IO Developer Conference, May 27, 2009, 32 Pages.
"Communication pursuant to Rule 70(2) Issued in European Patent Application No. 09747072.8", Mailed Date: Feb. 5, 2013, 1 Page.
"Communication pursuant to Rules 161 (1) and 162 EPC Issued in European Patent Application No. 13748129.7", Mailed Date: Feb. 26, 2015, 2 Pages.
"Corrected Notice of Allowance Issued in U.S. Appl. No. 13/726,099", Mailed Date: Dec. 17, 2015, 5 Pages.
Kamvar, et al., "Deciphering Trends in Mobile Search", In Journal of Computer, vol. 40, Issue 8, Aug. 1, 2007, pp. 36-40.
Priyantha, et al., "Demo Abstract: Enabling Energy Efficient Continuous Sensing on Mobile Phones with LittleRock", In Proceedings of the 9th ACM/IEEE International Conference on Information Processing in Sensor Networks, Apr. 12, 2010, pp. 420-421.
Kupper, et al., "Efficient Proximity and Separation Detection among Mobile Targets for Supporting Location-based community Services", In Newsletter ACM SIGMOBILE Mobile Computing and Communications Review, vol. 10, Issue 3, Jul. 2006, 12 Pages.
"Electronic Terminal Disclaimer Filed in U.S. Appl. No. 13/875,139", filed Feb. 25, 2015, 3 Pages.
"Electronic Terminal Disclaimer Filed in U.S. Appl. No. 14/495,418", Mailed Date: Aug. 27, 2015, 3 Pages.
Kjaergaard, et al., "En Tracked: Energy-Efficient Robust Position Tracking for Mobile Devices", In Proceedings of the 7th International Conference on Mobile Systems, Applications, and Services, Jun. 22, 2009, pp. 221-234.
Lin, et al., "Energy-Aware Localization for Mobile Devices", In Proceedings of the 8th International Conference on Mobile Systems, Applications, and Services, Jun. 2010, 14 Pages.
Farrell, et al., "Energy-Efficient Monitoring of Mobile Objects with Uncertainty-Aware Tolerances", In Proceedings of 11th International Database Engineering and Applications Symposium, Sep. 6, 2007, 12 Pages.
"Ex Parte Quayle Action and Examiner-Initiated Interview Summary Issued in U.S. Appl. No. 13/551,613", Mailed Date: Mar. 9, 2016, 5 Pages.
"Examiner and Applicant Initiated Interview Summary Issued in U.S. Appl. No. 12/417,752", Mailed Date: Feb. 25, 2014, 3 Pages.
"Examiner Initiated Interview Summary Issued in U.S. Appl. No. 13/875,139", Mailed Date: Mar. 5, 2015, 1 Page.
Amin, et al., "Fancy a Drink in Canary Wharf?: A User Study on Location-Based Mobile Search", In Proceedings of the 12th IFIP Conference on Human-Computer Interaction: Part I, Aug. 24, 2009, 14 Pages.
"Final Office Action Issued in U.S. Appl. No. 13/726,090", Mailed Date: Dec. 16, 2016, 24 Pages.
"Final Office Action Issued in U.S. Appl. No. 13/222,538", Mailed Date: Jan. 27, 2014, 40 Pages.
"Final Office Action Issued in U.S. Appl. No. 13/551,613", Mailed Date: Mar. 11, 2015, 15 Pages.
"Final Office Action Issued in U.S. Appl. No. 13/726,031", Mailed Date: Mar. 24, 2016, 20 Pages.
"Final Office Action Issued in U.S. Appl. No. 13/726,099", Mailed Date: Dec. 22, 2016, 14 Pages.
"XP User to Windows 7", Retrieved From<<http://download.Microsoft.com/download/a/0/D/A0D4CF2B-9B70-4846-A18D-0765D1F75343/XPUsertoWindows7.pdf>>, Jun. 13, 2010, 9 Pages.
Thiagarajan, et al., "VTrack: Accurate, Energy-aware Road Traffic Delay Estimation Using Mobile Phones", In Proceedings of the 7th ACM Conference on Embedded Networked Sensor Systems, Nov. 4, 2009, 14 Pages.
"First Office Action and Search Report Issued in Chinese Patent Application No. 20128004066.6", Mailed Date: Jan. 21, 2016, 12 Pages.
"First Office Action and Search Report Issued in Chinese Patent Application No. 201380038072.9", Mailed Date: Dec. 31, 2015, 14 Pages.
"Google Inc. Android Developers Reference: Locationmanager", Retrieved from <<<http://developer.android.com>>, Jun. 27, 2009, 1 Page.
"International Preliminary Report on Patentability Issued in PCT Application No. PCT/US2011/049614", Mailed Date: Apr. 18, 2013, 5 Pages.
"International Preliminary Report on Patentability Issued in PCT Application No. PCT/US2009/039509", Mailed Date: Nov. 25, 2010, 6 Pages.
"International Preliminary Report on Patentability Issued in PCT Application No. PCT/US2012/071544", Mailed Date: Jul. 3, 2014, 6 Pages.
"Kids Place—Parental Control", Retrieved from <<https://web.archive.org/web/20161228132319/https://www.amazon.com/Kiddoware-Kids-Place-Parental-Control/dp/B0061S073A>>, Oct. 31, 2011, 5 Pages.
Liu, et al., "Location Awareness through Trajectory Prediction", In Computers, Environment and Urban Systems, vol. 30, Issue 6, Nov. 2006, 38 Pages.
"Non Final Office Action Issued in U.S. Appl. No. 13/551,613", Mailed Date: Aug. 13, 2014, 10 Pages.
"Non Final Office Action Issued in U.S. Appl. No. 13/551,613", Mailed Date: Jul. 16, 2015, 11 Pages.
"Non Final Office Action Issued in U.S. Appl. No. 13/726,090", Mailed Date: Jun. 3, 2016, 22 Pages.
"Non Final Office Action Issued in U.S. Appl. No. 14/746,763", Mailed Date: Jun. 30, 2016, 6 Pages.
"Non-Final Office Action Issued in U.S. Appl. No. 15/071,960", Mailed Date: Nov. 14, 2016, 16 Pages.
"Non-Final Office Action Issued in U.S. Appl. No. 15/143,731", Mailed Date: Dec. 7, 2016, 9 Pages.

(56) References Cited

OTHER PUBLICATIONS

"Non-Final Office Action Issued in U.S. Appl. No. 13/090,474", Mailed Date: Dec. 3, 2015, 14 Pages.
"Notice of Allowance Issued in U.S. Appl. No. 13/222,538", Mailed Date: May 12, 2014, 13 Pages.
"Notice of Allowance Issued in Chinese Patent Application No. 201110317851.5", Mailed Date: Dec. 2, 2015, 4 Pages.
"Notice of Allowance Issued in Japanese Patent Application No. 2015-529778", Mailed Date: Nov. 7, 2016, 4 Pages.
"Notice of Allowance Issued in South Africa Patent Application No. 2013/02207", Mailed Date: Mar. 25, 2014, 1 Page.
"Notice of Allowance Issued in U.S. Appl. No. 12/897,586", Mailed Date: Feb. 20, 2015, 3 Pages.
"Notice of Allowance Issued in U.S. Appl. No. 13/328,312", Mailed Date: Jan. 2, 2014, 12 Pages.
"Notice of Allowance Issued in U.S. Appl. No. 13/551,613", Mailed Date: Jun. 6, 2016, 7 Pages.
"Notice of Allowance Issued in U.S. Appl. No. 13/726,043", Mailed Date: Aug. 16, 2016, 8 Pages.
"Notice of Allowance Issued in U.S. Appl. No. 13/726,049", Mailed Date: Jun. 9, 2016, 8 Pages.
"Notice of Allowance Issued in U.S. Appl. No. 13/726,049", Mailed Date: Jul. 18, 2016, 8 Pages.
"Notice of Allowance Issued in U.S. Appl. No. 14/495,418", Mailed Date: Aug. 12, 2016, 2 Pages.
"Notice of Allowance Issued in U.S. Appl. No. 14/686,300", Mailed Date: Jan. 13, 2017, 12 Pages.
"Notice of Appeal Filed in U.S. Appl. No. 14/686,300", filed Jun. 30, 2016, 2 Pages.
"Notice of Non-Compliant Amendment Issued in U.S. Appl. No. 13/726,049", Mailed Date: Sep. 9, 2015, 3 Pages.
"International Report on Patentability Issued in PCT Patent Application No. PCT/US2013/050963", Mailed Date: Jan. 29, 2015, 10 Pages.
"Office Action Issued in Chile Patent Application No. 201200886", Mailed Date: Feb. 3, 2015, 6 Pages.
"Office Action Issued in European Patent Application No. 12859485.0", Mailed Date: May 4, 2016, 8 Pages.
"Office Action Issued in Israel Patent Application No. 2218582", Mailed Date: Aug. 13, 2015, 6 Pages.
"Office Action Issued in Japanese Patent Application No. 2014-548998", Mailed Date: Dec. 13, 2016, 10 Pages.
"Voluntary Amendment filed in Chinese Patent Application No. 201110317851.5", Filed Date: Aug. 3, 2012, 9 Pages.
"Office Action Issued in Taiwan Patent Application No. 102127829", Mailed Date: Nov. 14, 2016, 9 Pages.
Wei, et al., "PATS: A Framework of Pattern-Aware Trajectory Search", In IEEE Eleventh International Conference on Mobile Data Management, May 23, 2010, 5 Pages.
"Petition Decision Issued in U.S. Appl. No. 13/726,043", Mailed Date: Sep. 12, 2016, 2 Pages.
"Petition for Withdrawal From Issue Issued in U.S. Appl. No. 13/726,099", Mailed Date: Mar. 24, 2016, 9 Pages.
"Pre-Brief Appeal Conference Decision Issued in U.S. Appl. No. 13/726,031", Mailed Date: Jul. 15, 2016, 3 Pages.
"Predestination Filed in U.S. Appl. No. 60/721,879", filed Sep. 29, 2005, 31 Pages.
"Preliminary Amendment Filed in U.S. Appl. No. 13/726,027", filed Dec. 18, 2013, 8 Pages.
"Preliminary Amendment Filed in U.S. Appl. No. 13/726,031", filed Apr. 8, 2014, 8 Pages.
"Preliminary Amendment Filed in U.S. Appl. No. 13/726,040", filed Nov. 26, 2013, 7 Pages.
"Preliminary Amendment Filed in U.S. Appl. No. 13/726,043", filed Dec. 10, 2013, 9 Pages.
"Preliminary Amendment Filed in U.S. Appl. No. 13/726,049", filed Nov. 26, 2013, 7 Pages.
"Preliminary Amendment Filed in U.S. Appl. No. 13/726,090", filed Nov. 26, 2013, 9 Pages.
"Preliminary Amendment Filed in U.S. Appl. No. 13/726,095", filed Dec. 11, 2013, 10 Pages.
"Preliminary Amendment Filed in U.S. Appl. No. 13/726,097", filed Nov. 26, 2013, 9 Pages.
"Preliminary Amendment Filed in U.S. Appl. No. 13/875,139", filed Jun. 12, 2013, 7 Pages.
"Preliminary Amendment Filed in U.S. Appl. No. 14/681,923", filed Apr. 8, 2015, 8 Pages.
"Preliminary Amendment Filed in U.S. Appl. No. 15/071,960", filed Mar. 17, 2016, 9 Pages.
"Preliminary Amendments Filed in U.S. Appl. No. 15/216,552", filed Jul. 25, 2016, 6 Pages.
"Provisional Application Filed in U.S. Appl. No. 61/052,455", filed May 12, 2008, 27 Pages.
"Provisional Application Filed in U.S. Appl. No. 61/580,119", filed Dec. 23, 2011, 19 Pages.
"Provisional Application Filed in U.S. Appl. No. 61/580,137", filed Dec. 23, 2011, 18 Pages.
"Provisional Application Filed in U.S. Appl. No. 61/580,143", filed Dec. 23, 2011, 21 Pages.
"Provisional Application Filed in U.S. Appl. No. 61/580,147", filed Dec. 23, 2011, 17 Pages.
"Provisional Application Filed in U.S. Appl. No. 61/695,294", filed Aug. 30, 2012, 20 Pages.
"Request for Examination and Amendment filed in Japanese Patent Application No. 2013-532806", Filed Date: Jul. 26, 2014, 10 Pages. (w/o English Translation).
"Request for Examination and Voluntary Amendment filed in Japanese Patent Application No. 2014-548998", Filed Date: Dec. 15, 2015, 11 Pages.
"Request for Examination and Voluntary Amendment Filed in Japanese Patent Application No. 2015-523237", Filed Date: Jun. 15, 2016, 8 Pages.
"Request for Examination and Voluntary Amendment filed in Japanese Patent Application No. 2015-529778", Filed Date: Nov. 20, 2015, 7 Pages.
"Requirement for Restriction Election Issued in U.S. Appl. No. 13/551,613", Mailed Date: Mar. 21, 2014, 8 Pages.
"Response and Applicant Interview Summary to Final Office Action Filed in U.S. Appl. No. 13/875,139", Filed Date: Aug. 11, 2014, 19 Pages.
"Response Filed in Chinese Patent Application No. 200980128048.8", Filed Date: Jul. 22, 2013, 9 Pages.
"Response Filed in Chinese Patent Application No. 200980128048.8", Filed Date: Dec. 27, 2012, 13 Pages.
"Response Filed in Chinese Patent Application No. 200980128048.8", Filed Date: Feb. 12, 2014, 12 Pages.
"Response Filed in Chinese Patent Application No. 201110317851.5", Filed Date: Jan. 8, 2014, 20 Pages.
"Response Filed in Chinese Patent Application No. 201110317851.5", Filed Date: Jul. 22, 2014, 17 Pages.
"Response Filed in Chinese Patent Application No. 201110317851.5", Filed Date: Jan. 28, 2015, 17 Pages.
"Response Filed in Chinese Patent Application No. 201110317851.5", Filed Date: Aug. 3, 2015, 60 Pages.
"Response Filed in Chinese Patent Application No. 20128004066.6", Filed Date: Jun. 6, 2016, 11 Pages.
"Response Filed in Chinese Patent Application No. 201380038072.9", Filed Date: May 16, 2016, 7 Pages.
"Response Filed in European Patent Application No. 09747072.8", Filed Date: Aug. 9, 2013, 14 Pages.
"Response Filed in European Patent Application No. 12860403.0", Filed Date: Jun. 25, 2015, 15 Pages.
"Response Filed in European Patent Application No. 12883789.5", Filed Date: Nov. 16, 2016, 13 Pages.
"Response Filed in European Patent Application No. 13748129.7", Filed Date: Jul. 31, 2015, 9 Pages.
"Response Filed in U.S. Appl. No. 13/726,027", filed May 9, 2013, 2 Pages.
"Response Filed in U.S. Appl. No. 13/726,031", filed Jul. 14, 2016, 1 Page.
"Response Filed in U.S. Appl. No. 13/726,092", filed May 9, 2013, 2 Pages.

(56) References Cited

OTHER PUBLICATIONS

"Response Filed in U.S. Appl. No. 13/726,099", filed Jul. 30, 2013, 2 Pages.
"Response Filed in U.S. Appl. No. 13/222,538", filed Mar. 22, 2014, 35 Pages.
"Response Filed in U.S. Appl. No. 13/222,538", filed Mar. 1, 2013, 24 Pages.
"Response Filed in U.S. Appl. No. 13/222,538", filed Jul. 8, 2013, 33 Pages.
"Response Filed in U.S. Appl. No. 13/222,538", filed Nov. 21, 2013, 29 Pages.
"Response Filed in U.S. Appl. No. 13/328,312", filed Nov. 1, 2013, 23 Pages.
"Response Filed in U.S. Appl. No. 13/551,613", filed Apr. 28, 2014, 13 Pages.
"Response Filed in U.S. Appl. No. 13/551,613", filed Dec. 12, 2015, 13 Pages.
"Response Filed in U.S. Appl. No. 13/551,613", filed May 9, 2016, 5 Pages.
"Response Filed in U.S. Appl. No. 13/551,613", filed Nov. 13, 2014, 17 Pages.
"Response Filed in U.S. Appl. No. 13/551,613", filed Jun. 16, 2015, 16 Pages.
"Response Filed in U.S. Appl. No. 13/726,049", filed Aug. 17, 2015, 17 Pages.
"Response Filed in U.S. Appl. No. 13/726,090", filed Sep. 6, 2016, 14 Pages.
"Response Filed in U.S. Appl. No. 13/726,090", filed May 25, 2016, 13 Pages.
"Response Filed in U.S. Appl. No. 13/726,099", filed Sep. 23, 2016, 15 Pages.
"Response Filed in U.S. Appl. No. 14/746,763", filed Sep. 26, 2016, 8 Pages.
"Response to Final Office Action Filed in U.S. Appl. No. 12/197,213", filed Dec. 6, 2011, 13 Pages.
"Response to Final Office Action Filed in U.S. Appl. No. 12/417,752", filed Dec. 13, 2012, 13 Pages.
"Response to Final Office Action Filed in U.S. Appl. No. 12/417,752", filed Sep. 30, 2013, 18 Pages.
"Response to Final Office Action Filed in U.S. Appl. No. 12/912,456", filed Nov. 18, 2013, 21 Pages.
"Response to Final Office Action Filed in U.S. Appl. No. 13/090,474", filed Mar. 11, 2014, 16 Pages.
"Response to Final Office Action Filed in U.S. Appl. No. 13/726,027", filed Apr. 6, 2015, 15 Pages.
"Response to Non-Final Office Action Filed in U.S. Appl. No. 12/197,213", filed May 27, 2011, 12 Pages.
"Response to Non-Final Office Action Filed in U.S. Appl. No. 12/417,752", filed Dec. 23, 2013, 21 Pages.
"Response to Non-Final Office Action Filed in U.S. Appl. No. 12/417,752", filed Jul. 2, 2013, 16 Pages.
"Response to Non-Final Office Action Filed in U.S. Appl. No. 12/417,752", filed Oct. 27, 2011, 17 Pages.
"Response to Non-Final Office Action Filed in U.S. Appl. No. 12/912,456", filed Aug. 14, 2012, 14 Pages.
"Response to Non-Final Office Action Filed in U.S. Appl. No. 12/912,456", filed Dec. 11, 2012, 17 Pages.
"Response to Non-Final Office Action Filed in U.S. Appl. No. 12/912,456", filed Apr. 9, 2013, 16 Pages.
"Response to Non-Final Office Action Filed in U.S. Appl. No. 12/912,456", filed Jul. 18, 2013, 17 Pages.
"Response to Non-Final Office Action Filed in U.S. Appl. No. 13/090,474", filed Aug. 20, 2014, 15 Pages.
"Response to Non-Final Office Action Filed in U.S. Appl. No. 13/090,474", filed Aug. 26, 2013, 15 Pages.
"Response to Non-Final Office Action Filed in U.S. Appl. No. 13/875,139", filed Jan. 26, 2015, 17 Pages.
"Response to Non-Final Office Action Filed in U.S. Appl. No. 13/875,139", filed Dec. 30, 2013, 16 Pages.
"Response to Official Communication Filed in European Patent Application No. 11831134.9", Filed Date: Jun. 12, 2014, 10 Pages.
"Response to Official Communication Filed in European Patent Application No. 12859485.0", Filed Date: Jun. 10, 2015, 20 Pages.
"Response to Official Communication Filed in European Patent Application No. 12859600.4", Filed Date: Aug. 10, 2015, 19 Pages.
"Response to Official Communication Filed in European Patent Application No. 12859972.7", Filed Date: Jul. 23, 2015, 17 Pages.
"Response to Official Communication Filed in European Patent Application No. 12860373.5", Filed Date: Oct. 14, 2015, 16 Pages.
"Response to Official Communication Filed in European Patent Application No. 12860631.6", Filed Date: Jun. 9, 2015, 17 Pages.
"Response to Restriction Requirement Filed in U.S. Appl. No. 13/726,048", filed Aug. 19, 2014, 10 Pages.
"Response to Restriction Requirement Filed in U.S. Appl. No. 13/726,049", filed Aug. 2, 2014, 8 Pages.
"Response to Restriction Requirement Filed in U.S. Appl. No. 13/726,097", filed May 12, 2014, 9 Pages.
Ashbrook, et al., "Using GPS to Learn Significant Locations and Predict Movement Across Multiple Users", In Proceedings of Personal and Ubiquitous Computing, vol. 7, Issue 5, Oct. 1, 2003, 15 Pages.
"Second Office Action Issued in Chinese Patent Application No. 201280064066.6", Mailed Date: Sep. 29, 2016, 6 Pages.
"Second Office Action Issued in Chinese Patent Application No. 201380038072.9", Mailed Date: Aug. 25, 2016, 9 Pages.
"Summons to Attend Oral Proceedings Issued in EP Patent Application No. 12859485.0", Mailed Date: Jul. 4, 2016, 12 Pages.
"Supplemental Amendment, Pre-Appeal Brief Request, and Notice of Appeal Filed in U.S. Appl. No. 13/726,031", filed Jun. 24, 2016, 7 Pages.
"Terminal Disclaimer and Response filed in U.S. Appl. No. 15/143,731", filed Oct. 25, 2016, 1 Page.
"Terminal Disclaimer Decision Issued in U.S. Appl. No. 14/686,300", Mailed Date: Aug. 30, 2016, 1 Page.
Karlson, Amy K., "Usage Profiles for the Mobile Phone", In Workshop on Security and Privacy Issues in Mobile Phone Use, May, 2008, 3 Pages.
"Terminal Disclaimer Filed in U.S. Appl. No. 13/875,139", filed Feb. 20, 2015, 2 Pages.
"Terminal Disclaimer Review Decision Issued in U.S. Appl. No. 13/875,139", Mailed Date: Feb. 23, 2015, 1 Page.
"iOS 5 Slowing iPhone 4 and 4S Complaints", Retrieved from <<http://www.phonesreview.co.uk/2011/10/25/ios-5-slowing-iphone-4-and-4s-complaints/>>, Oct. 25, 2011, 2 Pages.
"Communication Pursuant to Rules 70(2) and 70a(2) Issued in European Patent Application No. 12883789.5", Mailed Date: May 11, 2016, 1 Page.
Dissanayake, et al., "A Solution to the Simultaneous Localization and Map Building (SLAM) Problem", In Proceedings of IEEE Transactions on Robotics and Automation, vol. 17, Issue 3, Jun. 2001, pp. 229-241.
Gupta, et al., "Adding GPS-Control to Traditional Thermostats: An Exploration of Potential Energy Savings and Design Challenges", In Proceedings of the 7th International Conference on Pervasive Computing, May 11, 2009, 18 Pages.
"Advisory Action Issued in U.S. Appl. No. 13/726,031", Mailed Date: Jul. 14, 2016, 3 Pages.
"Amendment Filed in Australian Patent Application No. 2011312743", Filed Date: Jul. 18, 2014, 22 Pages.
"Amendment Filed in Australian Patent Application No. 2011312743", Filed Date: Sep. 22, 2014, 6 Pages.
"Amendment Filed in Chile Patent Application No. 886-2013", Filed Date: Apr. 10, 2015, 15 Pages.
"Amendment Filed in Chile Patent Application No. 886-2013", Filed Date: Aug. 6, 2015, 6 Pages.
"Amendment Filed in Chinese Patent Application No. 2011103178515", Filed Date: Jan. 8, 2014, 20 Pages.
"Amendment Filed in Chinese Patent Application No. 2011103178515", Filed Date: Jul. 22, 2014, 17 Pages.
"Amendment Filed in Chinese Patent Application No. 2011103178515", Filed Date: Jan. 28, 2015, 15 Pages.

(56) References Cited

OTHER PUBLICATIONS

"Amendment Filed in Chinese Patent Application No. 2011103178515", Filed Date: Aug. 3, 2015, 60 Pages.
"Amendment Filed in Japanese Patent Application No. 2013-532806", Filed Date: Aug. 14, 2015, 13 Pages. (w/o English Translation).
"Amendment Filed in U.S. Appl. No. 12/897,586", filed Apr. 15, 2013, 13 Pages.
"Amendment Filed in U.S. Appl. No. 12/897,586", filed Sep. 19, 2013, 12 Pages.
"Amendment Filed in U.S. Appl. No. 12/897,586", filed Aug. 20, 2014, 15 Pages.
"Amendment Filed in U.S. Appl. No. 13/726,027", filed Sep. 9, 2014, 14 Pages.
"Amendment Filed in U.S. Appl. No. 13/726,031", filed Dec. 1, 2014, 11 Pages.
"Amendment Filed in U.S. Appl. No. 13/726,031", filed Jun. 3, 2015, 13 Pages.
"Amendment Filed in U.S. Appl. No. 13/726,040", filed Apr. 28, 2015, 18 Pages.
"Amendment Filed in U.S. Appl. No. 13/726,040", filed Aug. 27, 2015, 15 Pages.
"Amendment Filed in U.S. Appl. No. 13/726,043", filed Dec. 30, 2014, 17 Pages.
"Amendment Filed in U.S. Appl. No. 13/726,043", filed May 12, 2015, 16 Pages.
"Amendment Filed in U.S. Appl. No. 13/726,048", filed Apr. 9, 2015, 16 Pages.
"Amendment Filed in U.S. Appl. No. 13/726,048", filed Nov. 5, 2015, 14 Pages.
"Amendment Filed in U.S. Appl. No. 13/726,048", filed Feb. 22, 2016, 18 Pages.
"Amendment Filed in U.S. Appl. No. 13/726,049", filed Sep. 15, 2015, 17 Pages.
"Amendment Filed in U.S. Appl. No. 13/726,049", filed Mar. 3, 2015, 14 Pages.
"Amendment Filed in U.S. Appl. No. 13/726,049", filed Apr. 28, 2016, 11 Pages.
"Amendment Filed in U.S. Appl. No. 13/726,090", filed Sep. 24, 2014, 16 Pages.
"Amendment Filed in U.S. Appl. No. 13/726,090", filed Jan. 14, 2015, 19 Pages.
"Amendment Filed in U.S. Appl. No. 13/726,090", filed Aug. 17, 2015, 17 Pages.
"Amendment Filed in U.S. Appl. No. 13/726,092", filed May 26, 2015, 20 Pages.
"Amendment Filed in U.S. Appl. No. 13/726,095", filed Nov. 17, 2014, 18 Pages.
"Amendment Filed in U.S. Appl. No. 13/726,095", filed Apr. 6, 2015, 11 Pages.
"Amendment Filed in U.S. Appl. No. 13/726,095", filed Aug. 6, 2015, 11 Pages.
"Amendment Filed in U.S. Appl. No. 13/726,099", filed Jun. 24, 2014, 10 Pages.
"Amendment Filed in U.S. Appl. No. 13/726,099", filed Dec. 19, 2014, 13 Pages.
"Amendment Filed in U.S. Appl. No. 13/726,099", filed Mar. 23, 2015, 11 Pages.
"Amendment Filed in U.S. Appl. No. 13/726,099", filed Sep. 8, 2015, 9 Pages.
"Amendment Filed in U.S. Appl. No. 13/726,099", filed Aug. 3, 2015, 13 Pages.
"Amendment Filed in U.S. Appl. No. 14/495,418", filed Aug. 19, 2015, 11 Pages.
"Amendment Filed in U.S. Appl. No. 14/686,300", filed Jul. 13, 2015, 9 Pages.
"Amendment Filed in U.S. Appl. No. 14/686,300", filed Oct. 27, 2015, 10 Pages.
"Amendment Filed in U.S. Appl. No. 14/686,300", Mailed Date: Feb. 29, 2016, 11 Pages.
Galloway, David, "Android Parental Control Contains Kid Access to Your Smartphone", Retrieved from <<http://lifehacker.com/5835066/android-parental-control-contains-kid-access-to-your-smartphone>>, Aug. 27, 2011, 3 Pages.
"Appeal Brief Filed in U.S. Appl. No. 13/726,031", filed Aug. 24, 2016, 43 Pages.
"Appeal Brief Filed in U.S. Appl.No. 14/686,300", filed Aug. 30, 2016, 32 Pages.
"Applicant Initiated Interview Summary Issued in U.S. Appl. No. 12/897,586", Mailed Date: Aug. 13, 2014, 3 Pages.
"Non-Final Office Action Issued in U.S. Appl. No. 15/216,552", dated Mar. 29, 2017, 20 Pages.
"First Office Action Issued in Chinese Patent Application No. 201280063918.X", dated Mar. 20, 2017, 13 Pages.
"First Office Action and Search Report Issued in Chinese Patent Application No. 201280063957.X", dated Mar. 22, 2017, 12 Pages.
"First Office Action and Search Report Issued in Chinese Patent Application No. 201280064052.4", dated Feb. 21, 2017, 13 Pages.

* cited by examiner

MOBILE DEVICE SAFE DRIVING

RELATED APPLICATIONS

This application is a continuation of and claims priority under 35 U.S.C. Section 120 to U.S. patent application Ser. No. 14/495,418, filed Sep. 24, 2014, entitled "Mobile Device Safe Driving" which claims priority under 35 U.S.C Section 120 to U.S. patent application Ser. No. 13/726,097, filed Dec. 22, 2012, entitled "Mobile Device Safe Driving" which claims priority under 35 U.S.C. Section 119(e) to U.S. Provisional Application Ser. No. 61/580,131 filed Dec. 23, 2011 entitled "Mobile Device Safe Driving" and U.S. Provisional Application Ser. No. 61/695,294 filed Aug. 30, 2012 entitled "Mobile Device Kid Space," the entire disclosures of each of these applications being incorporated by reference in their entirety.

BACKGROUND

Many types of devices, such as mobile phones, tablet devices, and other computing, communication, and entertainment devices increasingly offer more functions, applications, and features which are beneficial to a user, and can enhance one's personal time as well as work and social activities. For example, not only can a mobile phone be used for text, email, and voice communications, but may also be used for entertainment, such as to listen to music, surf the Internet, watch video content, gaming, and for photo and video imaging. Similarly, a portable tablet device may be utilized for email, browser, navigation, and other computing applications, as well as for the various entertainment and photo features. A significant trend and increasing problem with these always-connected mobile devices is distracted driving. Many drivers, and particularly teenage drivers, are tempted to send a quick text, make a call, or check a voice message while driving, which may lead to an accident.

SUMMARY

This Summary introduces features and simplified concepts of mobile device safe driving, which is further described below in the Detailed Description and/or shown in the Figures. This Summary should not be considered to describe essential features of the claimed subject matter, nor used to determine or limit the scope of the claimed subject matter.

Mobile device safe driving is described. In embodiments, a mobile device can display a device lock screen on an integrated display device, and transition from the device lock screen to display a driving mode lock screen. The transition to display the driving mode lock screen is without receiving a PIN code or other authentication credential entered on the device lock screen. The mobile device implements a safe driving service that is implemented to activate a safe driving mode of the mobile device, which disables features of the mobile device while the safe driving mode is activated.

In embodiments, the safe driving service is implemented to register safe driving events and unsafe driving events associated with use of the mobile device by a user of the mobile device driving. The safe driving service is configured to aggregate the safe driving events and generate a safe driving report that indicates safe driving and/or unsafe driving. The safe driving service can also communicate the safe driving report to an associated device of the mobile device. The safe driving report can indicate that the features of the mobile device were enabled by user override of a safe driving mode while the mobile device was moving in a vehicle.

In embodiments, the mobile device includes a communication interface for notification communication with associated devices of the device. The safe driving service can initiate communication of an unsafe driving notification to the associated devices. The device that is moving in the vehicle may include an audio sensor to detect audio in the vehicle, and the safe driving service can generate an unsafe driving notification to indicate that the audio in the vehicle is a driver distraction. The safe driving service can also generate an unsafe driving notification to indicate that the features of the device have been enabled by user override of a safe driving mode while the device is moving in the vehicle and the user of the device is driving the vehicle. The driver of a vehicle may be identified with a vehicle camera, or vehicle sensors, such as to detect voice ID, other biometric ID (e.g., a fingerprint reader integrated into the steering wheel), and/or other types of sensors within the vehicle that report back to the device to indicate that the user of the device is driving the vehicle. Other types of sensors may include seat sensors, and heat and/or contact sensors integrated into the steering wheel of a vehicle.

The safe driving service can also be implemented to determine that vehicle motion is erratic based on the motion data, and then generate an unsafe driving notification to indicate to users of the associated devices that the vehicle motion is erratic. The safe driving service is also implemented to determine that at least one of the associated devices is proximate the device in the vehicle, and determine that the associated device corresponds to an adult user. The safe driving service can then enable the features of the device when the associated device is proximate the device in the vehicle and corresponds to the adult user.

The safe driving service is also implemented to receive speed limit data that corresponds to a location of the vehicle, and communicate a vehicle speed limit to the vehicle to control vehicle speed at the location of the vehicle. The safe driving service is also implemented to determine that the vehicle has stopped at an unknown location and determine the location of the vehicle from the location data. The safe driving service can then generate an unsafe driving notification to indicate that the vehicle has stopped at the unknown location.

In other embodiments, a safe driving system includes a network service (e.g., a network of one or more server devices) that executes computer instructions as a safe driving service. The safe driving service is implemented to receive an unsafe driving notification from a device that is moving in a vehicle when a user of the device is driving the vehicle. The safe driving notification may indicate a driving condition. The safe driving service can then determine associated devices of the device based on identifiers of the device and the associated devices, and communicate the safe driving notification received from the device to the associated devices. The safe driving service can also receive a vehicle notification from the vehicle and communicate the vehicle notification to the associated devices. The safe driving service can also be implemented to receive location data that indicates a location of the vehicle, receive speed limit data that corresponds to the location of the vehicle, and communicate a vehicle speed limit to the vehicle to control vehicle speed at the location of the vehicle.

BRIEF DESCRIPTION OF THE DRAWINGS

Embodiments of mobile device safe driving are described with reference to the following Figures. The same numbers may be used throughout to reference like features and components that are shown in the Figures.

DETAILED DESCRIPTION

Figure 1:
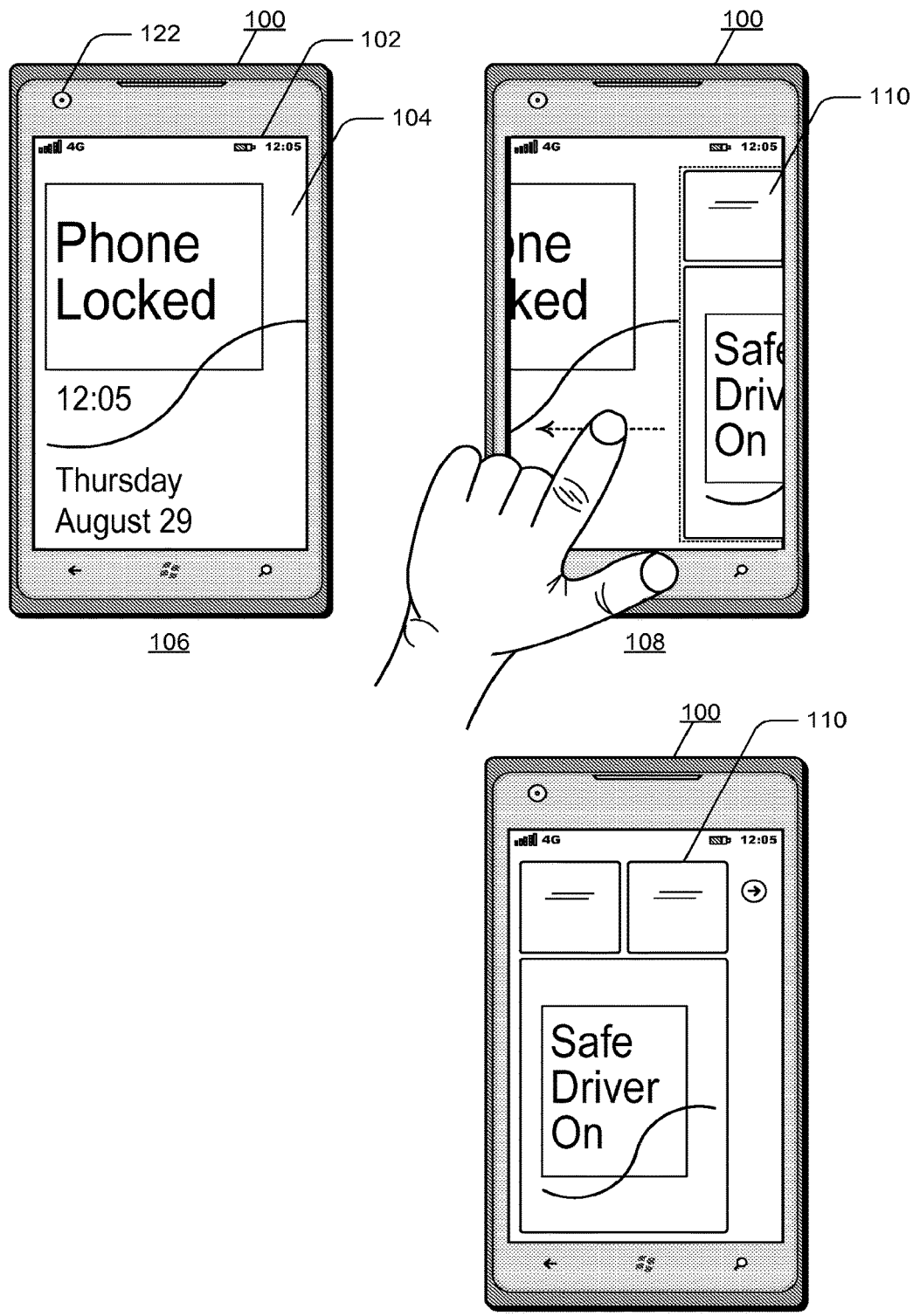
FIG. 1 illustrates an example of mobile device safe driving in accordance with one or more embodiments.

Embodiments of mobile device safe driving are described and provide a safe driving service that can be implemented as a mobile device service or application, such as in a mobile phone, portable tablet device, or other type of computing and/or communication device. Sensor systems may be implemented in an effort to determine whether a user owner of a mobile phone is both using the phone device and driving at the same time. However, this may be difficult to accurately detect, and the likelihood of false-positives can lead to incorrect determinations and false reporting. One solution for improving driving safety is to make it easier for a driver to be more responsible, with less possibility of distraction.

A safe driving mode places a mobile phone in a mode that minimizes distraction, and can help a driver be safer and more responsible while driving. A core goal of safe driving mode is not to attract attention to the device screen, or divert a driver's attention from the road. If drivers can simply initiate a safe driving mode without having to first enter a PIN code on a device lock screen, it is likely the drivers will choose the safer option and use the service. Additionally, the safe driving service can override the safe driving mode and return the device to normal user mode operation, such as when the device moved in manner that indicates use of the device is safe, such as when determining that driving has stopped. Further, a user of the device can easily override the safe driving mode to reactivate normal user mode operation, such as with a user input to the device (e.g., an input to the device power button) that quickly overrides and exits the safe driving mode.

A safe driving service can also be implemented to provide safe driving phone reports, such as a safe driving report for a teenage driver that is sent to a parent's device, for accountability and reporting. The reporting may also be via a cloud-based data service that aggregates the data in the cloud and generates a driving report for distribution to designated devices, such as to the parent of a teenage driver. A driving report may indicate successful and/or safe driving, such as a notice of "no recorded unsafe use of a phone when driving". Similarly, a driving report may indicate unsafe driving or an "unlock phone" override event, in which case the safe driving service can log the next actions or events to determine whether a driving mode violation occurred. A parent of a teenage driver, for example, can determine unsafe driving habits and behavior in a transparent manner, which provides the parent a reporting tool and an opportunity for a safety-minded conversation. This approach may be a preferable alternative to completely locking or disabling the teenage driver's phone.

While features and concepts of mobile device safe driving can be implemented in any number of different devices, systems, environments, and/or configurations, embodiments of mobile device safe driving are described in the context of the following example devices, systems, and methods.

FIG. 1 illustrates an example of user interfaces for mobile device safe driving. An example mobile device 100 may be any one or combination of a mobile phone, tablet device, computing device, communication, entertainment, gaming, navigation, and/or other type of portable electronic device. The example mobile device 100 includes an integrated display device 102 on which user interfaces can be displayed, such as a device lock screen 104 that indicates the device is locked at 106. For example, a user owner of the mobile device may set-up the device to lock when not in use so that someone else cannot access the device.

As a driver of a vehicle, the user owner of the mobile device 100 can initiate activation of safe driving mode without having to unlock the device from the device lock screen 104. As shown in the example 108, the user can swipe the device lock screen with a gesture input to transition the display to a driving mode lock screen 110, which is illustrated at 112 when displayed on the display device. The transition to the driving mode lock screen 110 can be initiated without a PIN code or other authentication credential entered on the device lock screen 104. In implementations, the gesture input may be any type of user and/or gesture input in any direction on the integrated display device 102 of the mobile device. Alternatively or in addition, any type of device, button, and/or gesture inputs may be utilized effective to transition from the device lock screen 104 to the driving mode lock screen 110. When a safe driving mode is activated on the mobile device 100, the aspects and features described herein for restricted execution modes (e.g., FIGS. 8-12) may be utilized to support and implement the safe driving mode as a restricted execution mode.

Figure 2:
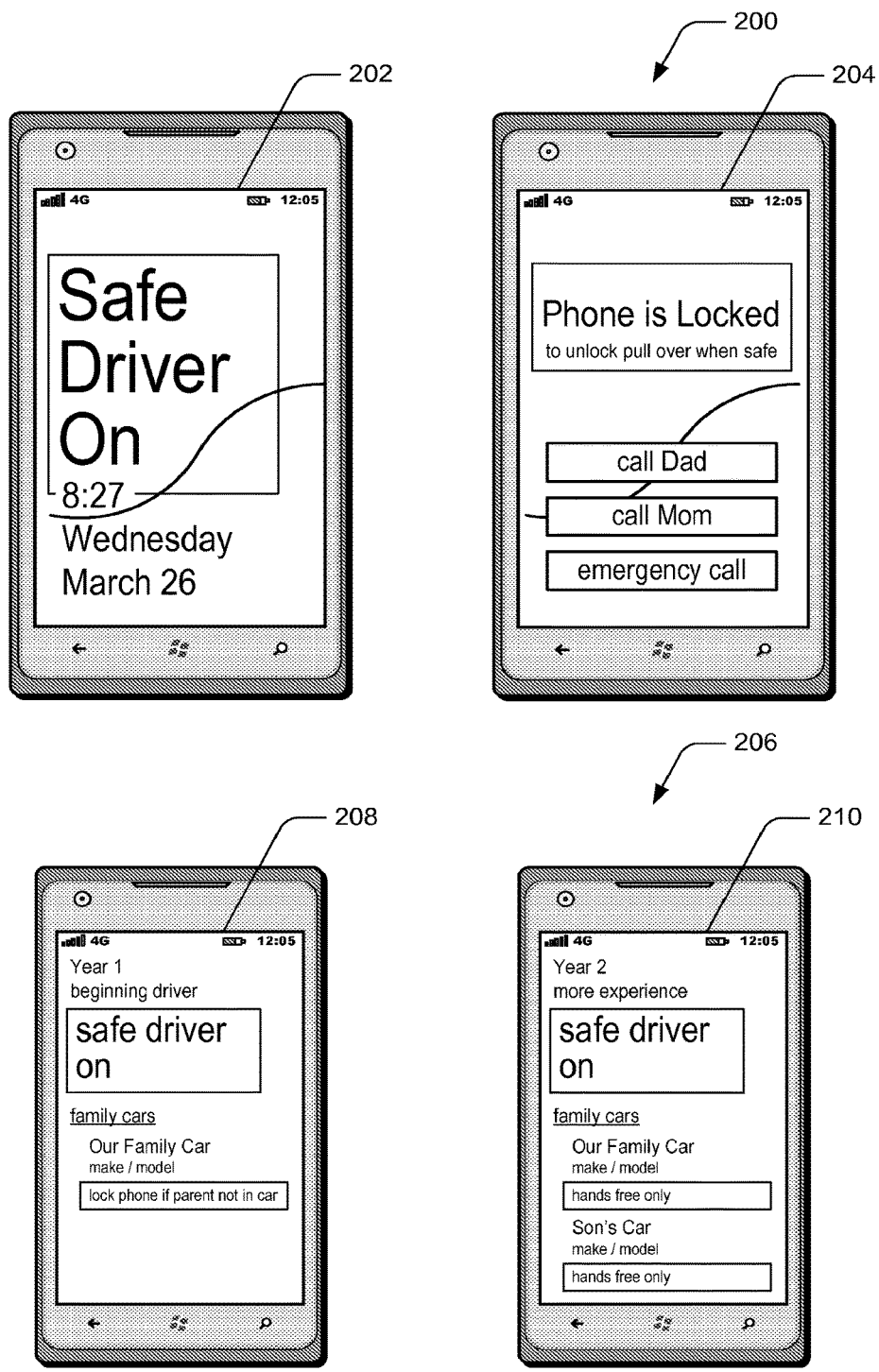
FIG. 2 illustrates examples of safe driving mode in accordance with one or more embodiments.

FIG. 2 illustrates examples 200 of safe driving mode user interfaces, such as a lock screen 202 displayed on a mobile phone 100 when the safe driving mode is active. Another lock screen 204 is an example of a display that indicates the phone is locked, but capable of enabling critical functionality like emergency calls or calls to a "white list" of important contacts. In an example, safe driving mode settings 206 are illustrated for a teenager in two different years.

As shown in a user interface for the first year of driving 208, the teen is a new driver and has access only to the family car. In his first year, his parents have used a settings user interface to restrict his usage and lock the phone completely unless a parent is also in the car. As shown in a user interface for the second year of driving 210, the teen has his own car and his parents have allowed him to move up to hands-free operation with both vehicles.

Embodiments of mobile device safe driving incorporate bi-directional communication with a vehicle, or can be implemented for no communication with the vehicle. Mobile device safe driving can also be implemented to limit vehicle speed so that a teenage driver cannot exceed a designated speed limit, such as in a school zone. Safe driving can also communicate car service reminders to the driver, such as to change the oil, wiper blades, etc. At the time of a crash, the phone device can automatically report its status, send messages, alert emergency services, etc. An emergency may be based on crash impact data, or based on erratic inputs (e.g., due to a diabetic episode, heart attack, blown tire, etc.). For some emergencies, the safe driving service can slow the vehicle down, such as for a blown tire. For other emergency alert scenarios, the safe driving service can initiate a safety timer and/or initiate sending a text or other type of message. The safe driving service can initiate the safety timer as a display on the mobile device, such as "Emergency Detected: Sending an Alert in N seconds" and start a countdown, which provides the user of the device an opportunity to cancel the alert before a message is automatically sent. An emergency and/or other possible alert situation may also be based on a vehicle breakdown when the vehicle is pulled over to the side of the road at a detected location that would not typically be a stopping location.

Safe driving features and modes can be implemented for different levels of permissions for family members, to loan a car to a friend, for valet monitoring, etc. The vehicle that is associated with a mobile phone and user can communicate independently of the device, such as indirectly through a cloud-based service to communicate safe driving mode notifications to a parent and/or family members. A safe driving mode notification may alert a driver that he or she is going to be late for an appointment based on the current route of travel and destination. A message can then be generated to inform the driver to re-route, edit an errand list, update GPS, etc. For example, a driver may be on a list of errands for Mom with mom's car. When mom cancels one of the errands from the shared calendar, GPS informs the Kid driver to skip the next errand stop.

Safe driving features and mode implementations can also be utilized to manage a fleet of any type vehicles. As a driver approaches a vehicle, the driver's phone is identified to the vehicle and can be paired with the vehicle, such as via Bluetooth, WiFi, or other addressable device. This may be integrated with a key fob location proximate the ignition switch in a vehicle and/or setup for different profiles based on the vehicle and phone to checkout a vehicle.

In a safe driving mode, a kid's phone can become a communication channel that a parent can open with his or her phone, such as to activate the kid's phone to record video and/or audio at its current location. This may also be auto-activated, such as when the kid's phone is in another car that has been detected driving erratically or at excessive speed to send a safe driving mode notification to the parent's phone device. Safe driving features and modes are not limited to the control of a parent over a teenage driver. Any person that wants to drive safer can initiate the safe driving features and modes on his or her device. For example, a rental car company can discount a driver if the driver implements safe driving mode while driving a rented car.

Safe driving features and modes can also provide warnings, messages, and notifications when driving in other countries or regions (e.g., regional or country specific safe driving), such as notifications of different road rules when driving in different countries. Safe driving features may also be implemented to recognize road and/or weather conditions, and provide warnings and notifications. Safe driving mode notifications can be filtered and optionally programmed. For events of a certain type, an immediate message may be generated, such as any one of an SMS, MIMS, or instant message. Alternatively or in addition, a daily or weekly driving report can be generated and communicated.

Mobile device safe driving can utilize phone device sensors and features, such as to determine if a user is traveling on a train as a passenger, or determine bus pass information. A user passenger status may also be determined from audio and/or camera images used to determine one's space in car, train, or other vehicle. Features may also be implemented to determine media access control (MAC) address ranges to identify proximate conveyances (e.g., not just passing cars).

A safe driving application may be implemented in the vehicle for the bulk of the data processing, and the phone device is then a client device to the vehicle. Safe driving features can incorporate a theft deterrent in the vehicle application that identifies only those phone devices that, when proximate or in the vehicle, allow the vehicle to start and be driven. Near field communication (NFC) tags can be implemented in a vehicle, such as in the doors of the vehicle, to identify proximate phone devices of associated users in the seats of the vehicle.

Safe driving features reduce and/or eliminate the distractions associated with a mobile device while driving. A mobile device, such as a mobile phone, can be synced with the automobile being driven, and based on geo-location and/or acceleration rates, functions of the mobile phone can be disabled or partially disabled (e.g., when a safe driving mode is activated). A safe driving implementation may be an application that can not be uninstalled from a mobile device, such as when implemented as part of the operating system of a device. Alternatively, a safe driving application may be downloaded to a mobile device as an aftermarket, first-party, or third-party application. Embodiments of safe driving include any one or combination of implementation features, such as described in the following paragraphs.

A safe driving disabled mode is an example of a safe driving feature that can be implemented for a mobile device when a user is operating a vehicle with a wireless beacon device associated with the vehicle (e.g., a Bluetooth hands-free speaker/microphone device). Mobile device safe driving provides that a restrictive disabled mode is turned-off or deactivated when a mobile device is in the presence of both a vehicle wireless beacon device and another mobile device owned by an associated parent or guardian. In this manner, the solution does not present as a failure to the owner of the device. If the device owner is a teenager and Mom is driving, the teenager has normal access to the device capabilities. If the device owner is a teenager and he or she is driving, the safe driving mode can be disabled, but the solution relies on the presence of Mom to reinforce and/or remind the teenager of good driving habits. Safe driving mode implementations can dynamically change behaviors based on who is in the vehicle.

Devices and/or device accounts can be associated within a set of devices or device accounts (e.g., a family phone account, live accounts, a connected set of devices, etc.), and all or a subset of the devices or accounts can communicate with other devices or accounts. Mobile device safe driving can be implemented to restrict access to a phone based on GPS acceleration data, distinguished from the physical act of driving with car monitors. Safe driving is not necessarily tied to a particular vehicle, and can be related to other contextual information that is not registered by car monitors, such as loud music, distracting friends in the car, or other sources of distraction that range from passive to active behaviors. Safe driving information can be used to counter insurance claims of unsafe driving and rate increases, and not just for teenagers, but also senior citizens, drivers with DUI's, etc.

A safe driving mode user interface is implemented from which safe driving mode settings can be enabled and disabled, and there may be many levels of disabling device capabilities. For example, a safe driving mode can render the device completely disabled, or just text messaging is disabled to eliminate texting while driving, but not texting while a passenger in the vehicle. A device in safe driving mode can display an indication that a safe driving mode is enabled, such as an icon next to the current time/day and/or the words "Safe Driving Mode On" on a device home screen or lock screen. Safe driving mode settings can associate one or more vehicles to any user and/or number of devices. The safe driving mode settings can all be set remotely from an authoritative phone device, such as a parent's mobile phone.

Figure 3:
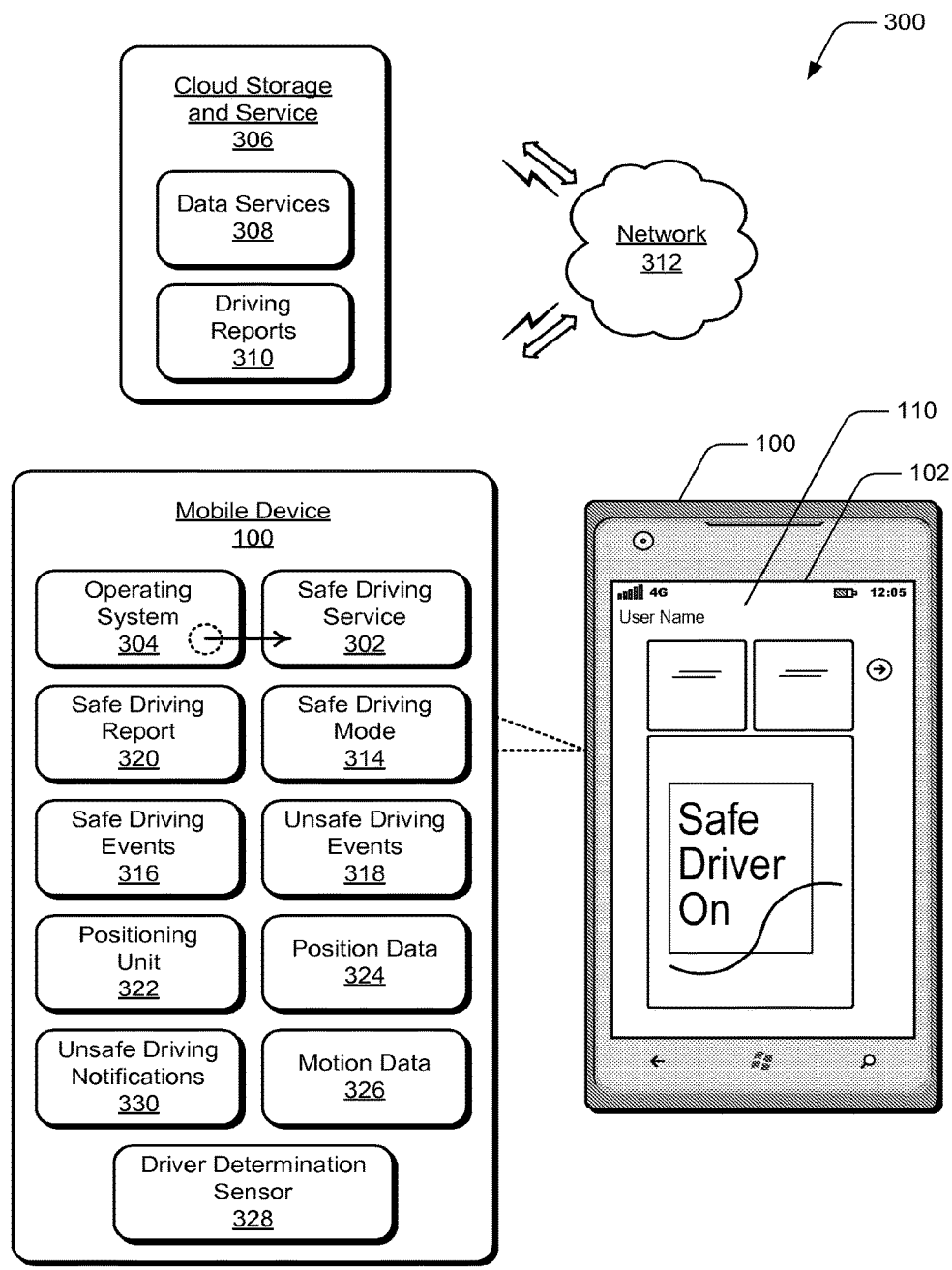
FIG. 3 illustrates an example system in which embodiments of mobile device safe driving can be implemented.

FIG. 3 illustrates an example system 300 in which embodiments of mobile device safe driving can be implemented. The example system includes the mobile device 100 as described with reference to FIG. 1, with the integrated display device 102 on which a user interface can be displayed, such as the driving mode lock screen 110. Additionally, the mobile device can be implemented with various components, such as a processor and/or memory system, as well as any number and combination of differing components as further described with reference to the example device shown in FIG. 12 to implement embodiments of mobile device safe driving.

The mobile device 100 includes a safe driving service 302, such as a software application implemented as executable instructions that are stored on computer-readable storage media, such as any suitable memory device or electronic data storage. Additionally, the safe driving service 302 can be executed with a processing system at the mobile device to implement embodiments of mobile device safe driving as described herein. The safe driving service 302 may be implemented as an independent device application that is executable on the device to interface with the many applications, features, and functions of the device.

The example system 300 also includes a cloud storage and service 306 that can include any type of cloud-based (e.g., network-based) data services 308 used to store or maintain driving reports 310, which are an aggregate of safe driving events and unsafe driving events, and the reports indicate safe driving and/or unsafe driving. A safe driving report can also indicate that the features of a mobile device were enabled by user override while the mobile device was moving in a vehicle.

Any of the devices and services (e.g., implemented as server devices) described herein can communicate via a network 312, which can be implemented to include a wired and/or a wireless network. The network can also be implemented using any type of network topology and/or communication protocol, and can be represented or otherwise implemented as a combination of two or more networks, to include IP-based networks and/or the Internet. The network may also include mobile operator networks that are managed by a mobile network operator and/or other network operators, such as a communication service provider, mobile phone provider, and/or Internet service provider. Alternatively or in addition, peer-to-peer communication techniques may be utilized, such as multiple devices connected using a peer-to-peer communication network.

The safe driving service 302 is implemented to activate a safe driving mode 314 when a user of the device transitions to the driving mode lock screen 110, and the safe driving service disables features of the mobile device while the safe driving mode is activated. Features of the mobile device can include the communication features of the device, such as any one or combination of text messaging, instant messaging, and voice communication, as well as the integrated display device 102, which may be temporarily disabled from displaying distracting information.

The safe driving service 302 is implemented to register safe driving events 316 and unsafe driving events 318 associated with use (or non-use) of the mobile device by a user who is currently driving. Generally, it is unsafe to use a mobile device in any manner that averts driver attention from looking at the road to looking at the device. In some instances, the mobile device may be used in safe manner while driving, such as when listening to turn-by-turn navigation directions, or when text messages are converted to audio so that the driver can listen to incoming text messages while maintaining focus on the road. Accordingly, a reported safe event can be based on detection that a user is driving a vehicle and a safe driving mode 314 has been activated on his or her mobile device, or when the user overrides the safe driving mode to use the device, but the vehicle has stopped moving. Reported unsafe events can include a teenage driver using his or her mobile device while driving and when the vehicle is in motion, manually overriding the safe driving mode to use the device while the vehicle is moving, disabling the safe driving lock screen, or any other combination of a user driving and using a mobile device at the same time.

The safe driving service 302 can then aggregate the safe driving events 316 and the unsafe driving events 318 to generate a safe driving report 320 that indicates safe driving and/or unsafe driving based on the safe and unsafe driving events. A safe driving report can include a summary of the safe driving events and the unsafe driving events, as well as statistical indications of safe driving events to unsafe driving events (e.g., an 80% safe driver). The safe driving service can communicate (or initiate communication thereof) a safe driving report 320 to an associated device of the mobile device.

The mobile device 100 may include a positioning unit 322, such as a Global Positioning System (GPS), Assisted-GPS (A-GPS), or similar geographical positioning unit, to determine geographic location data 324 and motion data 326 that indicates the device is moving and possibly the speed or acceleration at which the device is moving, such as in a vehicle. The mobile device also includes a driver determination sensor 328, such as an integrated camera that generates a digital image. A vehicle may also include a camera that communicates with the mobile device 100 as a position sensor to indicate the location of a user of the device in the vehicle. A vehicle may also include other features to detect that a user with a device in close proximity is driving the vehicle.

A driver determination sensor 328 may also be implemented as any other type of sensor that indicates whether a user of the device is driving a vehicle or is a passenger in the vehicle. For example, a driver determination sensor may be implemented for any type of wireless communication, such as near field communication (NFC) with the vehicle, and the safe driving service can determine whether the user of the device is driving the vehicle or is a passenger in the vehicle based on the wireless and/or near-field communication. Other types of vehicle sensors may detect voice ID or other biometric ID (e.g., a fingerprint reader integrated into the steering wheel). Other types of sensors within the vehicle that report back to the device to indicate that the user of the device is driving the vehicle may include seat sensors, and heat and/or contact sensors integrated into the steering wheel of the vehicle.

The safe driving service 302 is implemented to determine that the mobile device is moving in a vehicle based on the motion data 326, and determine that the user of the device is driving the vehicle based on sensor data from the driver determination sensor 328, such as based on a digital image from the integrated camera, based on a digital image from a camera integrated with the vehicle, wireless sensor communication, and/or based on NFC. The safe driving service can then disable features of the device, such as the communication features, when the mobile device is moving in the vehicle and the user of the device is driving the vehicle, e.g., by entering a safe driving mode automatically. As described further herein, a user may also voluntarily elect to enter a safe driving mode that disables features of the device without the input of sensors, e.g., by inputting an input to a lock screen. The communication features of the device can include any one or combination of text messaging, instant messaging, and voice communication, as well as the integrated display device 102, which may be temporarily disabled from displaying messages and alerts, or from turning on. The safe driving service can also determine that the user of the mobile device is a passenger in the vehicle, and then determine that safe driving mode should not be entered and/or should be exited in order to enable the features of the device.

The safe driving service 302 is also implemented to initiate communication of safe driving notifications 330 to other devices that are associated with the mobile device. For example, the mobile device may include an audio sensor to detect an audio level in the vehicle, and the safe driving service can generate an unsafe driving notification to indicate that the audio level in the vehicle is a driver distraction. The safe driving notification can then be communicated to associated devices of the device to inform the users of the other devices. Although a safe driving report 320 may be generated based on an aggregate of the safe driving events 316 and the unsafe driving events 318 over time, an unsafe driving notification 330 can be reported out immediately. For example, although a safe driving report that indicates an audio level distraction in a vehicle two days ago may be useful for discussion with a young driver, an unsafe driving notification can be generated during the unsafe distraction in an effort to correct the current unsafe driving condition. The safe driving service can also generate an unsafe driving notification to indicate that the features of the device, such as the communication features, have been enabled by user override while the device is moving in a vehicle and the user of the device is driving the vehicle. This type of action may be reported as both an unsafe driving event 318 in a subsequent safe driving report 320, and as an immediate safe driving notification, such as to a parent of the driver.

The safe driving service 302 can also be implemented to determine that vehicle motion is erratic based on the motion data 326, and then generate an unsafe driving notification to indicate to users of the associated devices that the vehicle motion is erratic. The safe driving service can also determine that at least one of the associated devices is proximate the mobile device 100 in the vehicle, determine that the associated device corresponds to an adult user, and then enable the features of the mobile device of the driver of the vehicle.

The safe driving service 302 is also implemented to receive speed limit data that corresponds to a location of the vehicle, and communicate a vehicle speed limit to the vehicle to control vehicle speed at the location of the vehicle. The safe driving service can also determine that the vehicle has stopped at an unknown location, such as beside the road somewhere, and determine a location of the vehicle from the location data 324. The safe driving service can then generate an unsafe driving notification 330 to indicate that the vehicle has stopped at the unknown location at the determined position of the vehicle to inform users of associated devices.

Example methods 400, 500, and 700 are described with reference to respective FIGS. 4, 5, and 7 in accordance with one or more embodiments of mobile device safe driving. Generally, any of the services, components, modules, methods, and operations described herein can be implemented using software, firmware, hardware (e.g., fixed logic circuitry), manual processing, or any combination thereof. Example methods may be described in the general context of executable instructions stored on computer-readable storage media that is local and/or remote to a computer processing system, and implementations can include software applications, programs, functions, and the like.

Figure 4:
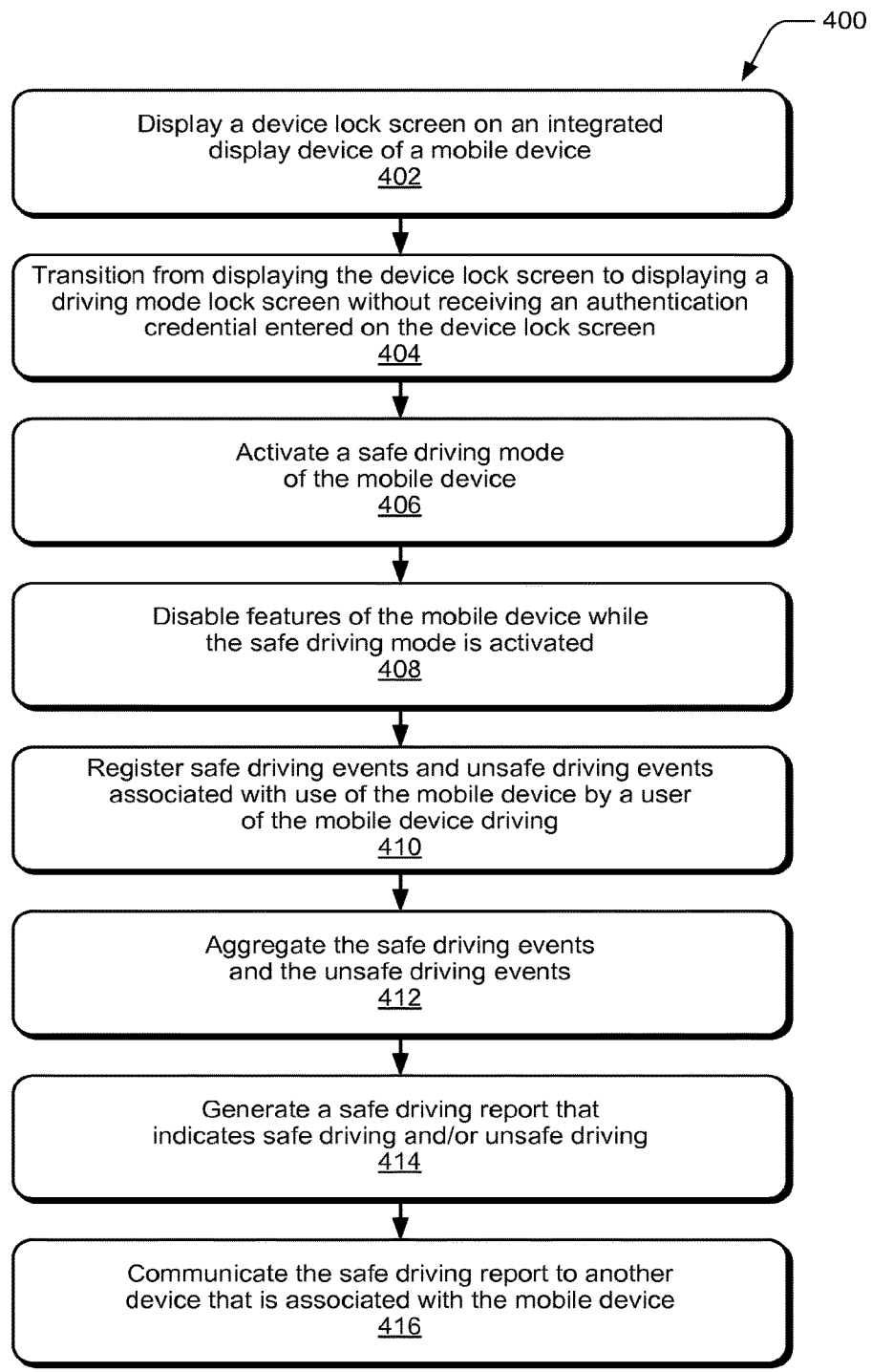
FIG. 4 illustrates example method(s) of mobile device safe driving in accordance with one or more embodiments.

FIG. 4 illustrates example method(s) 400 of mobile device safe driving. The order in which the method is described is not intended to be construed as a limitation, and any number or combination of the method operations can be combined in any order to implement a method, or an alternate method.

At 402, a device lock screen is displayed on an integrated display device of a mobile device. For example, the mobile device 100 (FIG. 1) displays a device lock screen 104 on the integrated display device 102 of the mobile device. At 404, the display is transitioned from the device lock screen to display a driving mode lock screen without a PIN code or other authentication credential entered on the device lock screen. For example, an input system of the mobile device 100 receives an input, such as a gesture input or device selectable control input, and the input is effective to transition from displaying the device lock screen 104 to display the driving mode lock screen 110 without a PIN code entered on the device lock screen.

Alternatively or in addition, the display of the mobile device may be automatically transitioned from the device lock screen to display a driving mode lock screen without manual user intervention, such as if the device determines that the user has begun driving based on detected sensor data, such as a seat sensor, heat and/or contact sensors integrated into the steering wheel, or a fingerprint reader integrated into the steering wheel. Driver determination sensor data may also be determined from near field communication (NFC) within the vehicle that indicates whether the user of the device is driving the vehicle or is a passenger in the vehicle.

At 406, a safe driving mode of the mobile device is activated, either in response to user input or automatically as described at 404. For example, the safe driving service 302 (FIG. 3) at the mobile device 100 activates the safe driving mode 314 of the mobile device. At 408, features of the mobile device are disabled while the safe driving mode is activated. For example, the safe driving service 302 at the mobile device 100 disables features of the mobile device while the safe driving mode 314 is activated, such as the communication features of the device (e.g., to include any one or combination of text messaging, instant messaging, and voice communication), as well as the integrated display of the device, which may be temporarily disabled from displaying messages and alerts, or from turning on at all.

At 410, safe driving events and unsafe driving events associated with use of the mobile device by a user of the mobile device driving are registered. For example, the safe driving service 302 at the mobile device 100 registers the safe driving events 316 and the unsafe driving events 318 associated with use of the mobile device by a user who is determined to be concurrently driving. A safe driving event can include a driver having a safe driving mode 314 activated on his or her mobile device while driving a vehicle, or stopping the vehicle before manually overriding the safe driving mode to use the device. Unsafe driving events can include a teenage driver using his or her mobile device while driving and when the vehicle is in motion, manually overriding the safe driving mode to use the device while the vehicle is moving, disabling the safe driving lock screen, or any other combination of a user driving and using a mobile device at the same time.

At 412, the safe driving events and the unsafe driving events are aggregated. For example, the safe driving service 302 at the mobile device 100 aggregates the safe driving events and the unsafe driving events. At 414, a safe driving report that indicates safe driving and/or unsafe driving is generated. For example, the safe driving service 302 at the mobile device 100 generates a safe driving report 320 that indicates safe driving and/or unsafe driving. A safe driving report can include a summary of the safe driving events and the unsafe driving events, as well as statistical indications of safe driving events to unsafe driving events (e.g., an 80% safe driver).

At 416, the safe driving report is communicated to another device that is associated with the mobile device. For example, the safe driving service 302 at the mobile device 100 communicates the safe driving report is communicated to an associated device of the mobile device.

Figure 5:
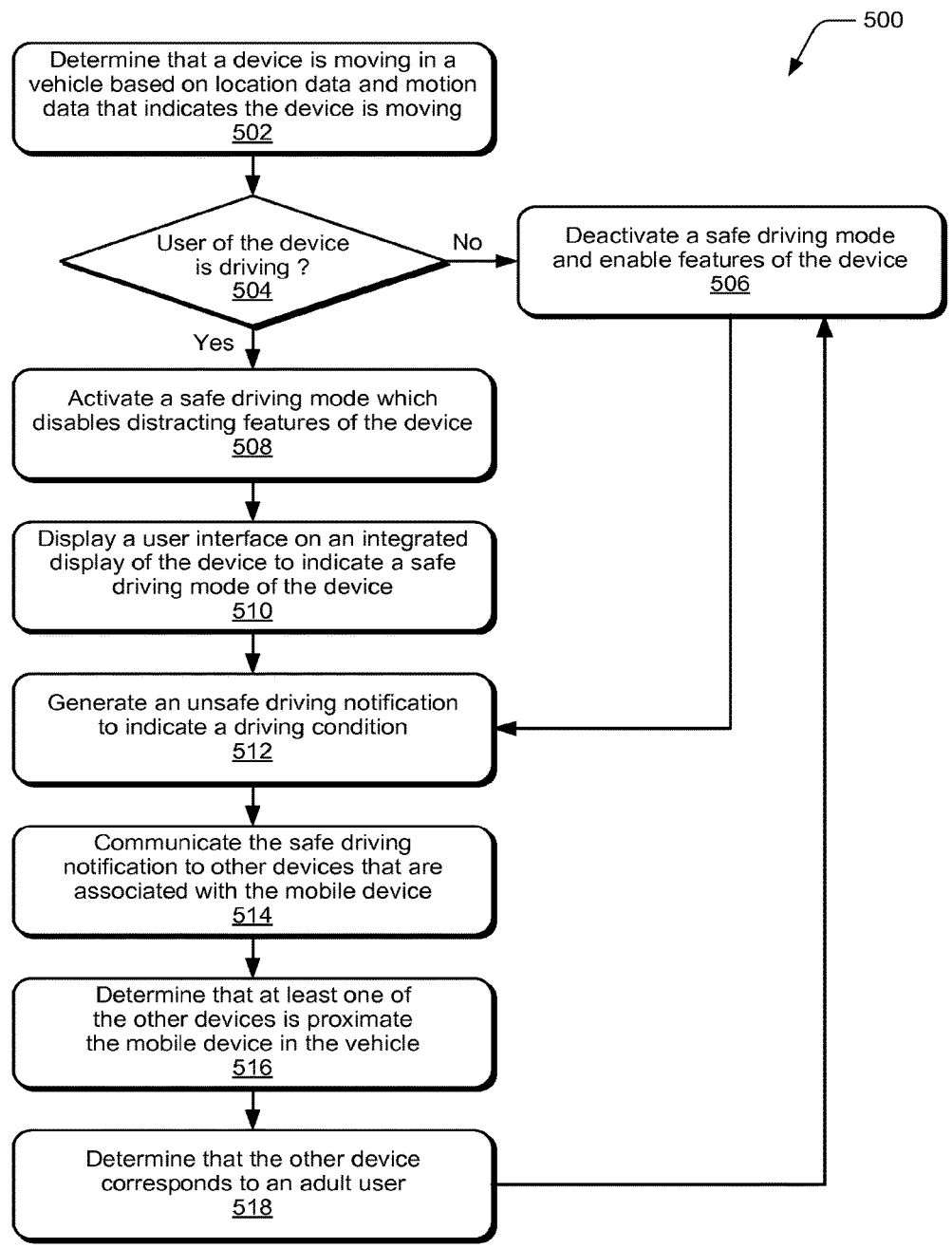
FIG. 5 illustrates example method(s) of mobile device safe driving in accordance with one or more embodiments.

FIG. 5 illustrates example method(s) 500 of mobile device safe driving. The order in which the method is described is not intended to be construed as a limitation, and any number or combination of the method operations can be combined in any order to implement a method, or an alternate method.

At 502, a determination is made that a device is moving in a vehicle based on location data and motion data that indicates the device is moving. For example, the positioning unit 322 (e.g., a GPS unit and/or other type of positioning system component) at the mobile device 100 (FIG. 3) determines that the mobile device 100 is moving in a vehicle based on geographic location data and motion data that indicates the device is moving.

At 504, a determination is made as to whether a user of the device is driving the vehicle, e.g., based on sensor data from a driver determination sensor. For example, the safe driving service 302 at the mobile device 100 determines whether a user of the device is driving the vehicle based on sensor data from a driver determination sensor. If the user of the device is a passenger in the vehicle (i.e., no from 504), then at 506, a safe driving mode on the mobile device is deactivated the features of the device are enabled. For example, the safe driving service 302 at the mobile device 100 enables the features of the device, such as the communication features and/or the integrated display, responsive to the determination that the user of the device is a passenger in the vehicle.

If the user of the device is driving the vehicle (i.e., yes from 504), then at 508, the safe driving mode is activated, which disables distracting features of the mobile device. For example, the safe driving service 302 at the mobile device 100 activates the safe driving mode, which disables distracting features of the device (e.g., communication features that include text messaging, instant messaging, and voice communication) responsive to the determinations that the device is moving in the vehicle (at 502) and the user of the device is driving the vehicle (at 504). In implementations, some features of the device can be disabled, while others remain enabled. For example, text messaging may be disabled, while hands-free calls to or from designated numbers remains enabled as well as a feature of the device that converts a text message to audio so that a driver can focus on driving while listening to incoming text messages.

At 510, a user interface is displayed on an integrated display of the device to indicate a safe driving mode of the device has been activated. For example, the mobile device 100 includes the integrated display device 102 on which a safe driving lock screen 110 is displayed to indicate a safe driving mode of the device has been activated.

At 512, an unsafe driving notification of an unsafe driving event is generated to indicate an unsafe driving condition. For example, the safe driving service 302 at the mobile device 100 generates an unsafe driving notification 330 to indicate that an unsafe driving condition currently exists in a vehicle (or having to do with a vehicle). For example, unlike a safe driving report 320 that may be generated based on an aggregate of the safe driving events 316 and the unsafe driving events 318 over time, an unsafe driving notification 330 can be reported out immediately, such as during the unsafe distraction in a vehicle in an effort to correct the current unsafe driving condition. The safe driving service can also generate an unsafe driving notification to indicate that the features of the device, such as the communication features, have been enabled by user override while the device is moving in a vehicle and the user of the device is driving the vehicle.

At 514, the unsafe driving notification is communicated to one or more other devices that are associated with the mobile device. For example, the safe driving service 302 at the mobile device 100 initiates communication of the unsafe driving notification to the other devices that are associated with the mobile device. At 516, a determination is made that at least one of the other devices is proximate the device in the vehicle. For example, the safe driving service 302 at the mobile device 100 determines that at least one of the other devices that is associated with the mobile device is proximate the mobile device in the vehicle.

At 518, a determination is made that the other device corresponds to an adult user or other supervisory user. For example, the safe driving service 302 at the mobile device 100 determines that the other device that is associated with the mobile device and proximate the mobile device in the vehicle, corresponds to an adult user or other supervisory user. Responsive to the determinations that the other associated device is proximate the mobile device in the vehicle (at 516) and corresponds to an adult user (at 518), the safe driving service 302 deactivates the safe driving mode on the device and enables the features of the mobile device 100 at 510.

Figure 6:
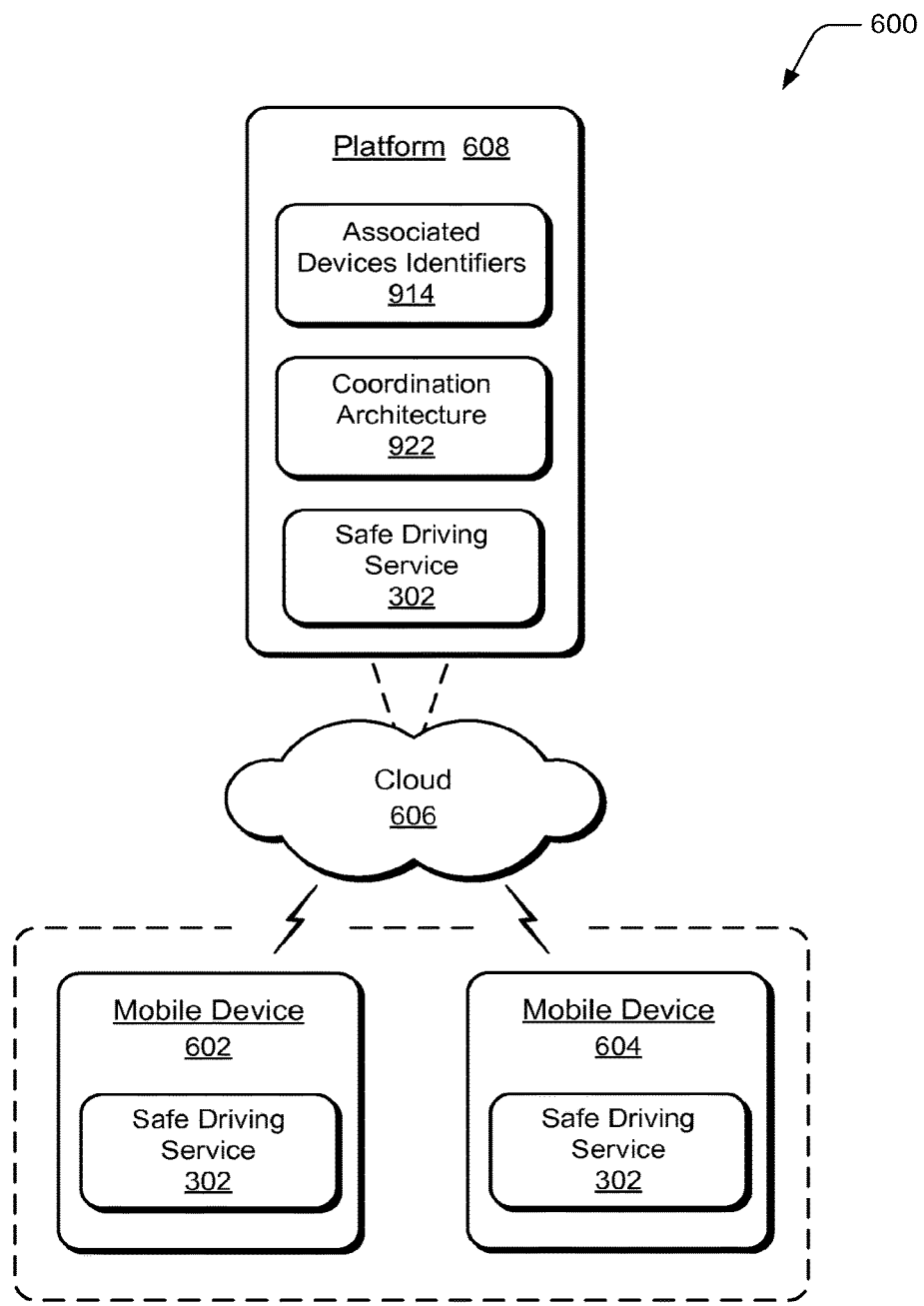
FIG. 6 illustrates an example system in which embodiments of mobile device safe driving can be implemented.

FIG. 6 illustrates an example system 600 that includes mobile devices 602 and 604 that are examples of the mobile device 100 as described with reference to the previous FIGS. 1-5. In embodiments, the mobile devices 602 and 604 can each be associated with a different user, and the users may be defined members of private interaction hub, which may include two or more associated devices. The mobile devices each include an implementation of the safe driving service 302 as described with reference to the previous FIGS. 1-5. In the example system 600, multiple devices can be interconnected through a central computing device or system, which may be local to the multiple devices or may be located remotely from the multiple devices.

In embodiments, the central computing device may be a cloud 606 of one or more server computers that are connected to the multiple devices through a network, the Internet, or other data communication link. In embodiments, this interconnection architecture enables functionality across multiple devices to provide a networked service environment of the multiple devices. Each of the devices may have different physical configurations and capabilities, and the central computing device can utilize a platform 608 to maintain associated devices identifiers 914, and implement the coordination architecture 922 and/or the safe driving service 302 in embodiments of mobile device safe driving.

The cloud 606 includes and/or is representative of the platform 608 for the networked service components (e.g., the safe driving service 302) that implements embodiments of mobile device safe driving. The platform abstracts underlying functionality of hardware, such as server devices, and/or software resources of the cloud. The networked service components may include applications and/or data that can be utilized while computer processing is executed on servers that are remote from the mobile devices 602 and 604.

In embodiments, the safe driving service 302 at the platform 608 is implemented to receive an unsafe driving notification from a mobile device 602 when an unsafe driving notification is initiated from the device. The safe driving service can then determine associated devices of the device based on the associated devices identifiers 914, and communicate the unsafe driving notification received from the device 602 to the other device 604 (and to any other associated devices). Additionally, the safe driving service can communicate the safe driving notification to the other devices in multiple formats, such as a text message, an instant message, an audible message, as a hub message, or as an image for display at the associated devices. The safe driving service 302 at the platform 608 can also receive safe driving events 316 and unsafe driving events 318 from the mobile devices, and aggregate the driving events to generate a safe driving report 320 that is communicated out to the associated devices. The safe driving service 302 at the platform 608 can also implement any of the embodiments and features of mobile device safe driving as described herein.

Figure 7:
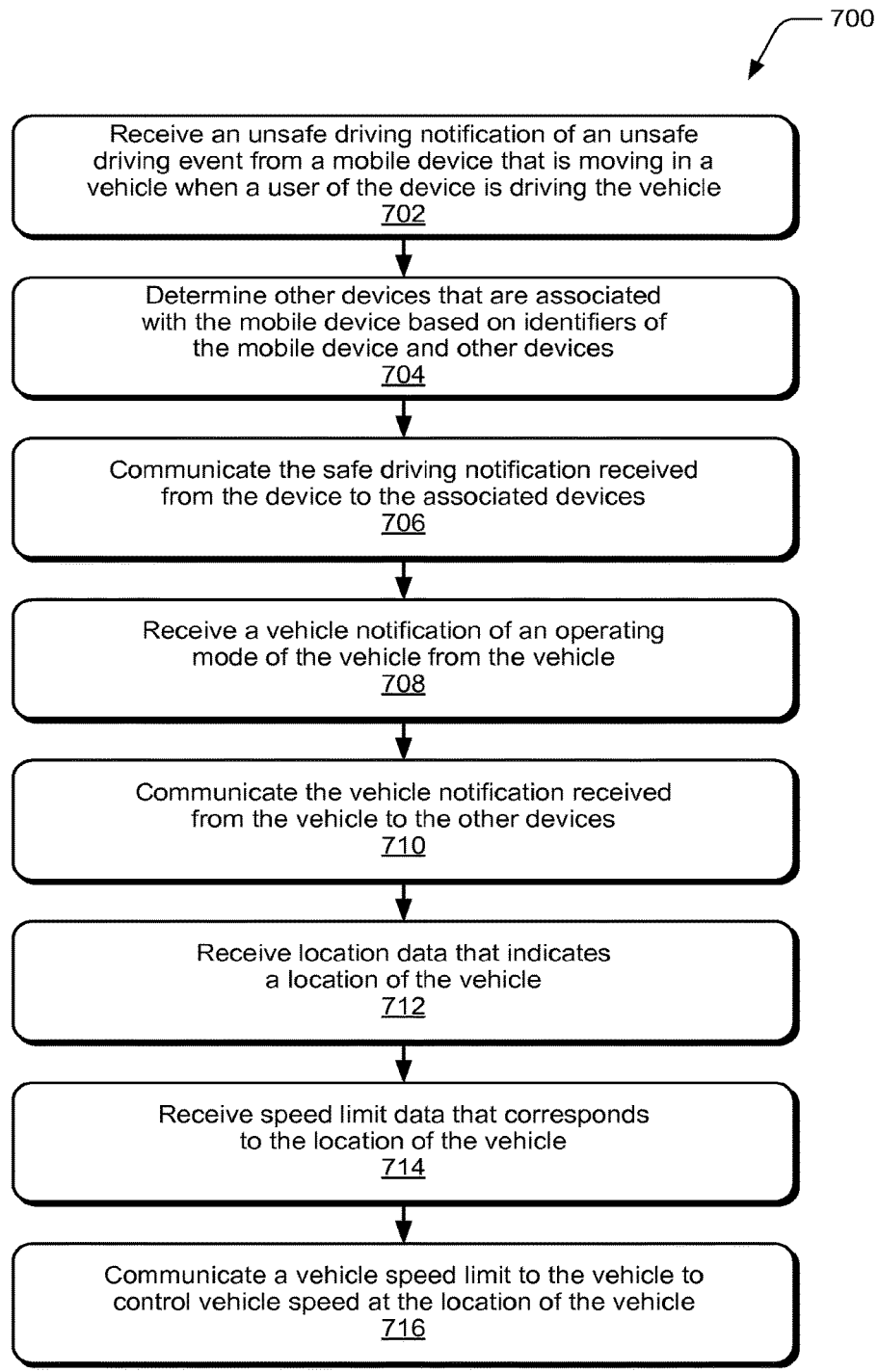
FIG. 7 illustrates example method(s) of mobile device safe driving.

FIG. 7 illustrates example method(s) 700 of mobile device safe driving. The order in which the method is described is not intended to be construed as a limitation, and any number or combination of the method operations can be combined in any order to implement a method, or an alternate method.

At 702, an unsafe driving notification is received from a mobile device that is moving in a vehicle when a user of the device is driving the vehicle. For example, the safe driving service 302 implemented as part of the platform 608 (FIG. 6) receives an unsafe driving notification from the mobile device 602 that is moving in a vehicle when a user of the device is driving the vehicle. The unsafe driving notification indicates a driving condition of the vehicle and the unsafe driving notification can be communicated to associated devices of the device to inform users of the associated devices. Similar to the safe driving service 302 implemented at the mobile device 100 (FIG. 3), the safe driving service 302 implemented as part of the platform 608 also receives safe driving events 316 and unsafe driving events 318 from the mobile devices.

At 704, other devices that are associated with the mobile device are determined based on identifiers of the mobile device and the other associated devices. For example, the safe driving service 302 at the platform 608 determines the associated devices, such as mobile device 604, based on the associated devices identifiers 914. At 706, the unsafe driving notification received from the mobile device is communicated to the other devices that are associated with the mobile device. For example, the safe driving service 302 at the platform 608 initiates communication of the safe driving notification that is received from the mobile device 602 to the associated device 604.

At 708, a vehicle notification is received from the vehicle. For example, the safe driving service 302 at the platform 608 receives a vehicle notification from the vehicle (rather than from the mobile device) that the mobile device 602 is moving in when a user of the device is driving the vehicle. A mobile device that is traveling in a vehicle can be paired with the vehicle, and the vehicle itself can take on the role of a safe driving service to register and communicate safe driving events, unsafe driving events, and unsafe driving notifications. At 710, the vehicle notification received from the vehicle is communicated to the other devices that are associated with the mobile device. For example, the safe driving service 302 at the platform 608 initiates communication of the vehicle notification that is received from the vehicle to the associated device 604.

At 712, location data is received that indicates a location of the vehicle. For example, the safe driving service 302 at the platform 608 receives location data, such as from a GPS system, that indicates a location of the vehicle that the mobile device 602 is moving in when a user of the device is driving the vehicle. At 714, speed limit data that corresponds to the location of the vehicle is received. For example, the safe driving service 302 at the platform 608 receives speed limit data that corresponds to the location of the vehicle (as determined from the location data at 712). At 716, a vehicle speed limit is communicated to the vehicle to control vehicle speed at the location of the vehicle. For example, the safe driving service 302 at the platform 608 communicates a vehicle speed limit to the vehicle to control vehicle speed at the location of the vehicle that the device 602 is moving in when a user of the device is driving the vehicle.

Figure 8:
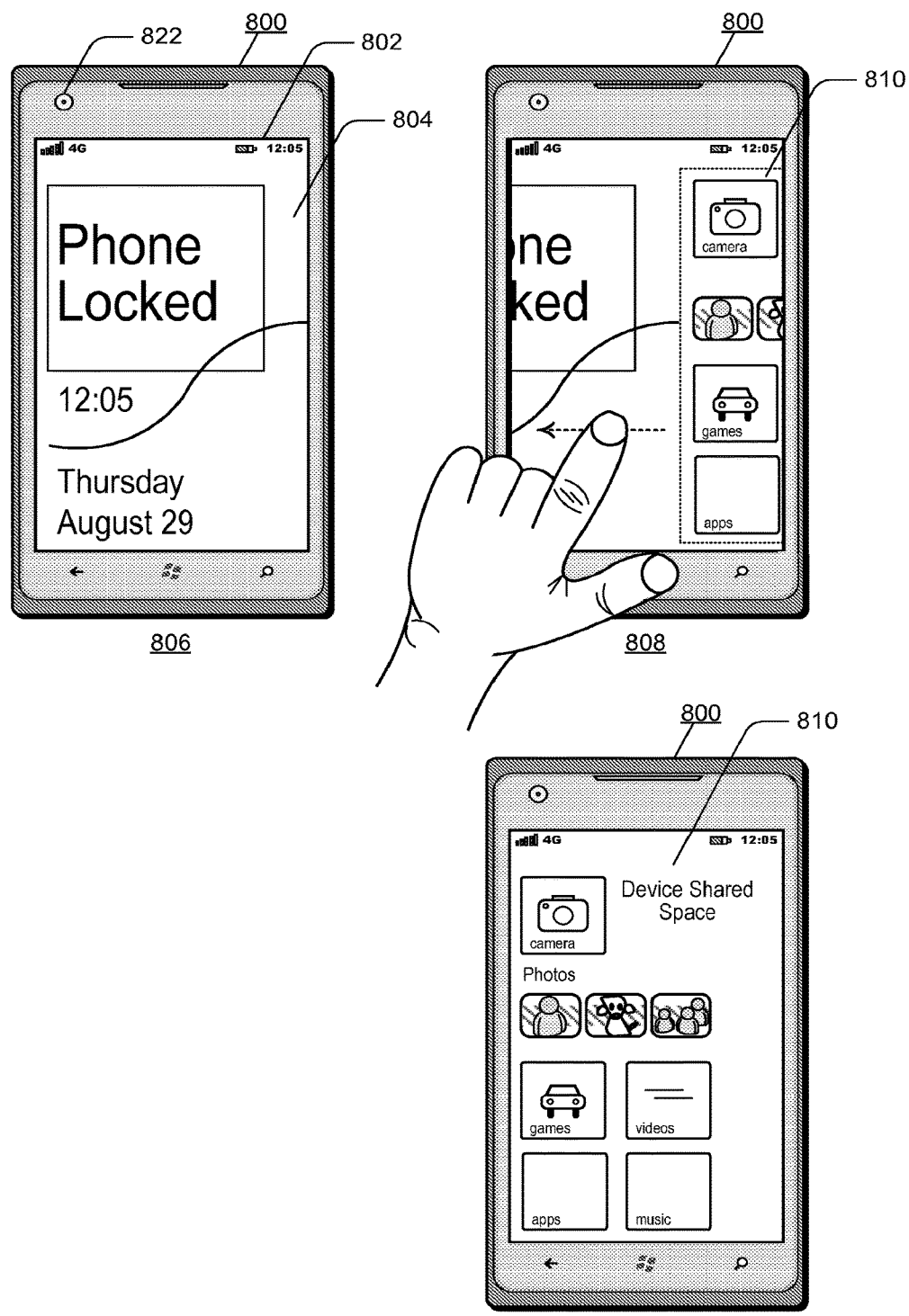
FIG. 8 illustrates an example of restricted execution modes.

FIG. 8 illustrates an example of user interfaces of a restricted execution mode. An example mobile device 800 may be any one or combination of a mobile phone, tablet device, computing device, communication, entertainment, gaming, navigation, and/or other type of portable electronic device. A shared space can be implemented for user access to functionality of device applications without a password, as well as for access to any applications, functions, and features of the mobile device 800 that are designated by the user in the shared space.

The example mobile device 800 includes an integrated display device 802 on which user interfaces can be displayed, such as a device lock screen 804 that indicates the device is locked at 806. For example, a user owner of the mobile device may set-up the device to lock when not in use so that someone else cannot access the full functionality of applications, such as email and text, and/or have access to the Internet via a browser application without providing authentication credentials such as a personal identification number (PIN), login, or other authentication credential.

The user owner of the mobile device 800 can allow another person to use the phone, and hand the phone over without having to unlock the device from the device lock screen 804 by entering a PIN or other credential. As shown in the example 808, a person that has borrowed the phone can swipe the device lock screen with a gesture input to access a shared space user interface 810, which is illustrated at 812 when displayed on the display device, and which provides access to a limited subset of application functionality. The borrower does not enter a PIN or other credential to access the shared space user interface. In implementations, the gesture input may be any type of user and/or gesture input in any direction on the integrated display device 802 of the mobile device. Alternatively or in addition, any type of device, button, and/or gesture inputs may be utilized effective to transition from the device lock screen 804 to the shared space user interface 810.

Restricted execution modes enable implementation of a shared space on a device where a user owner can include device applications that a guest or child can access without requiring a password, and the device applications will be programmatically prevented from being able to access other private device content on the device.

There may be situations when a user owner of a device may want to have access to some content or applications on their mobile phone without unlocking the phone with a PIN code or other authentication credential. Restricted execution modes enable the user owner to make some experiences available without password access, and without compromising the security of sensitive personal or corporate data. In implementations, restricted execution modes allow applications to run, but restricts access to sensitive data or experiences using several mechanisms, such as security capabilities, blocked navigation, and application origin. If an application has a particular security capability, a runtime check is made centrally when the application attempts to access a protected resource, and if the application is running in a restricted execution zone, an error is returned that can be handled by the application. When a device is running in a restricted execution mode, a device application may be referred to as running in a restricted execution "zone".

For the blocked navigation security capability, applications often take advantage of built in tasks to complete user actions like sending an email, making a phone call, etc. When the restricted execution mode is activated on a device, the origination of a device application task at run-time is what is considered to determine whether the device application, and more specifically, whether the task will be allowed. An application task, which is generally synonymous to an application programming interface (or API) call, may include aspects of a data access API call, but it also includes a request to initiate a particular action or actions different than data access, and the task request may incorporate metadata associated with the action of the requested task. The level of functionality is provided on a task-by-task basis to determine whether the action or actions of a requested task will be available in the restricted execution mode during run-time origination of a task request. A device application can be executed by the device, but only some functions of the device application will execute when the restricted execution mode is activated on the device.

Examples of restricting the functionality of a device application may include not permitting the device application to be launched altogether or limiting the device application to calling only a restricted subset of API calls that is narrower than the normal set of API calls available to the application when the mobile device is running in normal user mode. Restricting access to device content also may include disallowing certain API calls that provide access to particular sets of data or content. In many examples, restricting functionality or access does not include analyzing or changing Access Control Lists (ACLs), Access Control Entries (ACEs), or similar file-system access control metadata maintained by a file system. For example, a device application can be restricted from access to device content while a restricted execution mode is activated on a device.

When running in a restricted execution zone, all application requested navigations are screened and only those allowed by the system can continue. Others fail in a backwards compatible way so that legacy applications do not need to be updated to run in the restricted execution zone. For the application origin security capability, only applications that originate and/or have been downloaded from a first-party provider can run (e.g., execute) in a restricted execution mode. This ensures that applications which have not been security checked, and may access sensitive and/or private data on a device, do not run without the user unlocking the device first.

Figure 9:
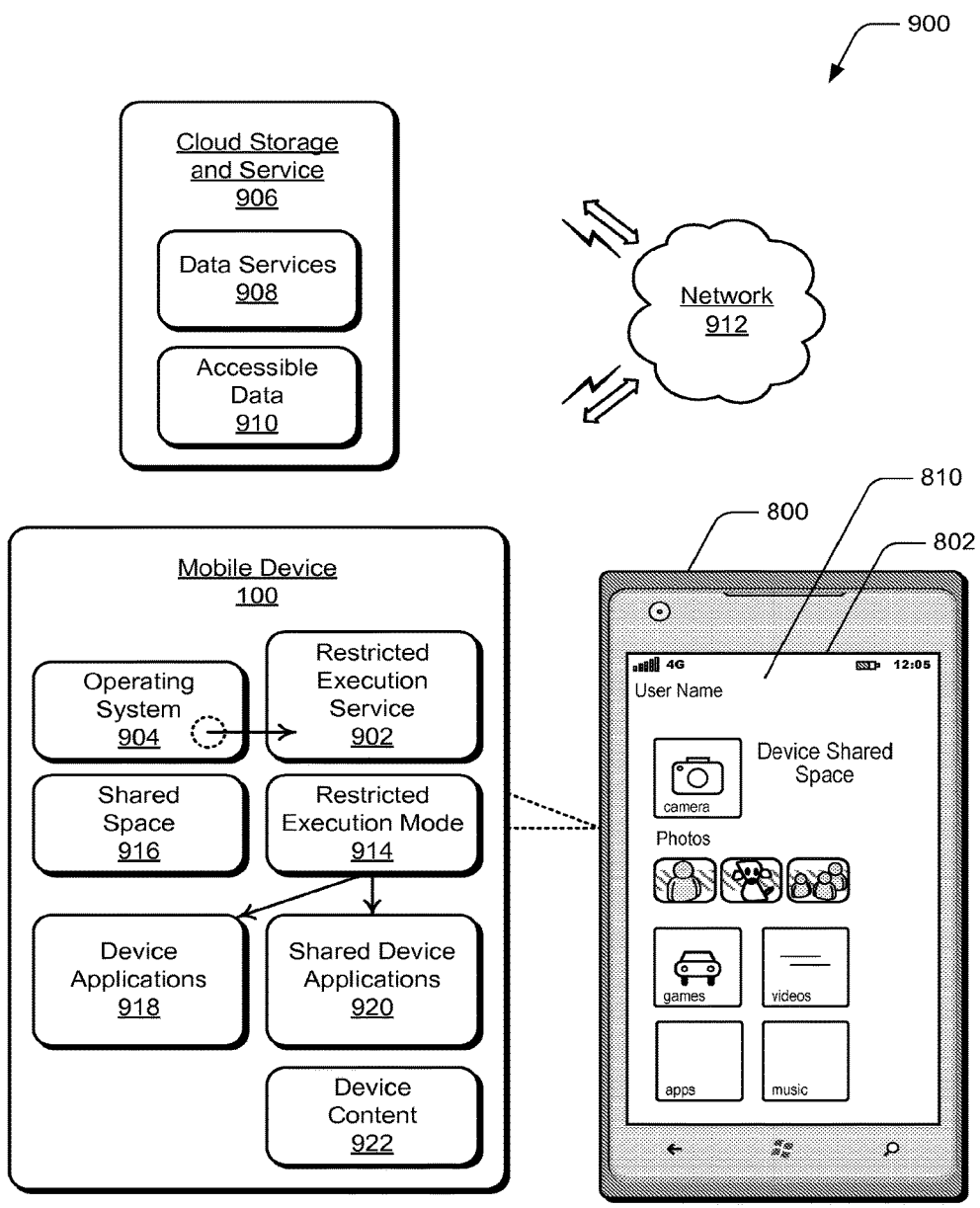
FIG. 9 illustrates an example system in which embodiments of restricted execution modes can be implemented.

FIG. 9 illustrates an example system 900 in which embodiments of restricted execution modes can be implemented. The example system includes the mobile device 800 as described with reference to FIG. 8, with the integrated display device 802 on which a user interface can be displayed, such as the shared space user interface 810 that is representative of a shared space on the device. Additionally, the mobile device can be implemented with various components, such as a processor and/or memory system, as well as any number and combination of differing components as further described with reference to the example device shown in FIG. 17 to implement embodiments of restricted execution modes.

The mobile device 800 includes a restricted execution service 902 that can be implemented as a software application (e.g., executable instructions) stored on computer-readable storage media, such as any suitable memory device or electronic data storage. Additionally, the restricted execution service 902 can be executed with a processing system at the mobile device to implement embodiments of restricted execution modes as described herein. The restricted execution service 902 may be implemented as an independent device application that is executable on the device to interface with the many applications, features, and functions of the device.

The example system 900 may also include a cloud storage and service 906 that can include any type of cloud-based (e.g., network-based) data services 908 used to store or maintain accessible data 910 (e.g., data accessible by device applications on the mobile device 800). Any of the devices and services (e.g., implemented as server devices) described herein can communicate via a network 912, which can be implemented to include a wired and/or a wireless network. The network can also be implemented using any type of network topology and/or communication protocol, and can be represented or otherwise implemented as a combination of two or more networks, to include IP-based networks and/or the Internet. The network may also include mobile operator networks that are managed by a mobile network operator and/or other network operators, such as a communication service provider, mobile phone provider, and/or Internet service provider. Alternatively or in addition, peerto-peer communication techniques may be utilized, such as multiple devices connected using a peer-to-peer communication network.

The restricted execution service 902 is implemented to manage a restricted execution mode 914 of a shared space 916, such as to limit and/or restrict device applications 918 and shared device applications 920 that are included in the shared space 916 that is accessible without a PIN or authentication credential. The device applications 918 can include any type of software applications, and the functions and features thereof, that run on the device, such as for user interaction with messaging, gaming, media playback, document viewing, and communication applications. The device applications may also include system-level components that users of a device generally do not access or utilize, but that typically run in the background while the device is operational. The shared device applications can include any subset of the device applications, and are designated as a shared device application when included in the shared space 916 for limited and/or restricted functionality when a restricted execution mode 914 is activated on the device.

A user owner of the mobile device 800 can choose the device applications and features, and/or device content, that can be included in the shared space and accessed by a child or guest while the restricted execution mode is activated. Further, a device application may be allowed a restricted level of functionality while running in the shared space (i.e., the application may be executed), yet generally cannot access device content 922 that is restricted from access, such as contacts, email, and calendar databases, as well as limited access to the device file system.

The content databases, device file system, Internet access, and other device content and features can be protected from device application access when the restricted execution mode is activated. For example, a device application that can access the Internet, email, contacts, etc. when a device is unlocked and operating in a normal user mode will be automatically restricted when the restricted execution mode is activated, such as if the device application has been added to the shared space and is allowed limited functionality in the shared space. As an example, a digital camera application that has been added to the shared space may allow a user to take and view new photos, but previous photos will be restricted from viewing the restricted execution mode is activated on the device.

The shared space user interface 810 of the shared space is customizable by the user owner of the device. For example, the user owner can add applications, such as games and music applications, to the shared space so that the applications are recognized and can be launched in the shared space, perhaps with limited functionality. However applications that are not recognized in the shared space cannot be launched in the shared space. For example, if a game application that is pinned or recognized in the shared space attempts to itself launch a browser application (e.g., as part of the game's execution), the restricted execution service 902 will check if the browser application is pinned and recognized in the shared space. If the browser application is not recognized in the shared space, then the restricted execution service will fail to launch the application, or if the browser application is recognized, then the browser application can be launched in the shared space by the game application.

As described with reference to FIG. 8, an input can be received, such as a gesture input or device selectable control input, and the restricted execution service 902 initiates a transition from displaying the device lock screen 804 to display the shared space user interface 810 of the shared space 916 without receiving a PIN code or other authentication credential entered on the device lock screen. The restricted execution service 902 is implemented to manage the shared space 916 when the restricted execution mode 914 is activated. The restricted execution service 902 can activate the restricted execution mode 914 of the mobile device 800, and restrict access of a device application 918 to the device content 922, to a file system of the mobile device, and/or to limit the application to a limited set of functionality or tasks while the restricted execution mode is activated.

The shared space 916 can include a shared device application 920, and the restricted execution service 902 can allow the shared device application access to the device content 922 while the restricted execution mode 914 is activated. The restricted execution service 902 can determine whether a device application 918 is implemented or designed so that a user can designate to allow the device application access to the device content if the device application is included in the shared space 916 as a shared device application. Alternatively, a device application may be designed as not to be allowed access to the device content even if the device application is included in the shared space. Additionally, this type of a device application may also be implemented as not even being eligible for user-designation to be included in the shared space.

In restricted modes, a configuration of a device application may be designed or programmed to indicate whether the device application is ever to be allowed to run (e.g., execute) in a restricted mode, irrespective of user choice. For example, a confidential corporate application or another application downloaded from a third-party application store that may access private corporate data can be configured to never be allowed to run (e.g., execute) in any restricted mode, even if a user would like it to do so. A configuration of some device applications may be user-controlled to indicate whether the device application is to be allowed to run in a particular restricted mode, such as allowing a subset of games or applications in a kid zone restricted mode, or allowing a subset of camera lens applications to run when the phone is locked.

The restricted execution service 902 can also be implemented to validate whether or not a given device application can be navigated to regardless of the reason for the navigation request, taking into account the current restricted mode and the target application's system and user configuration. Additionally, a separate navigation stack can be maintained for a normal mode user experience and for the current restricted execution mode. The restricted execution service 902 is also implemented to allow or disallow migration of applications from the normal mode stack to the restricted mode stack or vice-versa based on scenario needs, and to determine when to close applications on each stack based on available resources and transitions into and out of a restricted mode.

A device application 918 may initiate a task call to a shared device application 920 with a request for the device content 922, and the restricted execution service 902 can restrict the device application access to the device content via the shared device application while the restricted execution mode 914 is activated. The device application may also initiate a task call to the operating system 904 to request device content access, and the restricted execution service can restrict the access to the device content based on one or more device application tasks being designated as restricted while the restricted execution mode is activated.

Alternatively, the device application 918 can initiate a task call to the shared device application 920 with a request for the device content 922, and the request includes a request token that indicates the device application is permitted to access the device content via the shared device application in the shared space 916. The restricted execution service 902 can then allow the device application access to the device content via the shared device application based on the request token while the restricted execution mode is activated. The restricted execution service can also deactivate the restricted execution mode 914 responsive to a PIN code or authentication credential entered on the device lock screen, and return to a normal user mode of the mobile device in which the device application 918 has unrestricted access to the device content 922.

The restricted execution service 900 implements a mechanism to indicate in which restricted modes a device application can run (e.g., execute) based on a task information field of a device application task. The task information field indicates whether a specific task can be allowed to execute in a shared space when the restricted execution mode is activated. This new field will be a bit mask, which a navigation server will use to compare to the navigation filter mask that MobileUI will give to it when a restricted mode is entered. These are marked per task instead of by application because some first-party device applications have tasks that can be allowed to function in a child share space (e.g., Kid's Corner), but not all of the application functionality is allowed while a restricted execution mode is activated on a device. If a device application is allowed to run in a shared space, the restricted execution service can trace an API task call through the application layer from an originator (e.g., device application) that initiates the task call based on a token that is passed along to a core system component that would not otherwise be able to determine whether the task call was originated from a device application running in the shared space. The token can be utilized to determine if the task call is protected from a restricted execution mode.

Figure 10:
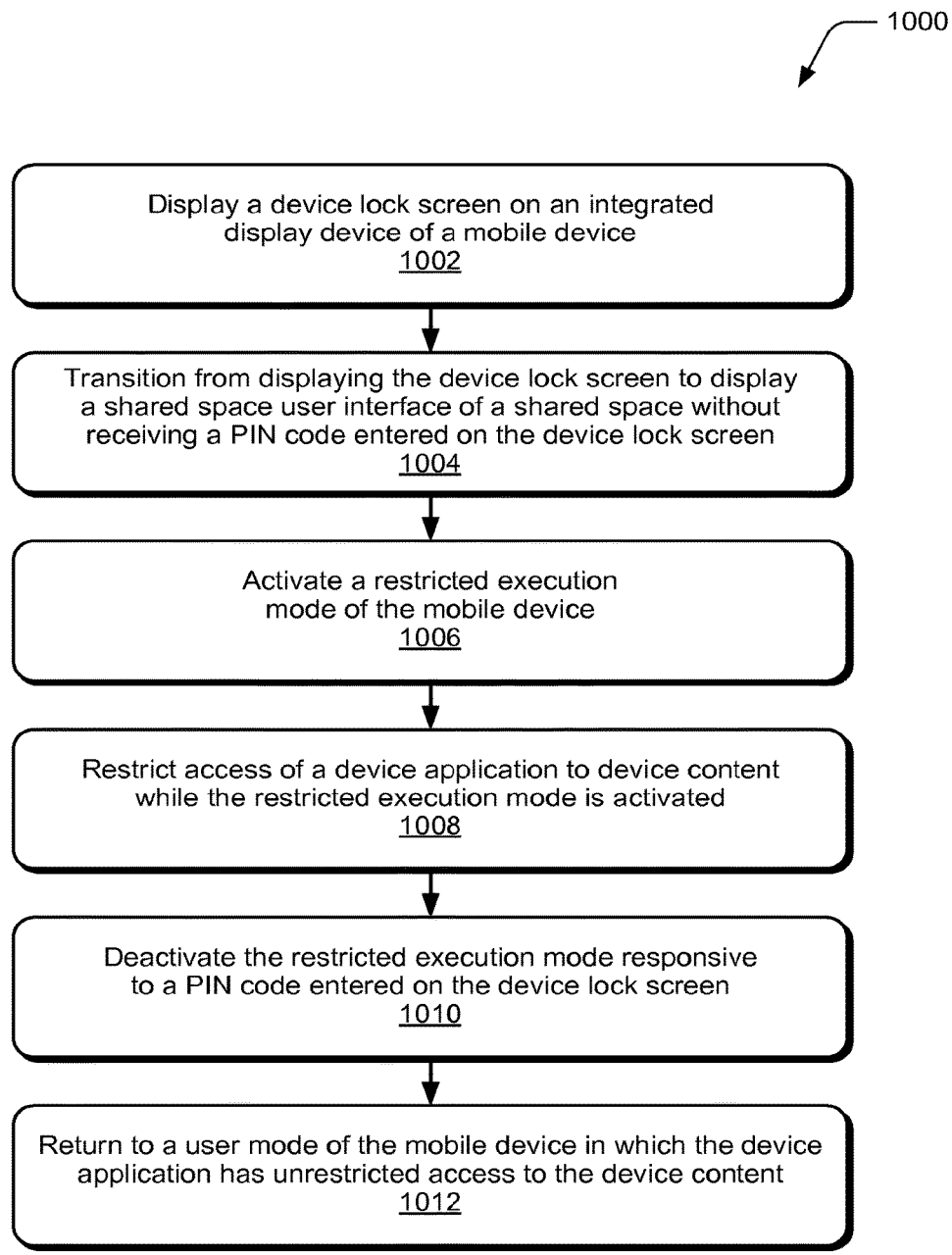
FIG. 10 illustrates example method(s) of restricted execution modes in accordance with one or more embodiments.

FIG. 10 illustrates example method(s) 1000 of restricted execution modes. The order in which the method is described is not intended to be construed as a limitation, and any number or combination of the method operations can be combined in any order to implement a method, or an alternate method.

At 1002, a device lock screen is displayed on an integrated display device of a mobile device. For example, the mobile device 800 (FIG. 8) displays a device lock screen 804 on the integrated display device 802 of the mobile device. At 1004, the display is transitioned from the device lock screen to display a shared space user interface of a shared space without a PIN code or other authentication credential entered on the device lock screen. For example, an input system of the mobile device 800 receives an input, such as a gesture input or device selectable control input, and the input is effective to transition from displaying the device lock screen 804 to display the shared space user interface 810 of a shared space 916 without a PIN code or other authentication credential entered on the device lock screen.

At 1006, a restricted execution mode of the mobile device is activated. For example, the restricted execution service 902 at the mobile device 800 activates the restricted execution mode 914 of the mobile device in response to entering the shared space. At 1008, access of a device application to device content is restricted while the restricted execution mode is activated. For example, the restricted execution service 902 at the mobile device 800 restricts access of a device application 918 to the device content 922 while the restricted execution mode 914 is activated.

At 1010, the restricted execution mode is deactivated responsive to a PIN code or other authentication credential entered on the device lock screen. For example, the restricted execution service 902 at the mobile device 800 deactivates the restricted execution mode responsive to a PIN code or other authentication credential entered on the device lock screen. At 1012, the device returns to a user mode of the mobile device in which the device application has unrestricted access to the device content. For example, the restricted execution service 902 at the mobile device 800 returns to a user mode of the mobile device in which the device application 918 has unrestricted access to the device content 922.

Figure 11:
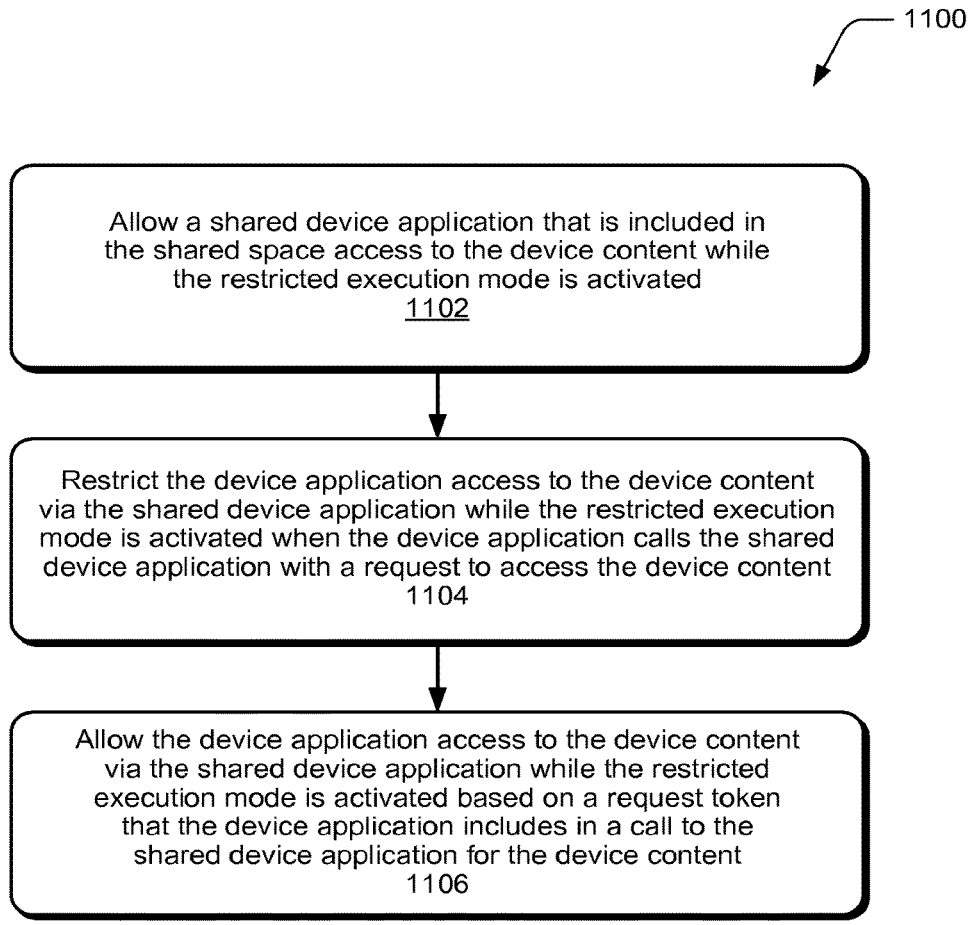
FIG. 11 illustrates example method(s) of restricted execution modes in accordance with one or more embodiments.

FIG. 11 illustrates example method(s) 1100 of restricted execution mode. The order in which the method is described is not intended to be construed as a limitation, and any number or combination of the method operations can be combined in any order to implement a method, or an alternate method.

At 1102, a shared device application that is included in the shared space is allowed access to the device content while the restricted execution mode is activated. For example, the restricted execution service 902 (FIG. 9) at the mobile device 800 allows access to the device content 922 to a shared device application 920 that is included in the shared space 916 while the restricted execution mode is activated.

At 1104, the device application that requests access to the device content via the shared device application is restricted while the restricted execution mode is activated on the device. For example, restricted execution service 902 at the mobile device 800 restricts a device application 918 task call to the shared device application 920 with a request to access the device content 922 while the restricted execution mode is activated on the device.

At 1106, the device application is allowed access to the device content via the shared device application while the restricted execution mode is activated based on a request token that the device application includes in a task call to the shared device application for the device content. For example, restricted execution service 902 at the mobile device 800 allows access to the device content 922 by the device application 918 via the shared device application while the restricted execution mode is activated based on a request token that the device application includes in a task call to the shared device application for the device content. The request token indicates that the device application is permitted to access the device content via the shared device application in the shared space.

Figure 12:
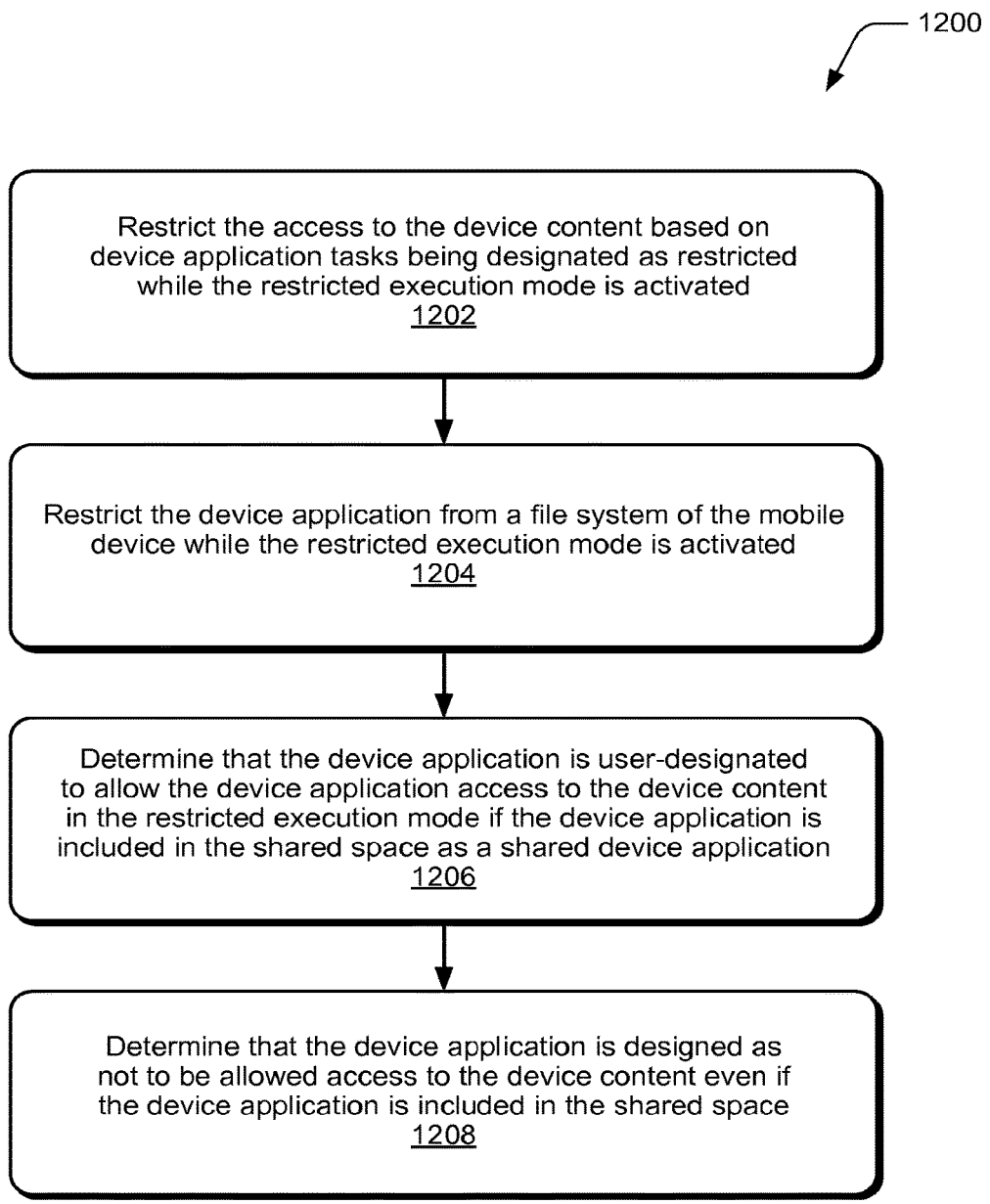
FIG. 12 illustrates example method(s) of restricted execution modes in accordance with one or more embodiments.

FIG. 12 illustrates example method(s) 1200 of restricted execution modes. The order in which the method is described is not intended to be construed as a limitation, and any number or combination of the method operations can be combined in any order to implement a method, or an alternate method.

At 1202, access to the device content is restricted based on device application tasks being designated as restricted while the restricted execution mode is activated, where the device application initiates a task call to access the device content. For example, restricted execution service 902 (FIG. 9) at the mobile device 800 restricts access to the device content 922 based on device application tasks being designated as restricted while the restricted execution mode 914 is activated, where a device application 918 initiates task calls to access the device content.

At 1204, the device application is restricted from a file system of the mobile device while the restricted execution mode is activated. For example, restricted execution service 902 at the mobile device 800 restricts a device application 918 from a file system of the mobile device while the restricted execution mode is activated.

At 1206, the device application is determined as user-designated to allow the device application access to the device content in a restricted execution mode if the device application is included in the shared space as a shared device application. Alternatively, at 1208, the device application is determined as designed as not to be allowed access to the device content even if the device application is included in the shared space. For example, restricted execution service 902 at the mobile device 800 can determine whether a device application user-designated to allow the device application access to the device content in a restricted execution mode if the device application is included in the shared space as a shared device application. The restricted execution service 902 may also determine that a device application is designed (e.g., programmed) as not to be allowed access to the device content even if the device application is included in the shared space. Additionally, this type of a programmed device application may also be implemented as not even being eligible for user-designation to be included in the shared space.

Although described herein as a single restricted execution mode, in some examples, a device provides multiple restricted execution modes, such as a first restricted execution mode associated with a child shared space for facilitating sharing a mobile device with a child and a second restricted execution mode associated with a safe driving shared space for facilitating safer driving by a user of a mobile device. These various restricted execution modes may each impose a different set of limitations on the functionality of the device. For example, the child-related execution mode might block access to email data, changes to device settings, or in-app purchases, while the second driving safety restricted execution zone might block graphical user interfaces that could distract a driver from the road.

From the lock screen displayed on a device, without entering a PIN or other authentication credentials, a user may be able to reach different shared spaces, each of which has a different restricted execution mode associated with it. For example, from the lock screen, a user might enter a first gesture (e.g., a left swipe) to reach a first shared space having a first restricted execution mode and a second different gesture (e.g., a right swipe) to reach a second, different shared space having a second restricted execution mode. In some examples, a shared space associated with a restricted execution mode may be accessed from different entry points than receiving an input (e.g., a gesture input) on the lock screen.

Figure 13:
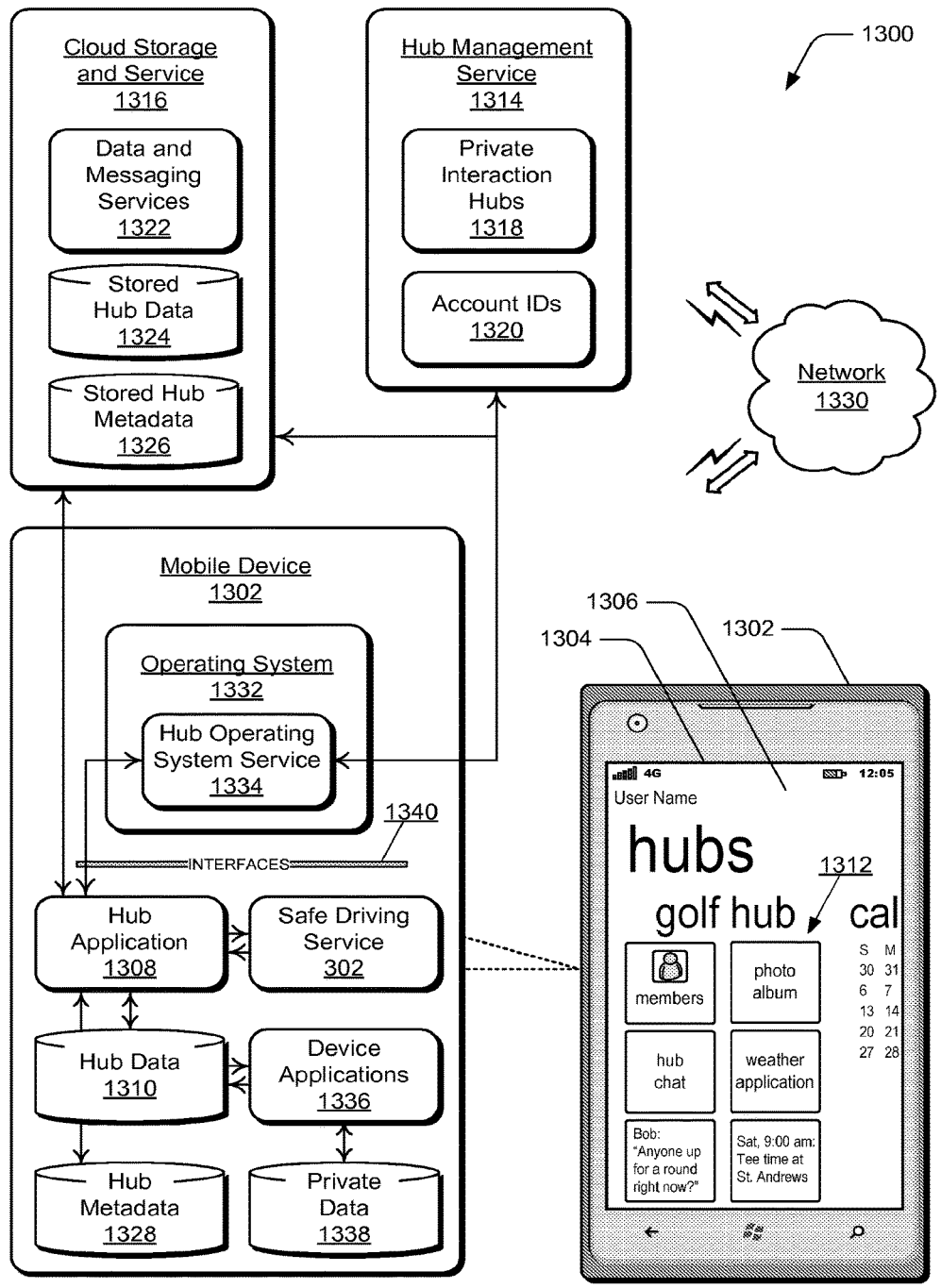
FIG. 13 illustrates an example system in which embodiments of private interaction hubs can be implemented.

FIG. 13 illustrates an example system 1300 in which embodiments of private interaction hubs, mobile device safe driving, and restricted execution modes can be implemented. The system 1300 includes an example mobile device 1302, which may be any one or combination of a wired or wireless device, such as a mobile phone, tablet, computing, communication, entertainment, gaming, media playback, and/or other type of device. Any of the devices can be implemented with various components, such as a processing system and memory, as well as any number and combination of differing components as further described with reference to the example device shown in FIG. 17. As such, the mobile device 1302 may implement techniques previously described in whole in or part, such as the techniques described with reference to the safe driving service 302 and/or the restricted execution service 902.

The mobile device 1302 includes an integrated display device 1304 on which user interfaces can be displayed, such as a hub user interface 1306 of a hub application 1308. The hub user interface offers a unified interactive view of the hub data 1310 for a single, private interaction hub and the hub application 6013 aggregates disparate types of the hub data 1310 originating from the various member users of the private interaction hub. For example, the hub user interface may provide a single unified access point to shared hub messages, status updates, check-ins, hub calendar events, hub media, hub applications, and other types of hub content. As described above, a private interaction hub (or simply "hub") is a private network or association of member users who voluntarily elect to privately interact and collaborate with each other in a bi-directional manner. The hub data 1310 includes any shared data or metadata that is used to facilitate the interaction and collaboration between the members of a private interaction hub, and may include shared data for messaging, notes, contact management, documents, tasks, location updates, photos, calendar events, applications (to include collaborative gaming applications), and/or other media content, such as any type of audio, music, video, and/or image data that may be available or accessed from any source.

The basic functionality of an example private interaction hub is shown as a golf hub displayed in the hub user interface 1306 of the hub application 1308. For example, the hub user interface can include various selectable user interface tiles 1312, such as a members tile that is selectable to initiate a display of the constituent members of the private interaction hub. The user interface tiles 1312 may also include hub chat and/or messages tiles to allow a hub member to participate in shared messaging threads with the other member users of the hub. For example, as shown, the member "Bob" has asked "Anyone up for a round right now?" The user interface tiles 1312 may also include a photo album tile that is selectable to view photos shared by any of the hub members with the hub, and a shared notebook tile from which the hub members can view shared notes. For example, the golf hub may include a shared notes document that compiles the hub members' collective research of new golf equipment. The hub user interface 1306 may also display a shared calendar that allows a member of the hub to view, edit, and post calendar events that will be shared with all of the other hub members. For example, the calendar tile shows an upcoming tee time at St. Andrews on Saturday at 9:00 a.m. for all of the members. When a user selects a group item (e.g., the message from Bob) or tile (e.g., the messaging tile), further details about the selected item or group items related to the selected tile may be displayed by the hub application itself or the hub application may call (e.g., a task call) a different device application 1336 (e.g., a messaging application) to display further details about the item(s).

When a user selects or otherwise engages with a piece of displayed hub data, such as the golf message from Bob, the hub application may provide additional details or options to the user to permit the user to interact further with the hub data. For example, the hub application may display controls to allow the user to edit or reply to Bob's message. Alternatively or in addition, when a user selects or otherwise engages with a piece of displayed hub data (e.g., Bob's message), the hub application may launch or call (e.g., a task call) another device application to permit the user to further interact with the piece of hub data (e.g., the hub application may call a native messaging application).

The hub user interface 1306 of the hub application 1308 can also include user-selectable access to third-party applications, such as when an application is "pinned" to, or otherwise shared with a private interaction hub. A pinned third-party application may also utilize the shared hub data, such as shared application preferences or shared application state data. For example, the golf hub shown displayed in the hub user interface 1306 includes a live tile representing a third-party weather application that the members of the hub can quickly access to check the weather forecast at their local golf club, such as when planning an upcoming golf outing. A user of the mobile device 1302 can also customize display aspects of a hub user interface, such as the content of the user interface and how the elements of the hub user interface are arranged. Another example of a hub user interface of the hub application 1308 is a panoramic hub user interface, such as for a family-centric private interaction hub as shown and described in greater detail with reference to FIG. 16.

The example system 1300 also includes a hub management service 1314, and a cloud storage and service 1316. The hub management service 1314 manages the formation and maintenance of private interaction hubs 1318. The hub management service can correlate or associate member users of a hub by associating account identifiers 1320 of the members with one or more of the private interaction hubs. The account identifier 1320 of a member user may be associated with an identifier of a private interaction hub 1318 in a data table that the hub management service maintains to correlate the hub members with one or more of the private interaction hubs. The hub management service 1314 may also associate devices that correspond to hub members based on device identifiers. The account identifiers 1320 can include user membership identifiers and/or sign-on credentials, such as an email and password combination, or a username and password combination. The sign-on credentials may be single sign-on ("SSO") credentials that are utilized for authentication purposes at a number of Web services, including the cloud storage and service 1316.

The cloud storage and service 1316 can include any type of cloud-based (e.g., network-based) data and messaging services 1322. The messaging services may include any type of email, text (e.g., SMS, MMS), and/or instant messaging services. The data services may include any type of calendar, photo album, file or document sharing, location, mapping, music sharing, video sharing, gaming, contacts management, and/or notebook services, as well as any other type of services that can be used to share stored hub data 1324. The stored hub data can include any form of messages, updates, events, content, media, and information that is maintained for the private interaction hubs 1318, and is accessible from the mobile device 1302, either upon a request from a device and/or upon a data "push" to the device. The cloud storage and service 1316 also maintains stored hub metadata 1326 that includes settings and information pertaining to the private interaction hubs 1318, such as the name of a hub, the background image or photo of the hub, and an association of the hub members.

Although shown together as data and messaging services 1322, various application data services and various messaging services may be operated on separate devices and/or operated by separate, distinct entities. Additionally, although the hub management service 1314 and the cloud storage and service 1316 are shown as independent services, they may be implemented together as a single service. Further, a server device (or group of server devices) can include implementations of both the hub management service 1314 and the cloud storage and service 1316, representative of a single entity that may be the same server system, company system, domain, and the like.

The cloud storage and service 1316, and its constituent data and messaging services 1322, interchange the stored hub data 1324 and the stored hub metadata 1326 between the mobile devices that are associated with member users of a private interaction hub 1318. For example, a data and/or messaging service of the cloud storage and service 1316 can receive a copy of hub data 1310 and/or hub metadata 1328 from the mobile device 1302 that is used by a hub member, store this hub data and hub metadata in the cloud storage as the respective stored hub data 1324 and stored hub metadata 1326, and then distribute the stored hub data and stored hub metadata to other mobile devices associated with other member users of the same private interaction hub, as well as to other mobile devices associated with the same hub member. The stored hub metadata 1326 can include membership information pertaining to the member users of a private interaction hub, hub identifiers that correlate a piece of hub data to a particular private interaction hub, user identifiers that correlate a piece of hub data to a particular member user, modification dates, and/or other metadata.

The cloud storage and service 1316, and its constituent data and messaging services 1322, may utilize single sign-on ("SSO") credentials for authentication purposes to limit the dissemination of the stored hub data 1324 and the stored hub metadata 1326 to only the authorized devices of hub members. Additionally, any of the devices and services (e.g., implemented as server devices) described herein can communicate via a network 1330, which can be implemented to include a wired and/or a wireless network. The network can also be implemented using any type of network topology and/or communication protocol, and can be represented or otherwise implemented as a combination of two or more networks, to include IP-based networks and/or the Internet. The network may also include mobile operator networks that are managed by a mobile network operator and/or other network operators, such as a communication service provider, mobile phone provider, and/or Internet service provider.

The mobile device 1302 includes an operating system 1332 of the device, and the operating system includes a hub operating system service 1334 that is implemented to integrate cloud-based services, a hub application 1308, and local device applications 1336 with the operating system to implement aspects of the private interaction hubs 1318. The aspects that may be implemented include hub formation and membership maintenance, synchronizing the hub data 1310 on the mobile device with the stored hub data 1324, and the hub metadata 1328 with the stored hub metadata 1326, with the cloud storage and service 1316, and providing the hub application 1308 and the local device applications 1336 on the mobile device 1302 with access to the hub data 1310 and the hub metadata 1328. For example, the hub operating system service 1334 may directly access the stored hub metadata 1326 at the cloud storage and service 1316.

The hub operating system service 1334 (or alternatively, the hub application 1308) may also determine and maintain a local copy of the membership associations of member users account identifiers 1320 and identifiers of the private interaction hubs. The hub operating system service 1334 may also synchronize the stored hub data 1324 from the cloud storage and service 1316 with the hub data 1310 at the mobile device 1302, and synchronize the stored hub metadata 1326 from the cloud storage and service with the hub metadata 1328 at the mobile device. The hub operating system service 1334 may also synchronize with the cloud storage and service 1316 (e.g., by sending changes or additions to hub data 1310 and hub metadata 1328 to the cloud storage and service 1316). Such data synchronizations may occur in response to a user launching the hub application.

The mobile device 1302 includes the device applications 1336 that permit a user of the mobile device to access, create, and/or modify the hub data 1310, private data 1338 of the user, as well as the stored hub data 1324 that is managed by any of the data and messaging services 1322 at the cloud storage and service 1316. Some or all of the device applications 1336 may be implemented as client-side components or modules of any of the data and messaging services 1322, or may be implemented as standalone, native applications (e.g., local device applications) at the mobile device. The device applications 1336 typically each consume and provide access to only a portion or subset of the hub data 1310 and the private data 1338, such as only a single type of hub data and private data (e.g., only messaging data, but not calendar data). The device applications also typically present the consumed hub data to a user in conjunction with the private data 1338. Private data is data or metadata that is not associated with a private interaction hub and that has not been shared with other members of the hub (e.g., data that has not been shared via the cloud storage and service 1316).

The device applications 1336 at the mobile device 1302 may include a native or third-party messaging application that provides a user with messaging alerts and access to messaging threads. The messaging application provides access to both shared message threads shared with a private interaction hub and private message threads between a user of the mobile device and others who are not members of the hub. The messaging application also allows a user to send a message to all of the hub members without accessing a hub user interface of the hub application. The messaging application may not provide user access to other types of the hub data 1310, other than the hub messages. For example, the messaging application may not provide access to the shared calendar events or shared photo albums of the hub.

The device applications 1336 may also include a native or third-party calendaring application that provides scheduling alerts and access to a visual calendar. The calendaring application provides user access to both shared calendar events that are shared with hub members, and private calendar events (e.g., Exchange calendar events) that have not been shared with other members of the hub. The calendaring application also allows a user to create and/or share a calendar event to all members of the hub without accessing a hub user interface of the hub application. The application may not provide user access to other types of the hub data 1310, other than the hub calendar events. For example, the calendaring application may not provide access to the shared message threads or shared photo albums of the hub.

The device applications 1336 may also include a native or third-party media viewing and/or editing application that provides access to photo albums of digital photos or other digital media. The media application provides user access to both shared media files (e.g., photos, videos, and/or music) shared with a private interaction hub, and private media files that have not been shared with other members of the hub. The media application also allows a user to share media files with all members of the hub without accessing a hub user interface of the hub application. The media application may not provide user access to other types of hub data 1310, other than hub media files. For example, the media application may not provide access to the shared message threads or shared calendar events of the hub.

The hub operating system service 1334 can expose one or more Application Programming Interfaces ("APIs"), application binary interfaces, and/or other types of interfaces 1340 to the hub application 1308 and to the device applications 1336 on the mobile device 1302 to allow these applications to access, generate, and/or modify the hub data 1310 and/or the hub metadata 1328, as described herein. The hub operating system service 1334 can be implemented as an integrated software component or module of the operating system 1332. The hub operating system service can be maintained at the mobile device 1302 as executable instructions that are stored on computer-readable storage media, such as any suitable memory device or electronic data storage as described with reference to the example device shown in FIG. 17. Additionally, the hub operating system service can be executed with a processing system at the mobile device to implement aspects of private interaction hubs.

In embodiments, the hub operating system service 1334 can initiate the hub management service 1314 to provision a private interaction hub 1318. A user of the mobile device 1302 can start a private interaction hub 1318 and also invite others to join an existing private interaction hub. For example, the hub user interface 1306 of the hub application 1308 may provide an existing hub member with the option to add a new member to the hub, and the user may identify the prospective member by providing either a mobile device number, or by selecting an existing contact from one of their social networks or other contacts.

The hub operating system service 1334 can receive the request from an existing member user of the device and, in response, the hub operating system service 1334 and/or the hub management service 1314 communicates an invitation to join the hub as an SMS, MMS, or instant message sent to the prospective member's mobile device that may include a link to a registration site or other registration instructions. The hub operating system service 1334 and/or the hub management service 1314 receives (e.g., via a registration website) an acceptance to the invitation to join the private interaction hub that includes at least an account identifier (such as an SSO credential), and associates the new member with the existing hub at the hub management service 1314. Updated membership information, including the new member's account identifier 1320 may also be propagated to other mobile devices of other members in the private interaction hub from the hub management service 1314. When the new member user joins the hub, he or she may be prompted to download and/or install various applications configured to provide access to the stored hub data 1324 and the stored hub metadata 1326, such as the hub application 1308 and/or the any of the device applications 1336. The hub application 1308 may also be the entry point by which a user creates a new hub and/or modifies the membership of an existing hub.

A private interaction hub 1318 can be provisioned for any association of people, such as family members, coworkers, friends, neighbors, and any other people that may be associated together in a hub. Additionally, a member user of one private interaction hub may also be a member of multiple hubs, which can be based on a single member sign-on that identifies the member to the hub operating system service 1334 and/or to the hub management service 1314. For example, a person may be a member of a family hub that associates members of the person's family, as well as a member of a neighborhood hub that associates members of the person's neighborhood, and a golf hub that associates the person's friends that often golf together.

The integration of the hub application 1308 with the operating system 1332 of the mobile device provides that a user of the device can view a message or update on the hub user interface 1306 and in an application user interface of an application that is associated with the message or the update. For example, a hub calendar is integrated with the calendar application (e.g., a device application 1336) on the mobile device 1302, and a calendar update that is displayed in the hub user interface 1306 can be selected by the user to initiate the update being displayed in a calendar user interface of the calendar application. Alternatively, the user may view the calendar user interface and select a calendar event that is associated with a private interaction hub to initiate a display of the hub calendar, which includes the calendar event for the members of the hub. As another example, a hub calendar event can be displayed in a hub user interface, and the device calendar application can access and display the hub calendar event along with any private data calendar events that only the user of the device has access to view in a user interface of the device calendar application. The hub application 1308 and the device application 1336 both acquire the same hub calendar event data (e.g., the same hub data 1310 stored on the mobile device). The two different user interfaces (e.g., a hub user interface and a device application user interface) display the same calendar event data.

In another example, the hub messages and chat features are integrated with messaging applications (e.g., the device applications 1336) on the mobile device 1302, and an email, text, or instant message that is displayed in the hub user interface 1306 can be selected by the user of the mobile device 1302 to initiate the message being displayed in a messaging application user interface. Alternatively, the user may view a recent message from a member of a private interaction hub in a messaging application user interface, and select the message to initiate a display of the hub messages interface, such as to view the discussion thread associated with the recent message.

In embodiments, the hub operating system service 1334 at the mobile device 1302 can receive social network updates for the member users of a private interaction hub 1318, such as when two or more of the members of a hub are also "friends" on a public social network site, such as (e.g., FACEBOOK®, TWITTER®, or LINKEDIN®). The social network updates can be pulled from a social network site based on the established association of the account identifiers 1320 of the hub members of a private interaction hub 1318 at the hub management service 1314. The hub operating system service 1334 can then aggregate the social network updates for a particular hub for display in the hub user interface 1306 or on a homepage "live tile" associated with the hub. The hub operating system service 1334 at the mobile device 1302 can also be implemented to coordinate multi-user interactive updates to an event that is managed in a private interaction hub. For example, several members of a hub may participate in a multi-player interactive game, and each successive interactive update from a member of the hub is initiated by the member at a respective associated mobile device.

Figure 14:
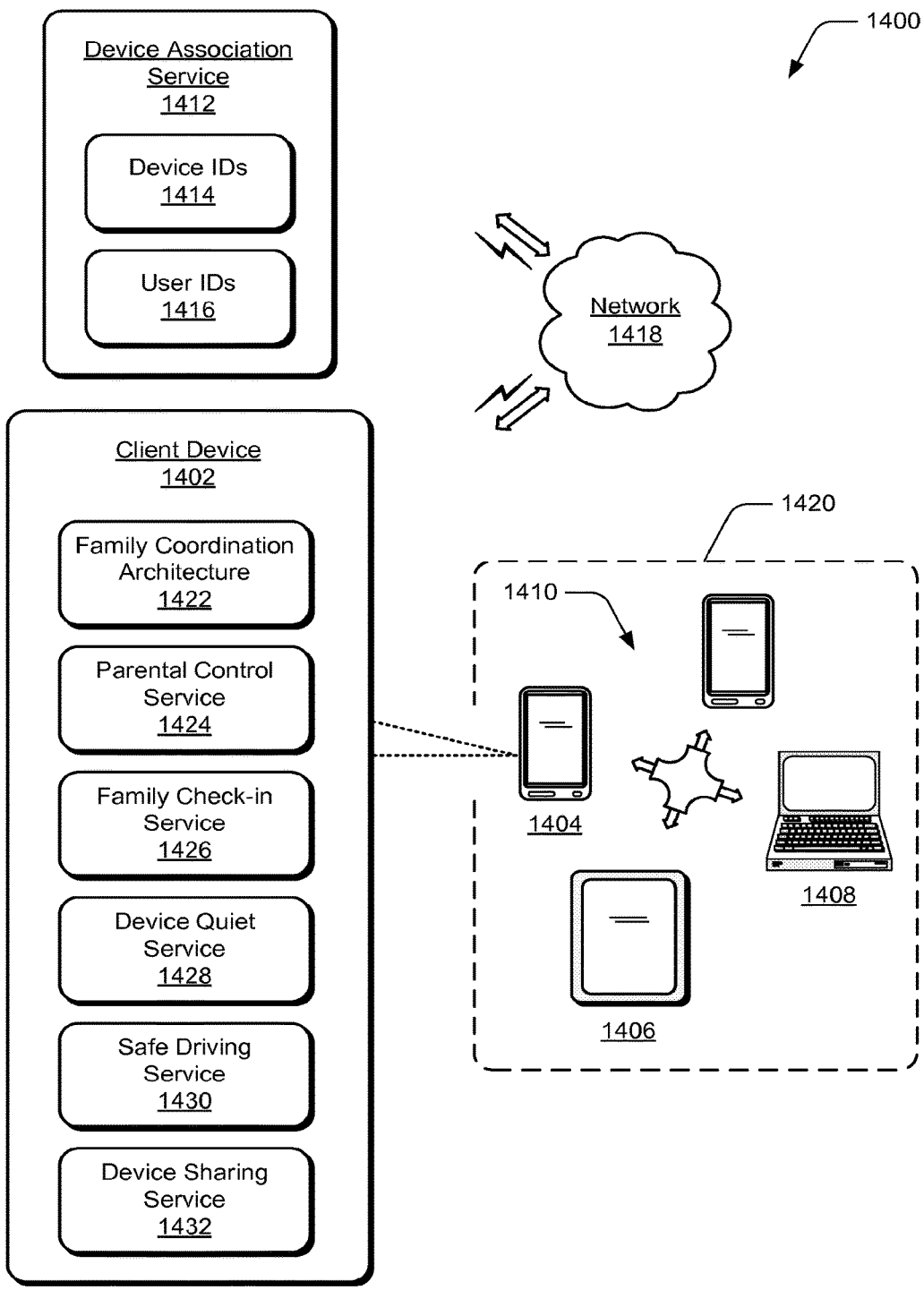
FIG. 14 illustrates an example system in which embodiments of mobile device safe driving can be implemented.

FIG. 14 illustrates an example system 1400 in which various embodiments of private interaction hubs, mobile device safe driving, restricted execution modes, and/or family coordination can be implemented. The example system includes a client device 1402, which may be any one or combination of a mobile phone 1404, tablet device 1406, computing device 14013, communication, entertainment, gaming, navigation, and/or other type of portable electronic device. Any of the client devices 1410 can be implemented with various components, such as a processor and/or memory system, as well as any number and combination of differing components as further described with reference to the example device shown in FIG. 12.

The example system 1400 includes a device association service 1412 that associates or correlates the client devices 1410 by device identifiers 1414, user identifiers 1416, and/or by any other type of identifiable association. Any of the devices and services can communicate via a network 14113, which can be implemented to include wired and/or wireless networks. The network can also be implemented using any type of network topology and/or communication protocol, and can be represented or otherwise implemented as a combination of two or more networks, to include IP-based networks and/or the Internet. The network may also include mobile operator networks that are managed by mobile operators, such as a communication service provider, cell-phone provider, and/or Internet service provider. A mobile operator can facilitate mobile data and/or voice communication for any type of a wireless device or mobile phone.

The client devices 1410 can each be associated with a different user, and the users are defined members of a family 1420. The example client device 1402 is representative of the various client devices 1410 in the family. Any of the client devices in the family can include services, such as software applications (e.g., computer-executable instructions), that can be executed by a processor or processor system to implement the embodiments described herein. In this example, the client device 1402 includes a family coordination architecture 1422 that implements features of a family hub; a parental control service 1424 that implements features of a parent dashboard; a family check-in service 1426; a device quiet service 14213 that implements features of quiet time and quiet zone; a safe driving service 1430; and a device sharing service 1432. The client device services are further described with reference to FIG. 15.

Additionally, any one or combination of the various client device services may be abstracted for implementation by a network service provider, such as the device association service 1412. For example, the client devices 1410 that are associated in the family 1420 can be interconnected through a central computing device or system (e.g., may be one of the client devices 1410), which may be local to the multiple devices or may be located remotely from the devices. In embodiments, the central computing device may be a cloud service of one or more server computers that are connected to the multiple devices via the network 14113 or other communication link. The interconnection architecture enables functionality across multiple devices to provide a common and seamless experience to a user of the multiple devices. Each of the client devices may have different physical configurations and capabilities, and the central computing device implements a platform to enable delivery of an experience that is both tailored to a particular device and yet common to all of the devices.

Figure 15:
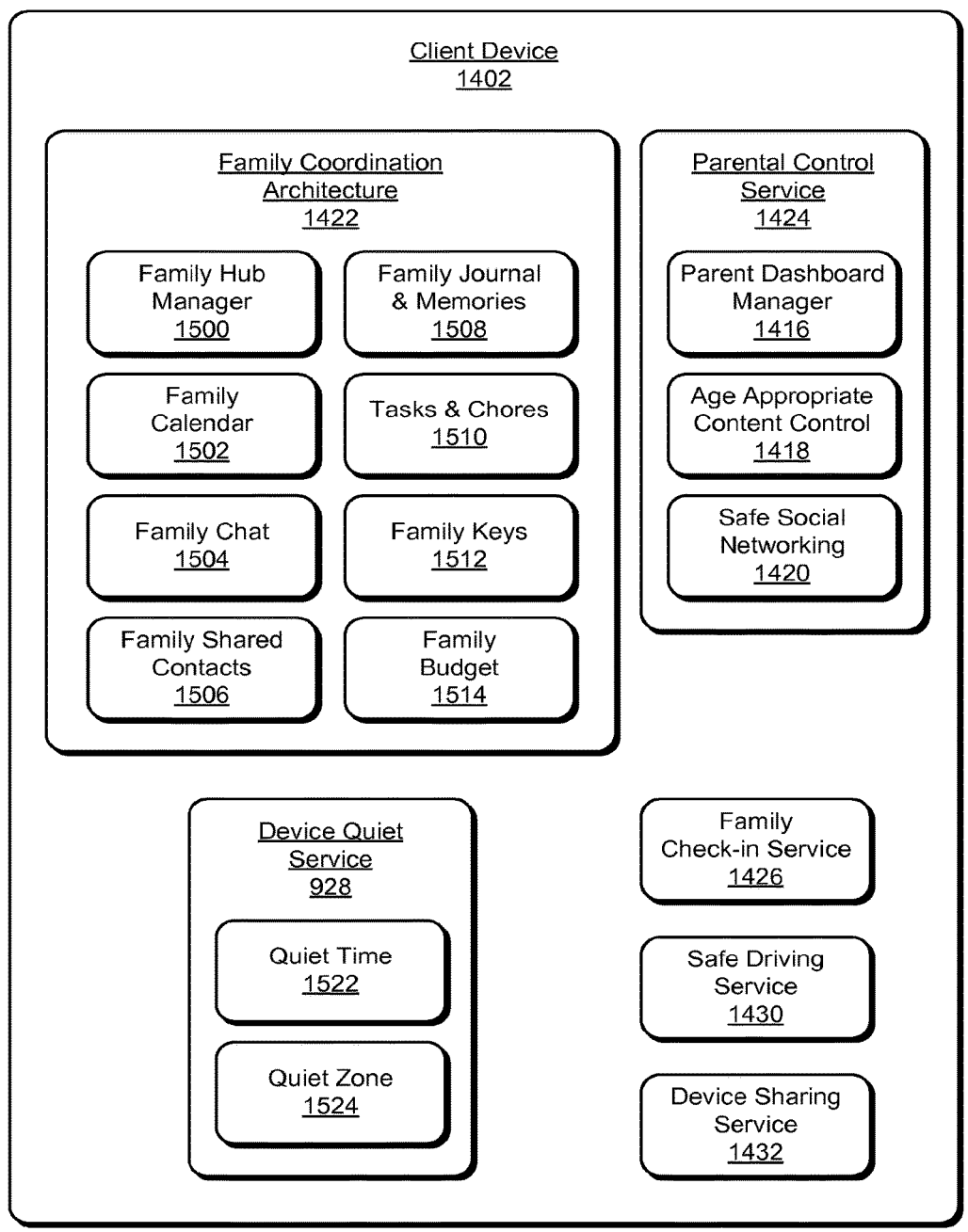
FIG. 15 illustrates various client device services and features in accordance with one or more embodiments.

FIG. 15 further illustrates the various client device services that are described with reference to FIG. 14. The client device 1402 includes the family coordination architecture 1422, the parental control service 1424, the family check-in service 1426, the device quiet service 14213, the safe driving service 1430, and the device sharing service 1432. In implementations, the device sharing service 1432 can embody the safe driving service 302 described with reference to FIGS. 1-7 and/or embody the restricted execution service 902 described with reference to FIGS. 9-12, such as to implement a safe driving mode. In embodiments, the family coordination architecture 1422 may generally be implemented as a service, as described herein. Generally, any of the described services may be implemented and/or described in the general context of software, firmware, hardware (e.g., fixed logic circuitry), manual processing, applications, routines, programs, objects, components, data structures, procedures, modules, functions, or any combination thereof. A software implementation represents program code that performs specified tasks when executed by a computer processor. In embodiments, any of the processing, computation, filtering, code execution, etc. can be implemented with distributed computing services and/or devices, such as on a client device, a server device, and/or network-based service.

In this example of the client device services, the family coordination architecture 1422 includes a family hub manager 1500 that implements, coordinates, and/or manages various family features, such as family calendar 1502, family chat 1504, family shared contacts 1506, family journal and memories 15013, tasks and chores 1510, family keys 1512, and family budget 1514. The parental control service 1424 implements features such as a parent dashboard manager 1516, age appropriate content control 15113, and safe social networking 1520. The device quiet service 14213 implements features such as quiet time 1522 and quiet zone 1524. The various client device services and features are further described throughout the document.

Any of the client device services can include, be integrated with, or implement any of the other client device services and applications. For example, the family coordination architecture 1422 can include any one or combination of the parental control service 1424, the family check-in service 1426, the device quiet service 14213, the safe driving service 1430, and the device sharing service 1432. In embodiments, the family coordination architecture may be implemented for the coordination of time, messaging, data, activities, and any other shared services. The shared services may be any of the client device services and/or any type of shared services that may be associated with a service and/or multi-system operator (MSO) devices. Further, the parental control service can be implemented to throttle, expand, manage, and/or reallocate data sharing of the client device services.

Any of the family features and/or applications of the family coordination architecture can be implemented as private, some private and some public, or private with optional user control to share information and data with public third-party services and applications. Similarly, any of the client device services and applications described herein may be private, public, sharable, user-controllable, and/or any combination thereof. In embodiments, the family coordination architecture and/or the family hub manager can be implemented as an overall managing architecture, a collective embodiment of, and/or integration of any of the client device services and/or applications that may be implemented for expandability and instantiated together as the family coordination and/or the family hub architecture. Further, any of the client device services can include, be integrated with, or implement any of the other client device services and applications, and collectively may be embodied as a family hub and/or coordination architecture or service.

Figure 16:
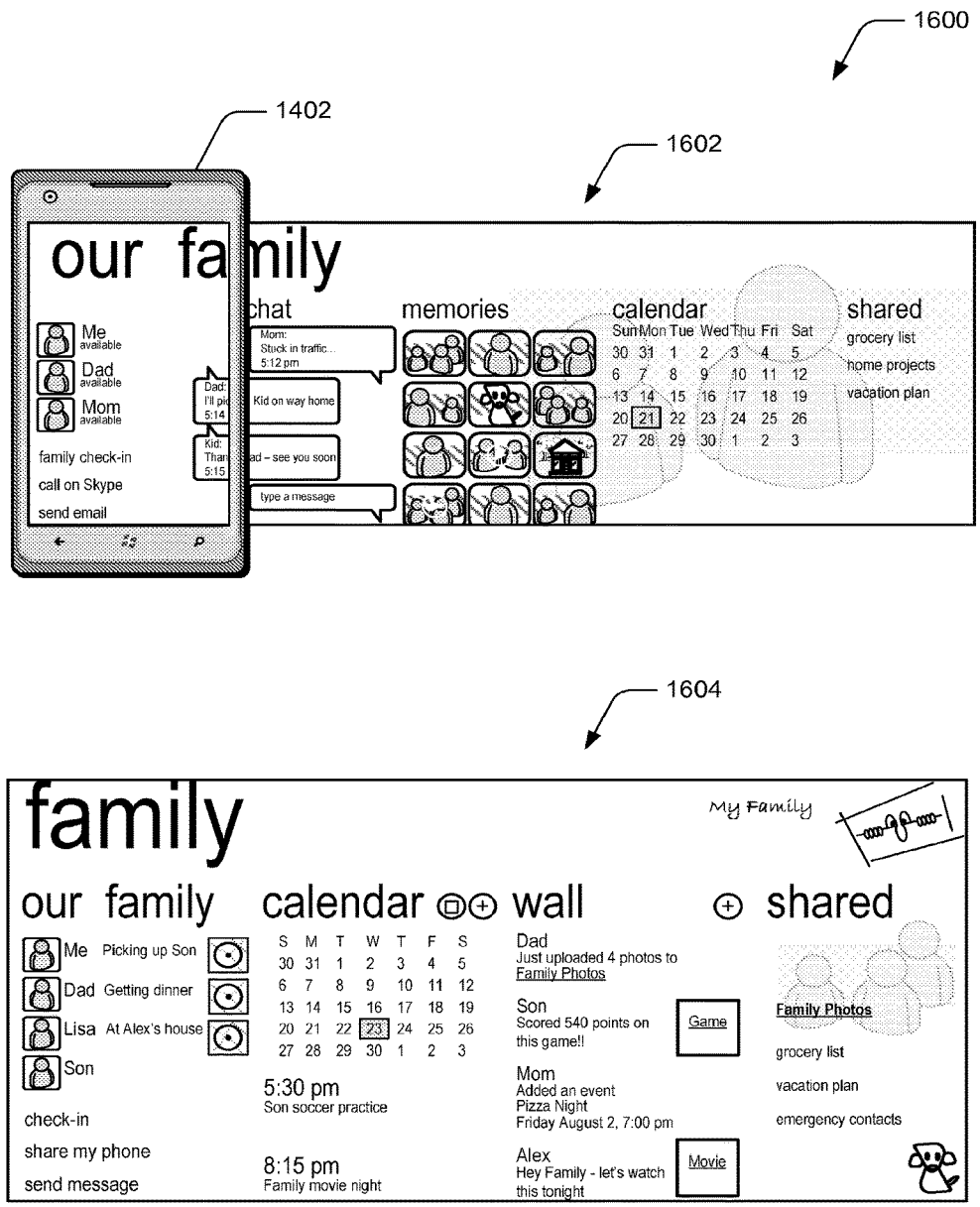
FIG. 16 illustrates examples of a family hub in accordance with one or more embodiments.

FIG. 16 is an example of a system 1600 showing two different examples of hub user-interfaces 1602, 1604 for a family-orientated hub. The description, layout, orientation, features, and organization of the text, images, photos, graphics, links, data, information, and presentation features shown with reference to the hub user interfaces, as well as with reference to any other user interfaces described herein and/or shown in the figures, are merely examples that may be altered in any aspect for various embodiments and/or implementations of mobile device check-in.

The hub is a central space for membership-orientated coordination of communications, activities, information, and integration. Designated member relationships can be utilized to define how the data and information is managed, and can be implemented to leverage the social contract, such as between members of a defined familial group in the illustrated example. In one or more implementations, the hub is implemented as a user interface (e.g., via a client device application) for integration and aggregation of the membership-orientated communications, activities, and information. A hub can be implemented as a private, shared space between defined members. The hub contains links to other members' profiles, and based on restriction settings, allows aggregation for visibility of some of other members' data and information within the hub. The hub shares a group calendar which can be viewed and edited, a common text message window, a posting board, a shared photo album, a check-in feature, and any other type of shared information.

Devices and/or device accounts can be associated within a set of devices or device accounts (e.g., a family phone account, user accounts, a connected set of devices, and so on), and all or a subset of the devices or accounts can communicate with other devices or accounts. The members of a hub can be defined by any number of different classes of people, such as Junior, Teen, Mom, Dad, (or Parent), Grandparent, Nanny, Life-Coach, and so on for the illustrated example of a family. Further, the members of a family can be defined to distinguish a live-in Nanny from a Babysitter, for example.

Additionally, membership of the hub as well as use of the hub by the members can be controlled by a select collection of users, such as one or two mobile phones by the associated users of the client devices. For example, one of the members in the hub can be the designated control person, such as Mom who runs the household, employer, and so on.

From a single configuration of the members, the hub can be provisioned, setup, and propagated out, e.g., automatically. The features and configuration of a hub may default to an automatic, easy setup, but any rule, feature, or configuration aspect can be readily modified by a user. Provisioning a hub may be based on billing, e.g., a family or corporate billing plan. However, if a phone device is changed to a different carrier, for example, the phone device can still receive texts related to the hub. Alternatively or in addition, provisioning a hub can be based on email addresses, phone numbers, user account identifiers, or any other identifier.

A retail person selling a new phone package, for instance, can easily identify the members each to their new phone devices and initiate the hub being instantiated. From a consumer perspective, it just works and members can walk out of the store all set up. All of the data and information can be shared with a single selection, and thus the members do not have to share each item (e.g., a grocery list, photos, calendar, etc.) individually and separately.

The hub user interface may act as a shared space that is customizable and provides for user-generated and shared content. Some information can be shared, while other information is not. For example, Mom's complete Christmas list is not viewable by the other family members, but Dad and Kids can add to the list (and only view their contribution). Hub setup may be performed "a la carte," meaning only the features that members want displayed on the hub wall can be selected. For example, Mom wants to see the shopping list, whereas Dad does not shop and so wants to avoid having the list displayed on his device, yet he could still access the shopping list to add items when desired.

The hub user interface integrates functions, calendar functionality, event and/or data summaries (i.e., on the "wall"), as well as content that is shared between the members of the hub (e.g., lists, documents, etc.). For example, the hub user interface may include a "family check-in" or "check-in" option. The hub user interface may also include a chat section where location check-ins messaged are displayed along with other messages interchanged between the members of the hub. The hub "wall" is representative of an area via which members of the group may add to as desired, like a lunchroom bulletin board, family refrigerator, and so on. In implementations, the information can be aggregated in pillars or columns and shown on the hub wall as illustrated. The hub wall can also represent an interrelation between any of the information and data that appears on the wall and its placement in time. The hub settings provide that a user can control which functions are integrated and displayed within the hub, such as on the wall.

The hub information may also be context relevant to the members of the hub, and the calendar includes shared hub events. Calendar updates can be posted as notice events on the wall, and a user can look at the wall to see upcoming hub events, or the events that pertain to one or more other members of the hub. Messaging may also be performed that is private among the members of the hub. A member can instant text (or other communication) to all other members in the hub. Texting—such as for a work meeting—can divide each members' display on their respective devices into individual screens for each member.

The hub may also be extensible, and may link to a hard drive on a home computer, or sync to just one of the other devices, the manager, or cloud control (e.g., from a network-based service). The hub may also be extensible to third parties that add a note on the hub wall, such as implemented with application program interfaces (APIs) for functions to post data to the hub. A third-party application, however, would not have access to the context of the hub wall, such as to obtain or display hub data. The private information and hub data could be encrypted and only decrypted by the phone devices that are associated with the hub.

Thus, the hub supported by a hub coordination architecture may be thought of as a central space for coordination of communications, activities, information, and integration of members of the hub. Hubs may be defined to support a variety of different membership, such as for family members, coworkers, friends, acquaintances, fan clubs, and so forth. Therefore, although examples are discussed that relate to a family in the following discussion it should be readily apparent that membership in the hub may be defined in a variety of other ways without departing from the spirit and scope thereof. Accordingly, the hub coordination architecture may be used to support a variety of different functionality. An example of this functionality is described herein as hub safe driving service, and further aspects of private interaction hubs are also described herein.

Figure 17:
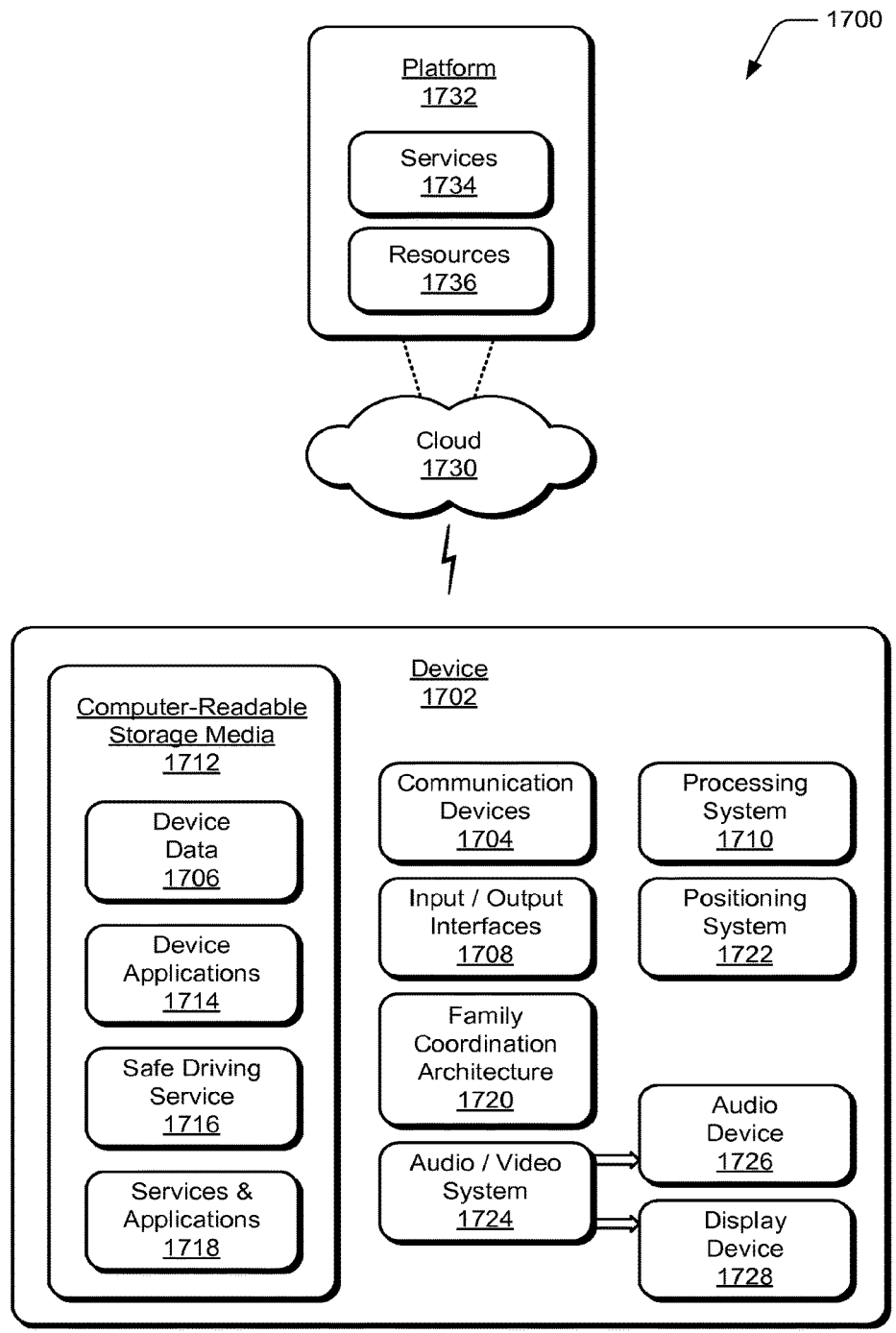
FIG. 17 illustrates an example system with an example device that can implement embodiments of mobile device safe driving.

FIG. 17 illustrates an example system 1700 that includes an example device 1702, which can implement embodiments of mobile device safe driving. The example device 1702 can be implemented as any of the devices, services, and/or servers described with reference to the previous FIGS. 1-16, such as any type of client or mobile device, mobile phone, tablet, computing, communication, entertainment, gaming, media playback, and/or other type of device. For example, the mobile device 100 shown in FIGS. 1 and 3, and the mobile device 800 shown in FIGS. 8 and 9, may be implemented as the example device 1702.

The device 1702 includes communication devices 1704 that enable wired and/or wireless communication of device data 1706, such as media content and the shared messages, updates, and events data at the device. The media content can include any type of audio, video, and/or image data. The communication devices 1704 can also include transceivers for cellular phone communication and/or for network data communication.

The device 1702 also includes input/output (I/O) interfaces 17013, such as data network interfaces that provide connection and/or communication links between the device, data networks, and other devices. The I/O interfaces can be used to couple the device to any type of components, peripherals, and/or accessory devices. The I/O interfaces also include data input ports via which any type of data, media content, and/or inputs can be received, such as user inputs to the device, as well as any type of audio, video, and/or image data received from any content and/or data source.

The I/O interfaces 17013 also support natural user interface (NUI) inputs to the device 1702, such as any interface technology that enables a user to interact with a device in a "natural" manner, free from artificial constraints imposed by input devices such as mice, keyboards, remote controls, and the like. Examples of natural user interface inputs may rely on speech recognition, touch and stylus recognition, gesture recognition on-screen and motion gesture recognition proximate the device, head, eye, and environment recognition and tracking, augmented reality and virtual reality systems, and any other type of audible, vision, touch, gesture, and/or machine intelligence that may determine user input intentions.

The device 1702 includes a processing system 1710 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 1702 may further include any type of a system bus or other data and command transfer system that couples the various components within the device. A system bus can include any one or combination of different bus structures and architectures, as well as control and data lines.

The device 1702 also includes computer-readable storage media 1712, such as data storage devices that can be accessed by a computing device, and that provide persistent storage of data and executable instructions (e.g., software applications, programs, functions, and the like). Examples of computer-readable storage media include volatile memory and non-volatile memory, fixed and removable media devices, and any suitable memory device or electronic data storage that maintains data for computing device access. The computer-readable storage media can include various implementations of random access memory (RAM), read-only memory (ROM), flash memory, and other types of storage media in various memory device configurations.

Generally, computer-readable storage media is representative of media and/or devices that enable persistent and/or non-transitory storage of data in contrast to mere signal transmission, carrier waves, or signals per se. A computer-readable signal media may refer to a signal-bearing medium that transmits instructions, such as via a network. The signal media can embody computer-readable instructions as data in a modulated data signal, such as carrier waves or other transport mechanism.

The computer-readable storage media 1712 provides storage of the device data 1706 and various device applications 1714, such as an operating system that is maintained as a software application with the computer-readable storage media and executed by the processing system 1710. In this example, the device applications also include a device share service 1716 that implements embodiments of mobile device safe driving, such as when the example device 1702 is implemented as the mobile device 100 shown in FIG. 1. An example of the safe driving service 1716 is the safe driving service 302 that is integrated with the operating system 304 at the mobile device 100, as described with reference to FIG. 3.

The device applications 1714 can also include any of the services and applications 17113 that implement embodiments of mobile device safe driving. The example device 1702 also includes a family coordination architecture 1720, which may be implemented in the general context of software, firmware, hardware (e.g., fixed logic circuitry), or any combination thereof to support embodiments of mobile device safe driving and/or mobile devices family coordination. The device 1702 can also include a positioning system 1722, such as a GPS transceiver, or similar positioning system components, that can be utilized to determine a global or navigational position of the device.

The device 1702 also includes an audio and/or video system 1724 that generates audio data for an audio device 1726 and/or generates display data for a display device 17213. The audio device and/or the display device include any devices that process, display, and/or otherwise render audio, video, display, and/or image data. In implementations, the audio device and/or the display device are integrated components of the example device 1702. Alternatively, the audio device and/or the display device are external, peripheral components to the example device.

In embodiments, at least part of the techniques described for mobile device safe driving may be implemented in a distributed system, such as over a "cloud" 1730 in a platform 1732. The cloud 1730 includes and/or is representative of the platform 1732 for services 1734 and/or resources 1736. For example, the services 1734 may include the cloud storage and service 306, and any of the data services 3013 as described with reference to FIG. 3. Additionally, the resources 1736 may include the driving reports 310 as described with reference to FIG. 3.

The platform 1732 abstracts underlying functionality of hardware, such as server devices (e.g., included in the services 1734) and/or software resources (e.g., included as the resources 1736), and connects the example device 1702 with other devices, servers, etc. The resources 1736 may also include applications and/or data that can be utilized while computer processing is executed on servers that are remote from the example device 1702. Additionally, the services 1734 and/or the resources 1736 may facilitate subscriber network services, such as over the Internet, a cellular network, or Wi-Fi network. The platform 1732 may also serve to abstract and scale resources to service a demand for the resources 1736 that are implemented via the platform, such as in an interconnected device embodiment with functionality distributed throughout the system 1700. For example, the functionality may be implemented in part at the example device 1702 as well as via the platform 1732 that abstracts the functionality of the cloud 1730.

Although embodiments of mobile device safe driving have been described in language specific to features and/or methods, the appended claims are not necessarily limited to the specific features or methods described. Rather, the specific features and methods are disclosed as example implementations of mobile device safe driving.

What is claimed is:

1. A method, comprising:
   receiving, by a computing device, a driving notification of a driving event from a mobile device, the notification generated responsive to movement of a vehicle that is being driven by a driver;
   determining that the mobile device is associated with the driver based on identifiers of the mobile device;
   communicating with the mobile device effective to cause activation of a safe driving mode of the mobile device, the activation of the safe driving mode causing the mobile device to transition to a driving mode lock screen without entry of an authentication credential, wherein the safe driving mode can be deactivated by a user of the mobile device; and
   generating a driving report that indicates the features of the mobile device were enabled by user override of the safe driving mode while the mobile device was moving in the vehicle.

2. The method as recited in claim 1, wherein the movement of the vehicle comprises stopping at an unknown location.

3. The method as recited in claim 1, further comprising:
   communicating a safe driving report to an associated device of the mobile device.

4. The method as recited in claim 1, further comprising:
   receiving a notification that a user of the mobile device is not the driver of the vehicle; and
   communicating with the mobile device effective to cause deactivation of the safe driving mode.

5. The method as recited in claim 1, further comprising:
   determining one or more other devices that are associated with the driver based on identifiers of the one or more associated devices; and
   communicating with the one or more other devices effective to cause activation of a safe driving mode of the one or more other devices.

6. A safe driving system, comprising:
   a network service device to execute computer instructions as a safe driving service that is configured to perform operations comprising:
   receiving a driving notification of a driving event from a mobile device, the notification generated responsive to movement of a vehicle that is being driven by a driver;
   determining that the mobile device is associated with the driver based on identifiers of the mobile device;
   communicating with the mobile device effective to cause activation of a safe driving mode of the mobile device, the activation of the safe driving mode causing the mobile device to transition to a driving mode lock screen without entry of an authentication credential, wherein the safe driving mode may be deactivated by a user of the mobile device; and generating a driving report that indicates the features of the mobile device were enabled by user override of the safe driving mode while the mobile device was moving in the vehicle.

7. The safe driving system as recited in claim 6, wherein the movement of the vehicle comprises stopping at an unknown location.

8. The safe driving system as recited in claim 6, wherein the safe driving service is configured to perform operations further comprising:
   receiving a notification that a user of the mobile device is not the driver of the vehicle; and
   communicating with the mobile device effective to cause deactivation of the safe driving mode.

9. A computer-readable storage media comprising computer instructions that when executed cause a computer to operate as a safe driving service that is configured to perform operations comprising:
   receiving a driving notification of a driving event from a mobile device, the notification generated responsive to movement of a vehicle that is being driven by a driver;
   determining that the mobile device is associated with the driver based on identifiers of the mobile device;
   communicating with the mobile device effective to cause activation of a safe driving mode of the mobile device;
   receive location data that indicates a location of the vehicle;
   receive speed limit data that corresponds to the location of the vehicle; and
   communicate a vehicle speed limit to the vehicle to control vehicle speed at the location of the vehicle.

10. The computer-readable storage media as recited in claim 9, wherein the safe driving service is configured to:
   receive a vehicle notification of an operating mode of the vehicle from the vehicle; and
   communicate the vehicle notification received from the vehicle to one or more other devices that are associated with the mobile device.

11. The computer-readable storage media as recited in claim 10, wherein mobile device is paired with the vehicle.

* * * * *